(12) United States Patent
Ferre Fabregas et al.

(10) Patent No.: US 12,401,174 B2
(45) Date of Patent: Aug. 26, 2025

(54) ELECTRICAL TRACK ASSEMBLY

(71) Applicant: Lear Corporation, Southfield, MI (US)

(72) Inventors: Antoni Ferre Fabregas, Valls (ES); Raul Ricart, Valls (ES); Jose Gabriel Fernandez Banares, Valls (ES)

(73) Assignee: Lear Corporation, Southfield, MI (US)

( * ) Notice: Subject to any disclaimer, the term of this patent is extended or adjusted under 35 U.S.C. 154(b) by 77 days.

(21) Appl. No.: 18/372,540

(22) Filed: Sep. 25, 2023

(65) Prior Publication Data

US 2024/0109465 A1    Apr. 4, 2024

Related U.S. Application Data

(63) Continuation of application No. 17/116,959, filed on Dec. 9, 2020, now Pat. No. 11,807,142, which is a
(Continued)

(51) Int. Cl.
*H02B 1/20* (2006.01)
*B60N 2/07* (2006.01)
(Continued)

(52) U.S. Cl.
CPC ............ *H02B 1/20* (2013.01); *B60N 2/0715* (2013.01); *B60N 2/501* (2013.01); *B60N 2/502* (2013.01);
(Continued)

(58) Field of Classification Search
CPC ...... B60N 2/501; B60N 2/0715; B60N 2/502; B60N 2/0264; B60N 2/06; B60N 2/0722; B60N 16/027; H02B 1/20
See application file for complete search history.

(56) References Cited

U.S. PATENT DOCUMENTS

| | | |
|---|---|---|
| 2,126,143 A | 8/1938 | Saunders |
| 2,263,554 A | 11/1941 | Brach |
| | (Continued) | |

FOREIGN PATENT DOCUMENTS

| | | |
|---|---|---|
| CN | 101492020 A | 7/2009 |
| CN | 101615770 A | 12/2009 |
| | (Continued) | |

OTHER PUBLICATIONS

Chinese Office Action dated Apr. 11, 2022 for Chinese Patent Appication No. 202010002498.0.
(Continued)

*Primary Examiner* — Eret C McNichols
(74) *Attorney, Agent, or Firm* — McGarry Bair PC

(57) ABSTRACT

A support member for an electrical track assembly comprises a first tracking including a first conductor and a second tracking including a second conductor, the support member comprising: a first support member contact; a second support member contact; an electrical load including a first load contact and a second load contact; and a switch assembly configured for selectively electrically connecting said first conductor with the first load contact, selectively electrically connecting said second conductor with the second load contact, and preventing current flow (i) between said first conductor and the second load contact and (ii) between said second conductor and the first load contact.

22 Claims, 39 Drawing Sheets

Related U.S. Application Data continuation-in-part of application No. 16/294,289, filed on Mar. 6, 2019, now Pat. No. 11,299,075.

(51) Int. Cl.
   *B60N 2/50*       (2006.01)
   *B60N 2/02*       (2006.01)
   *B60N 2/06*       (2006.01)
   *B60R 16/027*     (2006.01)

(52) U.S. Cl.
   CPC .............. *B60N 2/0264* (2023.08); *B60N 2/06* (2013.01); *B60N 2/0722* (2013.01); *B60R 16/027* (2013.01)

(56) References Cited

U.S. PATENT DOCUMENTS

| | | |
|---|---|---|
| 2,480,622 A | 8/1949 | Warnock |
| 2,678,082 A | 5/1954 | Walker |
| 3,096,066 A | 7/1963 | Granet |
| 3,181,102 A | 4/1965 | Fehr, Jr. |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen |
| 3,940,182 A | 2/1976 | Tamura |
| 4,020,769 A | 5/1977 | Keir |
| 4,162,468 A | 7/1979 | Thornley |
| 4,198,025 A | 4/1980 | Bollons |
| 4,234,348 A | 11/1980 | Brunn |
| 4,238,099 A | 12/1980 | Hunwicks |
| 4,282,631 A | 8/1981 | Uehara |
| 4,511,187 A | 4/1985 | Rees |
| 4,575,295 A | 3/1986 | Rebentisch |
| 4,618,808 A | 10/1986 | Ish-Shalom |
| 4,707,030 A | 11/1987 | Harding |
| 4,711,589 A | 12/1987 | Goodbred |
| 4,763,360 A | 8/1988 | Daniels |
| 4,776,809 A | 10/1988 | Hall |
| 4,830,531 A | 5/1989 | Condit |
| 4,853,555 A | 8/1989 | Wheat |
| 4,941,636 A | 7/1990 | Fujiwara |
| 4,961,559 A | 10/1990 | Raymor |
| 4,969,621 A | 11/1990 | Muenchow |
| 4,987,316 A | 1/1991 | White |
| 5,106,144 A | 4/1992 | Hayakawa |
| 5,137,331 A | 8/1992 | Colozza |
| 5,167,393 A | 12/1992 | Hayakawa |
| 5,192,045 A | 3/1993 | Yamada |
| 5,222,814 A | 6/1993 | Boelryk |
| 5,302,065 A | 4/1994 | Vogg |
| 5,322,982 A | 6/1994 | Leger |
| 5,332,290 A | 7/1994 | Borlinghaus |
| 5,348,373 A | 9/1994 | Stiennon |
| 5,362,241 A | 11/1994 | Matsuoka |
| 5,446,442 A | 8/1995 | Swart |
| 5,466,892 A | 11/1995 | Howard |
| 5,489,173 A | 2/1996 | Hoefle |
| 5,524,504 A | 6/1996 | Brandoli |
| 5,582,381 A | 12/1996 | Graf |
| 5,599,086 A | 2/1997 | Dutta |
| 5,618,192 A | 4/1997 | Drury |
| 5,655,816 A | 8/1997 | Magnuson |
| 5,676,341 A | 10/1997 | Tarusawa |
| 5,696,409 A | 12/1997 | Handman |
| 5,701,037 A | 12/1997 | Weber |
| 5,796,177 A | 8/1998 | Werbelow |
| 5,800,015 A | 9/1998 | Tsuchiya |
| 5,893,545 A | 4/1999 | Lyons |
| 5,899,532 A | 5/1999 | Paisley |
| 5,918,847 A | 7/1999 | Couasnon |
| 5,921,606 A | 7/1999 | Moradell |
| 5,964,442 A | 10/1999 | Wingblad |
| 5,964,815 A | 10/1999 | Wallace |
| 6,008,547 A | 12/1999 | Dobler |
| 6,036,157 A | 3/2000 | Baroin |
| 6,081,044 A | 6/2000 | Anthofer |
| 6,142,718 A | 11/2000 | Kroll |
| 6,150,774 A | 11/2000 | Mueller |
| 6,166,451 A | 12/2000 | Pigott |
| 6,216,995 B1 | 4/2001 | Koester |
| 6,227,595 B1 | 5/2001 | Hamelin |
| 6,260,813 B1 | 7/2001 | Whitcomb |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjoestroem |
| 6,325,645 B1 | 12/2001 | Schuite |
| 6,357,814 B1 | 3/2002 | Boisset |
| 6,364,272 B1 | 4/2002 | Rolf |
| 6,400,259 B1 | 6/2002 | Bourcart |
| 6,405,988 B1 | 6/2002 | Taylor |
| 6,422,596 B1 | 7/2002 | Fendt |
| 6,439,531 B1 | 8/2002 | Severini |
| 6,480,144 B1 | 11/2002 | Miller |
| 6,565,119 B2 | 5/2003 | Fogle, Jr. |
| 6,566,765 B1 | 5/2003 | Nitschke |
| 6,588,722 B2 | 7/2003 | Eguchi |
| 6,693,368 B2 | 2/2004 | Schumann |
| 6,710,470 B2 | 3/2004 | Bauer |
| 6,719,350 B2 | 4/2004 | Duchateau |
| 6,736,458 B2 | 5/2004 | Chabanne |
| 6,772,056 B2 | 8/2004 | Mattes |
| 6,805,375 B2 | 10/2004 | Enders |
| 6,851,708 B2 | 2/2005 | Kazmierczak |
| 6,869,057 B2 | 3/2005 | Matsumoto |
| 6,882,162 B2 | 4/2005 | Schirmer |
| 6,960,993 B2 | 11/2005 | Mattes |
| 7,042,342 B2 | 5/2006 | Luo |
| 7,083,437 B2 | 8/2006 | Mackness |
| 7,086,874 B2 | 8/2006 | Mitchell |
| 7,113,541 B1 | 9/2006 | Lys |
| 7,159,899 B2 | 1/2007 | Nitschke |
| 7,170,192 B2 | 1/2007 | Kazmierczak |
| 7,188,805 B2 | 3/2007 | Henley |
| 7,207,541 B2 | 4/2007 | Frohnhaus |
| 7,271,501 B2 | 9/2007 | Dukart |
| 7,288,009 B2 | 10/2007 | Lawrence |
| 7,293,831 B2 | 11/2007 | Greene |
| 7,300,091 B2 | 11/2007 | Nihonmatsu |
| 7,322,605 B2 | 1/2008 | Ventura |
| 7,348,687 B2 | 3/2008 | Aichriedler |
| 7,363,194 B2 | 4/2008 | Schlick |
| 7,370,831 B2 | 5/2008 | Laib |
| 7,388,466 B2 | 6/2008 | Ghabra |
| 7,389,960 B2 | 6/2008 | Mitchell |
| 7,416,042 B2 | 8/2008 | Czaykowska |
| 7,434,883 B2 | 10/2008 | Deptolla |
| 7,454,170 B2 | 11/2008 | Goossens |
| 7,455,535 B2 | 11/2008 | Insalaco |
| 7,503,522 B2 | 3/2009 | Henley |
| 7,505,754 B2 | 3/2009 | Kazmierczak |
| 7,523,913 B2 | 4/2009 | Mizuno |
| 7,556,233 B2 | 7/2009 | Gryp |
| 7,560,827 B2 | 7/2009 | Jacas-Miret |
| 7,633,301 B2 | 12/2009 | Steenwyk |
| 7,661,637 B2 | 2/2010 | Mejuhas |
| 7,665,939 B1 | 2/2010 | Cardona |
| 7,739,820 B2 | 6/2010 | Frank |
| 7,744,386 B1 | 6/2010 | Speidel |
| 7,780,138 B1 | 8/2010 | Lee |
| 7,980,525 B2 | 7/2011 | Kostin |
| 7,980,798 B1 | 7/2011 | Kuehn |
| 8,010,255 B2 | 8/2011 | Darraba |
| 8,146,991 B2 | 4/2012 | Stanz |
| 8,278,840 B2 | 10/2012 | Logiudice |
| 8,282,326 B2 | 10/2012 | Krostue |
| 8,376,675 B2 | 2/2013 | Schulze |
| 8,463,501 B2 | 6/2013 | Jousse |
| 8,536,928 B1 | 9/2013 | Gagne |
| 8,648,613 B2 | 2/2014 | Ewerhart |
| 8,702,170 B2 | 4/2014 | Abraham |
| 8,757,578 B2 | 6/2014 | Kitamura |
| 8,757,720 B2 | 6/2014 | Hurst, III |

(56) References Cited

U.S. PATENT DOCUMENTS

| | | |
|---|---|---|
| 8,800,949 B2 | 8/2014 | Schebaum |
| 8,857,778 B2 | 10/2014 | Nonomiya |
| 8,936,526 B2 | 1/2015 | Boutouil |
| 8,967,719 B2 | 3/2015 | Ngiau |
| RE45,456 E | 4/2015 | Sinclair |
| 9,010,712 B2 | 4/2015 | Gray |
| 9,018,869 B2 | 4/2015 | Yuasa |
| 9,045,061 B2 | 6/2015 | Kostin |
| 9,162,590 B2 | 10/2015 | Nagura |
| 9,174,604 B2 | 11/2015 | Wellhoefer |
| 9,242,580 B2 | 1/2016 | Schebaum |
| 9,318,922 B2 | 4/2016 | Hall |
| 9,340,125 B2 | 5/2016 | Stutika |
| 9,346,428 B2 | 5/2016 | Bortolin |
| 9,422,058 B2 | 8/2016 | Fischer |
| 9,561,770 B2 | 2/2017 | Sievers |
| 9,608,392 B1 | 3/2017 | Destro |
| 9,610,862 B2 | 4/2017 | Bonk |
| 9,663,232 B1 | 5/2017 | Porter |
| 9,673,583 B2 | 6/2017 | Hudson |
| 9,701,217 B2 | 7/2017 | Eckenroth |
| 9,731,628 B1 | 8/2017 | Rao |
| 9,758,061 B2 | 9/2017 | Pluta |
| 9,789,834 B2 | 10/2017 | Rapp |
| 9,796,304 B2 | 10/2017 | Salter |
| 9,815,425 B2 | 11/2017 | Rao |
| 9,821,681 B2 | 11/2017 | Rao |
| 9,840,220 B2 | 12/2017 | Van Buskirk |
| 9,879,458 B2 | 1/2018 | Gabriel |
| 9,919,624 B2 | 3/2018 | Cziomer |
| 9,950,682 B1 | 4/2018 | Gramenos |
| 10,059,232 B2 | 8/2018 | Frye |
| 10,160,351 B2 | 12/2018 | Sugimoto |
| 10,189,379 B2 | 1/2019 | Bonk |
| 10,479,227 B2 | 11/2019 | Nolte |
| 10,493,243 B1 | 12/2019 | Braham |
| 10,547,135 B2 | 1/2020 | Sugiura |
| 10,549,659 B2 | 2/2020 | Sullivan |
| 10,654,378 B2 | 5/2020 | Pons |
| 10,882,420 B2 | 1/2021 | Ricart |
| 10,926,663 B2 * | 2/2021 | Tippy ................ B60R 21/01554 |
| 11,505,141 B2 * | 11/2022 | Jones .................... B60R 16/027 |
| 2005/0046367 A1 | 3/2005 | Wevers |
| 2005/0089367 A1 | 4/2005 | Sempliner |
| 2005/0150705 A1 | 7/2005 | Philippe |
| 2005/0211835 A1 | 9/2005 | Henley |
| 2005/0215098 A1 | 9/2005 | Muramatsu |
| 2005/0230543 A1 | 10/2005 | Laib |
| 2005/0236899 A1 | 10/2005 | Kazmierczak |
| 2005/0258676 A1 | 11/2005 | Mitchell |
| 2006/0131470 A1 | 6/2006 | Yamada |
| 2006/0208549 A1 | 9/2006 | Hancock |
| 2006/0220411 A1 | 10/2006 | Pathak |
| 2007/0074085 A1 | 3/2007 | Ferguson |
| 2008/0021602 A1 | 1/2008 | Kingham |
| 2008/0090432 A1 | 4/2008 | Patterson |
| 2009/0014584 A1 | 1/2009 | Rudduck |
| 2009/0129105 A1 | 5/2009 | Kusu |
| 2009/0251920 A1 | 10/2009 | Kino |
| 2009/0302665 A1 | 12/2009 | Dowty |
| 2009/0319212 A1 | 12/2009 | Cech |
| 2010/0117275 A1 | 5/2010 | Nakamura |
| 2011/0024595 A1 | 2/2011 | Oi |
| 2011/0225773 A1 | 9/2011 | Hearn |
| 2012/0112032 A1 | 5/2012 | Kohen |
| 2013/0020459 A1 | 1/2013 | Moriyama |
| 2013/0035994 A1 | 2/2013 | Pattan |
| 2013/0153735 A1 | 6/2013 | Ruthman |
| 2013/0327139 A1 | 12/2013 | Goodman |
| 2013/0341479 A1 | 12/2013 | Yamada |
| 2014/0110554 A1 | 4/2014 | Oya |
| 2014/0224954 A1 | 8/2014 | Oh |
| 2014/0263920 A1 | 9/2014 | Anticuar |
| 2014/0265479 A1 | 9/2014 | Bennett |
| 2015/0048206 A1 | 2/2015 | Deloubes |
| 2015/0052819 A1 | 2/2015 | Lee |
| 2015/0069807 A1 | 3/2015 | Kienke |
| 2015/0083882 A1 | 3/2015 | Stutika |
| 2015/0191106 A1 | 7/2015 | Inoue |
| 2015/0236462 A1 | 8/2015 | Davidson, Jr. |
| 2015/0298580 A1 | 10/2015 | Kanai |
| 2016/0023613 A1 | 1/2016 | Pullman |
| 2016/0039314 A1 | 2/2016 | Anticuar |
| 2016/0154170 A1 | 6/2016 | Thompson |
| 2017/0080825 A1 | 3/2017 | Bonk |
| 2017/0080826 A1 | 3/2017 | Bonk |
| 2017/0166093 A1 | 6/2017 | Cziomer |
| 2017/0261343 A1 | 9/2017 | Lanter |
| 2017/0291507 A1 | 10/2017 | Hattori |
| 2017/0305303 A1 | 10/2017 | Yadav |
| 2018/0017189 A1 | 1/2018 | Wegner |
| 2018/0039917 A1 | 2/2018 | Buttolo |
| 2018/0058122 A1 | 3/2018 | Lang |
| 2018/0072188 A1 | 3/2018 | Yamada |
| 2018/0086230 A1 | 3/2018 | Kume |
| 2018/0086232 A1 | 3/2018 | Kume |
| 2018/0105072 A1 | 4/2018 | Pons |
| 2018/0126875 A1 | 5/2018 | Kume |
| 2018/0148011 A1 | 5/2018 | Zaugg |
| 2018/0154799 A1 | 6/2018 | Lota |
| 2018/0183623 A1 | 6/2018 | Schoenfeld |
| 2018/0244175 A1 | 8/2018 | Tan |
| 2018/0275648 A1 | 9/2018 | Ramalingam |
| 2019/0001846 A1 | 1/2019 | Jackson |
| 2019/0084453 A1 | 3/2019 | Petit |
| 2019/0126786 A1 | 5/2019 | Dry |
| 2019/0337413 A1 | 11/2019 | Römer |
| 2019/0337414 A1 | 11/2019 | Condamin |
| 2019/0337415 A1 | 11/2019 | Condamin |
| 2019/0337416 A1 | 11/2019 | Condamin |
| 2019/0337417 A1 | 11/2019 | Condamin |
| 2019/0337418 A1 | 11/2019 | Condamin |
| 2019/0337419 A1 | 11/2019 | Condamin |
| 2019/0337420 A1 | 11/2019 | Condamin |
| 2019/0337421 A1 | 11/2019 | Condamin |
| 2019/0337422 A1 | 11/2019 | Condamin |
| 2019/0337471 A1 | 11/2019 | Brehm |
| 2019/0379187 A1 | 12/2019 | Christensen |
| 2019/0389336 A1 | 12/2019 | Malinowski |
| 2020/0009995 A1 | 1/2020 | Sonar |
| 2020/0010001 A1 | 1/2020 | Pinkelman |
| 2020/0047641 A1 | 2/2020 | D'Eramo |
| 2020/0055423 A1 | 2/2020 | Prozzi |
| 2020/0079244 A1 | 3/2020 | Carbone |
| 2020/0180516 A1 | 6/2020 | Moulin |
| 2020/0180517 A1 | 6/2020 | Moulin |
| 2020/0189504 A1 | 6/2020 | Ricart |
| 2020/0189511 A1 | 6/2020 | Ricart |
| 2020/0194936 A1 | 6/2020 | Ricart |
| 2020/0194948 A1 | 6/2020 | Lammers |
| 2020/0207241 A1 | 7/2020 | Moulin |
| 2020/0247275 A1 | 8/2020 | Yetukuri |
| 2020/0262367 A1 | 8/2020 | Fernández Bañares |
| 2020/0269754 A1 | 8/2020 | Fernández Bañares |
| 2020/0282871 A1 | 9/2020 | Ricart |
| 2020/0282880 A1 | 9/2020 | Jones |
| 2021/0101562 A1 | 4/2021 | Ricart |
| 2021/0105011 A1 | 4/2021 | Ricart |
| 2021/0105012 A1 | 4/2021 | Ricart |
| 2021/0107419 A1 | 4/2021 | Ricart |

FOREIGN PATENT DOCUMENTS

| | | |
|---|---|---|
| CN | 102227334 A | 10/2011 |
| CN | 203190203 U | 9/2013 |
| CN | 203799201 U | 8/2014 |
| CN | 106166982 A | 11/2016 |
| CN | 106515568 A | 3/2017 |
| CN | 107636786 A | 1/2018 |
| CN | 108482193 A | 9/2018 |
| CN | 108604659 A | 9/2018 |
| CN | 111342315 A | 6/2020 |
| CN | 111668701 A | 12/2022 |
| DE | 20021418 U1 | 5/2001 |

(56) References Cited

FOREIGN PATENT DOCUMENTS

| | | |
|---|---|---|
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102011056278 A1 | 2/2013 |
| DE | 202014102336 U1 | 6/2014 |
| DE | 102015212100 A1 | 12/2015 |
| DE | 102016113409 A1 | 4/2017 |
| DE | 102020202028 A1 | 8/2020 |
| DE | 102020125161 A1 | 4/2021 |
| DE | 102021120771 A1 | 4/2022 |
| EP | 0783990 A1 | 7/1997 |
| EP | 0808739 A2 | 11/1997 |
| EP | 1176047 A1 | 1/2002 |
| EP | 2298609 B1 | 3/2011 |
| EP | 3150426 A1 | 4/2017 |
| FR | 2762814 A1 | 11/1998 |
| FR | 2951329 A1 | 4/2011 |
| FR | 2986751 A1 | 8/2013 |
| GB | 1415925 A | 12/1975 |
| JP | H06305346 A | 11/1994 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2009200023 A | 9/2009 |
| JP | 2013230721 A | 11/2013 |
| JP | 2015185240 A | 10/2015 |
| WO | 0187665 A1 | 11/2001 |
| WO | 03002256 A2 | 1/2003 |
| WO | 2005068247 A2 | 7/2005 |

OTHER PUBLICATIONS

Chinese Office Action dated Sep. 3, 2021 for Chinese Patent Application No. 20201002498.0.

Chinese Office Action dated Nov. 9, 2023 for Chinese Patent Application No. 2021114781868.

* cited by examiner

ELECTRICAL TRACK ASSEMBLY

CROSS-REFERENCE TO RELATED APPLICATIONS

This application is a continuation application of U.S. patent application Ser. No. 17/116,959, filed on Dec. 9, 2020, now U.S. Pat. No. 11,807,142, issued Nov. 7, 2023, which is a continuation-in-part application of U.S. patent application Ser. No. 16/294,289, filed on Mar. 6, 2019, now U.S. Pat. No. 11,299,075, issued Apr. 12, 2022, the disclosures of which are hereby incorporated by reference in their entireties as though fully set forth herein.

TECHNICAL FIELD

The present disclosure generally relates to track assemblies, including track assemblies with electrical components and track assemblies that provide and/or facilitate electrical connections.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track designs may not be configured for connections in multiple directions/configurations, and/or may require expensive/complex electrical systems.

There is a desire for solutions/options that minimize or eliminate one or more challenges or shortcomings of track assemblies. The foregoing discussion is intended only to illustrate examples of the present field and is not a disavowal of scope.

SUMMARY

In embodiments, an electrical track assembly may include a pair of tracks, including a first track including a first conductor, a second track include a second conductor; and a support member configured for connection with, removal from, and movement along the pair of tracks in a first configuration and a second configuration. The support member may include a first support member contact, a second support member contact, an electrical load including a first load contact and a second load contact, and a manual switch assembly configured to selectively electrically connect the first conductor with the first load contact, selectively electrically connect the second conductor with the second load contact, and prevent current flow (i) between the first conductor and the second load contact and (ii) between the second conductor and the first load contact, the manual switch assembly including a blocking element.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
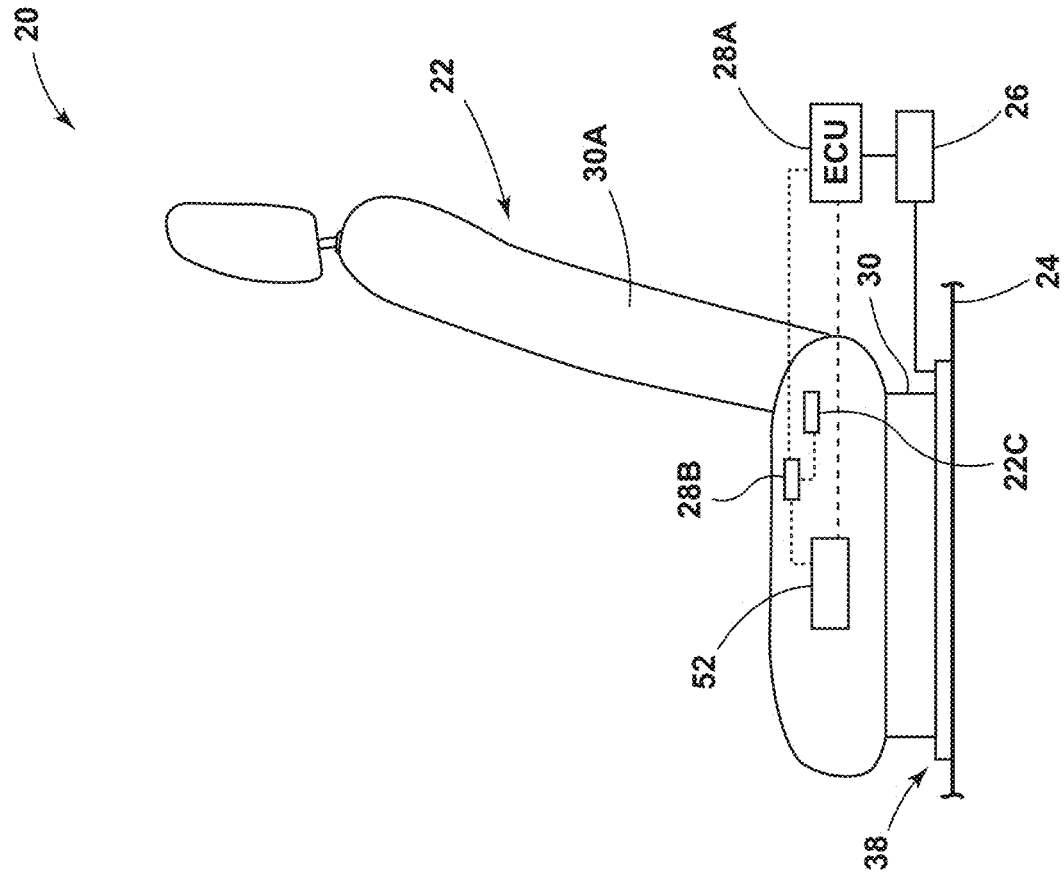
FIG. 1 is a side view generally illustrating an embodiment of an electrical assembly according to teachings of the present disclosure.
Figure 2A:
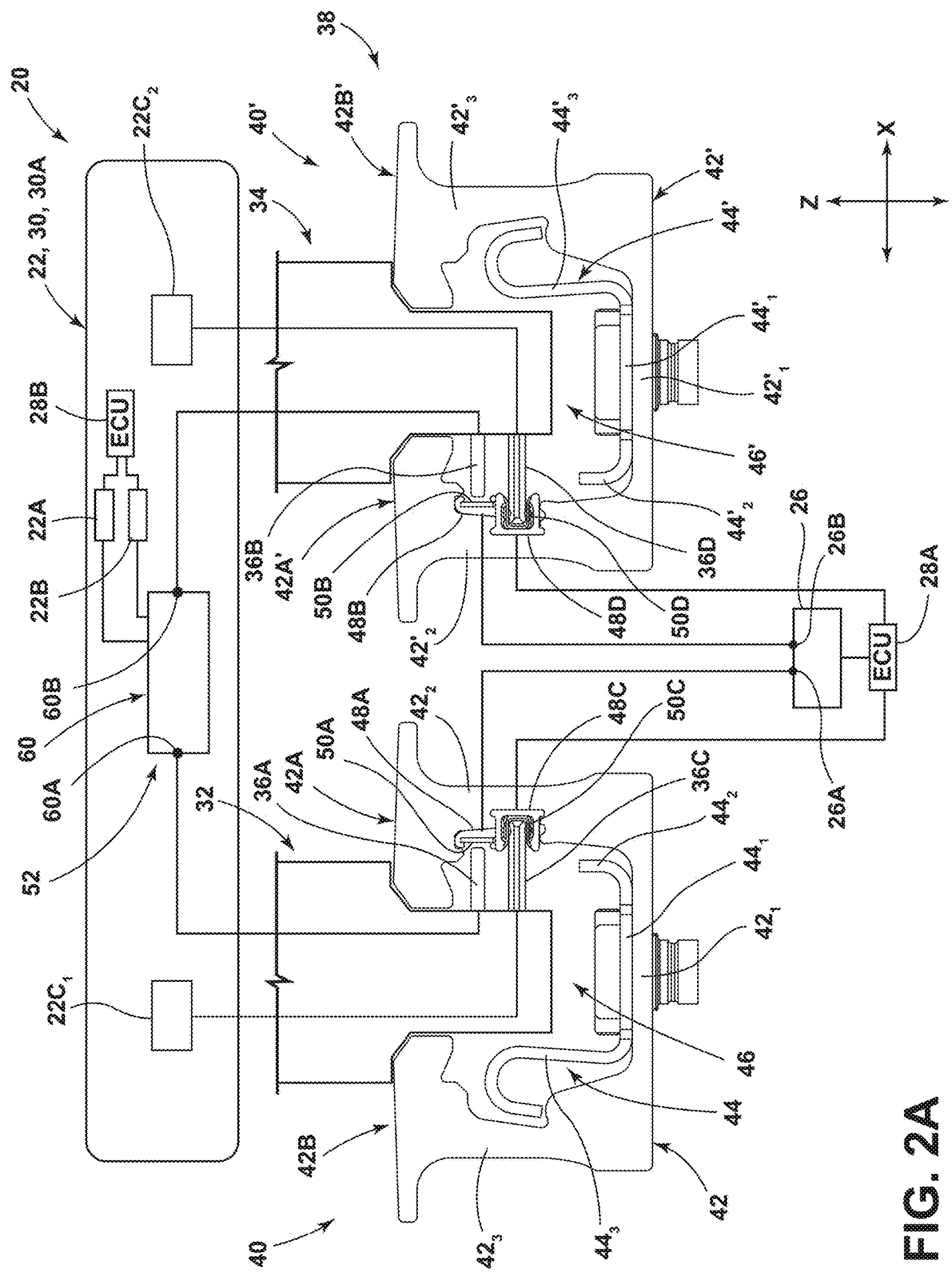
FIG. 2A is a cross-sectional view generally illustrating an embodiment of an electrical assembly with a support assembly connected in a first orientation according to teachings of the present disclosure.
Figure 2B:
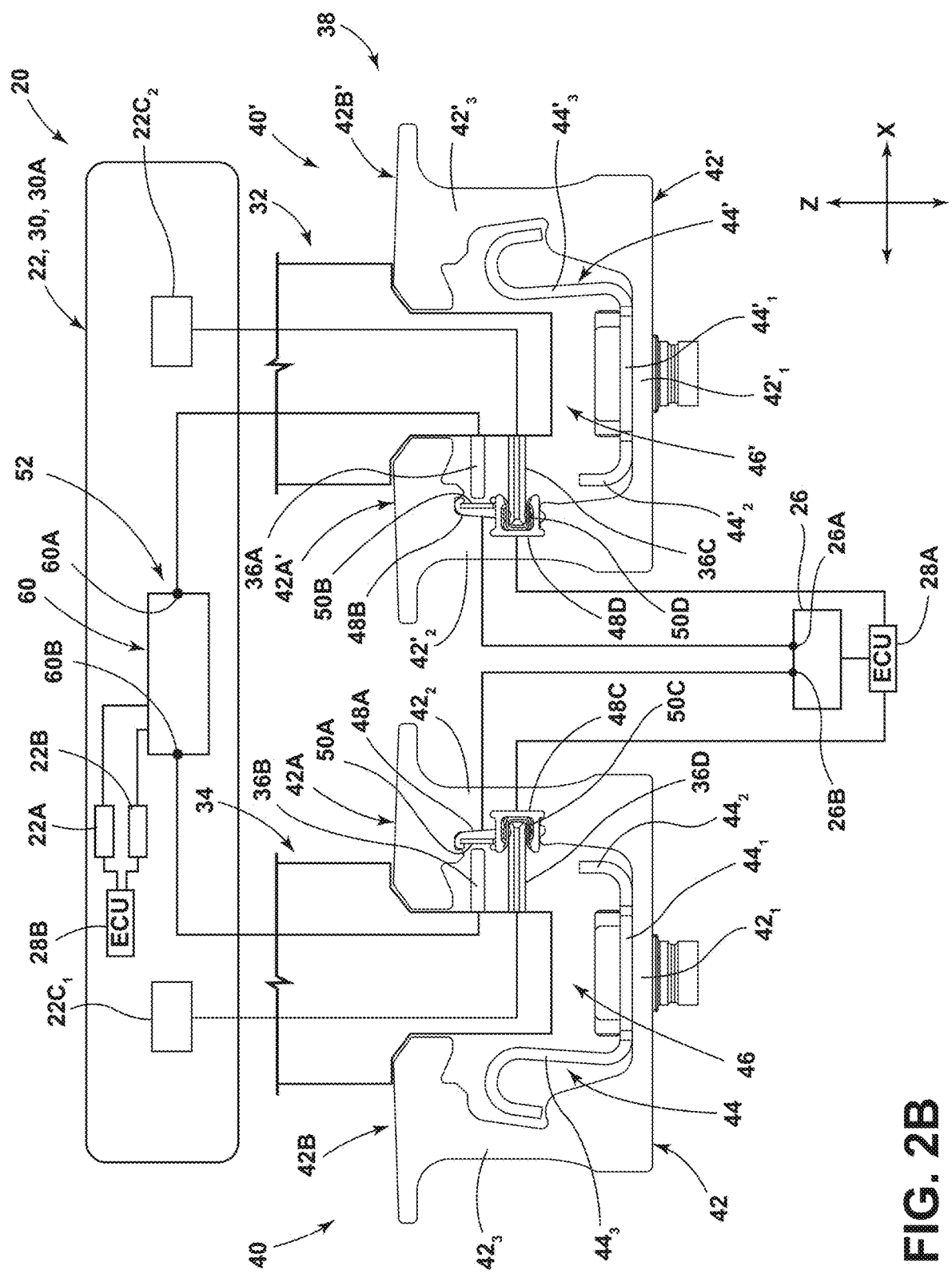
FIG. 2B is a cross-sectional view generally illustrating an embodiment of an electrical assembly with a support assembly connected in a second orientation according to teachings of the present disclosure.

In embodiments, such as generally illustrated in FIGS. 1, 2A, and 2B, an electrical assembly 20 may include a support assembly 22, a support member 30, a track assembly 38, and/or a control circuit 52. The control circuit 52 may include at least one of a switch/relay assembly 60, a diode assembly 80, and/or a switch assembly 90. The support member 30 may support and/or be connected to a seat 30A. The electrical assembly 20 may be configured to control, at least in part, movement of the support assembly 22. The support member 30 may be configured for selective connection (e.g., electrical and/or mechanical) with the track assembly 38. For example and without limitation, the support member 30 may be configured to provide electrical connection between the track assembly 38 and a support assembly 22, which may include a vehicle seat 30A and/or other elements that may be connected to the support member 30. The track assembly 38 may be connected to a mounting surface 24, such as a vehicle floor.

With embodiments, a support member 30 may be connected to and/or be configured to engage a track assembly 38. The support member 30 and/or the track assembly 38 may extend substantially longitudinally (e.g., in an X-direction). For example and without limitation, the support member 30 may move (e.g., slide, roll, translate, etc.) in a longitudinal direction along the track assembly 38. The support member 30 may selectively engage and/or disengage from the track assembly 38. The support member 30 may be inserted into and/or be removed from the track assembly 38 in a Z-direction (e.g., a vertical direction). The support member 30 may, for example and without limitation, include a cassette configuration.

In embodiments, such as generally illustrated in FIG. 2A, a track assembly 38 may include a first track 40 and/or a second track 40'. The first track 40 and/or the second track 40' may extend substantially in a longitudinal direction (e.g., the X-direction). The first track 40 and the second track 40' may be substantially the same and/or may be disposed in a mirrored configuration. The first track 40 may be offset in the Y-direction from the second track 40'. The first track 40 and/or the second track 40' may include substantially the same length. The support member 30 may include a first portion 32 and/or a second portion 34. The first portion 32 and/or the second portion 34 may selectively engage the first track 40 and/or the second track 40'. For example and without limitation, the first portion 32 of the support member 30 may engage the first track 40 and/or the second portion 34 of the support member 30 may engage the second track 40' (e.g., a forward facing support assembly 22), and/or the first portion 32 of the support member 30 may engage the second track 40' and/or the second portion 34 of the support member 30 may engage the first track 40 (e.g., a rearward facing support assembly 22).

With embodiments, the first track 40 and/or the second track 40' may include an outer track 42, 42' and/or an inner track 44, 44'. The outer tracks 42, 42' may include a first/bottom wall $42_1$, $42_1'$, a second wall $42_2$, $42_2'$, and/or a third wall $42_3$, $42_3'$. The bottom wall $42_1$, $42_1'$, the second wall $42_2$, $42_2'$, and/or the third wall $42_3$, $42_3'$ may be connected to form a generally U-shaped configuration. The bottom wall $42_1$, $42_1'$ may, for example, be substantially planar. The second wall $42_2$, $42_2'$, and/or the third wall $42_3$, $42_3'$ may extend perpendicularly (e.g., in the Z-direction) from opposite sides of the bottom wall $42_1$, $42_1'$. The second wall $42_2$, $42_2'$ may include a first portion 42A, 42A' and/or the third wall $42_3$, $42_3'$ may include a second portion 42B, 42B'. The first portion 42A, 42A' and/or the second portion 42B, 42B' may project laterally (e.g., in a Y-direction) toward a center of the track 40, 40'. The first portion 42A, 42A' and/or the second portion 42B, 42B' may be substantially planar. In embodiments, the first portion 42A, 42A' and/or the second portion 42B, 42B' may be disposed such that a gap 46, 46' may be provided between the first portion 42A, 42A' and the second portion 42B, 42B' (e.g., the first portion 42A, 42A' and the second portion 42B, 42B' may be offset in the Y-direction). The gap 46 may extend longitudinally along the track 40, and/or the gap 46 may be centered along the track 40.

In embodiments, the inner track 44, 44' may be disposed at least partially in the outer track 42, 42'. The inner track 44, 44' may, for example and without limitation, be substantially U-shaped. The inner track 44, 44' may include a first wall $44_1$, $44_1'$, a second wall $44_2$, $44_2'$, and/or a third wall $44_3$, $44_3'$. The second wall $44_2$, $44_2'$, may be shorter than the third wall $44_3$, $44_3'$. The second wall $44_2$, $44_2'$ and/or the third wall $44_3$, $44_3'$ may be at least partially bent and/or curved. The second wall $44_2$, $44_2'$ and the third wall $44_3$, $44_3'$ may extend perpendicularly (e.g., vertically) from the bottom wall $44_1$. The bottom wall $44_1$, $44_1'$ of the inner track 44, 44' may be generally aligned with and/or adjacent to the bottom wall $42_1$, $42_1'$ of the outer track 42, 42'. The second wall $44_2$, $44_2'$ of the inner track 44, 44' may be generally aligned with and/or adjacent to the second wall $42_2$, $42_2'$ of the outer track 42, 42'. The third wall $44_3$, $44_3'$ of the inner track 44, 44' may be generally aligned with and/or adjacent to the third wall $42_3$, $42_3'$ of the outer track 42, 42'.

With embodiments, such as generally illustrated in FIGS. 2A and 2B, the outer track 42 of the first track 40 may include a first recess 48A and a third recess 48C. The outer track 42' of the second track 40' may include a second recess 48B and a fourth recess 48D. The recesses 48A, 48B, 48C, 48D may be disposed between a top of the second wall $42_2$, $42_2'$ of the outer track 42, 42' and a top of the second wall $44_2$, $44_2'$ of the inner track 44, 44'. The recesses 48A, 48B, 48C, 48D may extend partially into the second walls $42_2$, $42_2'$ (e.g., in the Y-direction). The recesses 48A, 48B, 48C, 48D may include one or more of a variety of shapes, sizes, and/or configurations. For example and without limitation, the recesses 48A, 48B, 48C, 48D may be substantially rectangular, circular, and/or curved.

In embodiments, the first track 40 and/or the second track 40' may include one or more bus bars 50A, 50B, 50C, 50D (e.g., electrical conductors). The first track 40 may include a first bus bar 50A and/or a third bus bar 50C. The second track 40' may include a second bus bar 50B and/or a fourth bus bar 50D. The bus bars 50A, 50B, 50C, 50D may include one or more of a variety of shapes, sizes, and/or configurations. For example and without limitation, the bus bars 50A, 50B, 50C, 50D may be substantially U-shaped. The bus bars 50A, 50B, 50C, 50D may extend substantially longitudinally (e.g., in the X-direction). The bus bars 50A, 50B, 50C, 50D may be electrically conductive and/or include an electrically conductive material. The first bus bar 50A may be disposed at least partially in the first recess 48A of the first track 40, the second bus bar 50B may be disposed at least partially in the second recess 48B of the second track 40', the third bus bar 50C may be disposed at least partially in the third recess 48C of the first track 40, and/or the fourth bus bar 50D may be disposed at least partially in the fourth recess 48D of the second track 40'. The bus bars 50A, 50B, 50C, 50D may be disposed at least partially between the outer tracks 42, 42' and the inner tracks 44, 44' (e.g., in the Z-direction). The bus bars 50A, 50B, 50C, 50D may extend along part of or along the entire length of the first track 40 and/or second track 40'. The bus bars 50A, 50B may be electrically connected to a power source 26 (e.g., a vehicle battery) and may be configured to provide power from the power source 26 to the support member 30 at some or all points along the track 40.

With embodiments, the bus bars 50A, 50B may be configured for connection with a power source 26 and/or the first ECU 28A. For example and without limitation, the first bus bar 50A and/or the second bus bar 50B may be configured for connection to the power source 26. The first bus bar 50A and/or the second bus bar 50B may be configured to provide power to a support assembly 22 via the support member 30. The first bus bar 50A may connect to a first/positive terminal 26A of the power source 26, and/or the second bus bar 50B may connect to a second/negative terminal 26B, which may be connected to ground, of the power source 26. The first bus bar 50A and/or the second bus bar 50B may supply power to the second ECU 28B and/or to one or more electrical components 22C, $22C_1$, $22C_2$ (e.g., motors, heaters, fans, haptic devices, etc. as generally illustrated in FIGS. 1-2B) of support assembly 22 that may provide one or more functions (e.g., support assembly movement, heating, cooling, massage, etc.).

In embodiments, such as generally illustrated in FIGS. 2A and 2B, the support member 30 may include one or more conductors (e.g., conductors 36A, 36B, 36C, 36D). A first portion 32 of the support member 30 may include a first conductor 36A and/or a third conductor 36C. The second portion 34 of the support member 30 may include a second conductor 36B and/or a fourth conductor 36D. In a first orientation of the support assembly 22, the first conductor 36A may be configured for connection with the first bus bar 50A and/or the second conductor 36B may be configured for connection with the second bus bar 50B (see, e.g., FIG. 2A).

With embodiments, in a second orientation of the support assembly 22, the first conductor 36A may be configured for connection with the second bus bar 50B and/or the second conductor 36B may be configured for connection with the first bus bar 50A (see, e.g., FIG. 2B). In embodiments, the conductors 36A, 36B, 36C, 36D may include one or more of a variety of shapes, sizes, and/or configurations. For example and without limitation, the conductors 36A, 36B, 36C, 36D may be oval-shaped, rectangular, curved, rounded, and/or oblong. The conductors 36A, 36B, 36C, 36D may be substantially planar.

With embodiments, an electrical assembly 20 may include a first ECU 28A and/or a second ECU 28B. The first ECU 28A and/or the second ECU 28B may be configured to communicate with (e.g., receive information from, send information to, digitally communicate with, and/or sense a status/voltage of, etc.) the control circuit 52, such as with the switch/relay assembly 60, the diode assembly 80, and the switch assembly 90. The first ECU 28A and/or the second ECU 28B may be configured to sense the status of the control circuit 52 (e.g., such as voltage). The first ECU 28A may be connected to the track assembly 38. The second ECU 28B may be connected to the support member 30. The second ECU 28B may, for example and without limitation, be configured to control one or more functions/electrical components 22C of the support assembly 22. The control circuit 52 may be connected between (e.g., electrically) the bus bars 50A, 50B and the second ECU 28B. The first ECU 28A may be configured to receive information about the orientation of the support member 30 (and a seat 30A that may be connected thereto), such as via the second ECU 28B and/or the control circuit 52. For example and without limitation, the first ECU 28A may be configured to receive information from the second ECU 28B and/or the control circuit 52 indicating whether the support assembly 22 is forward facing or rearward facing.

In embodiments, the control circuit 52 may include a switch/relay assembly 60. The relay assembly 60 may be configured to connect the appropriate support assembly terminals 22A, 22B to the power source 26. For example and without limitation, the relay assembly 60 may be configured to connect the correct terminals 26A, 26B of the power source 26 to the appropriate support assembly terminals 22A, 22B (e.g., such that the first terminal 22A of the support assembly 22 is connected to the first terminal 26A of the power source 26 and the second terminal 22B is connected to the second terminal 26B of the power source 26, regardless of the orientation of the support assembly 22). The relay assembly 60 may include one or more relays (e.g., relays 62, 64) and/or one or more diodes (e.g., diode 74). The one or more relays may, for example and without limitation, include one or more electromechanical relays and/or one or more solid state relays. Upon connecting the support member 30 to the track 40, the relay assembly 60 may automatically connect the positive terminal 26A of the power source 26 to a positive terminal 22A of the support assembly 22. Additionally or alternatively, the relay assembly 60 may automatically connect the negative (e.g., ground) terminal 26B of the power source 26 to the negative terminal 22B of the support assembly 22. The relay assembly 60 may be disposed at least partially in the support member 30 and/or in the seat 30A.

Figure 3A:
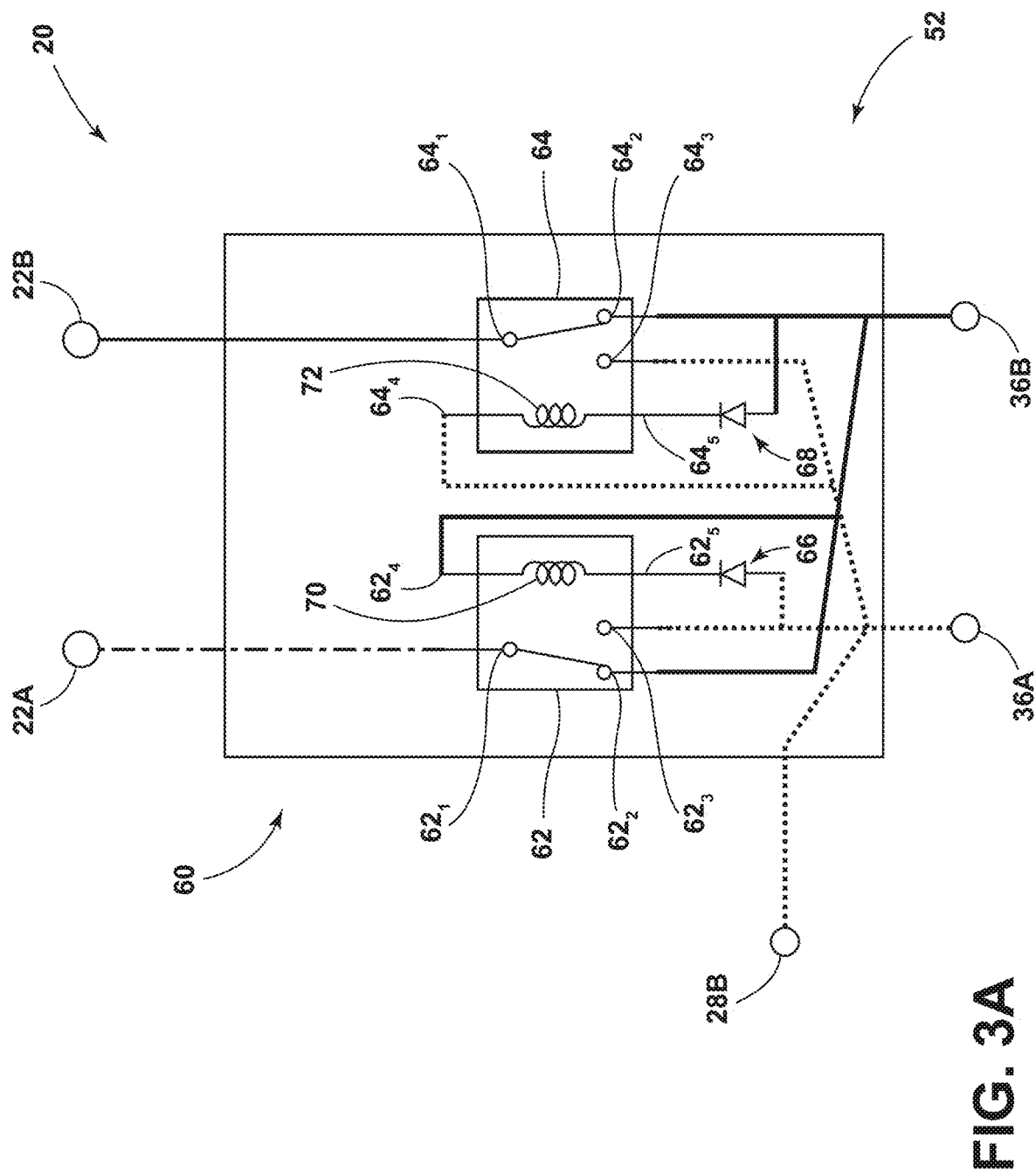
FIGS. 3A, 3B, and 3C are schematic views generally illustrating portions of embodiments of an electrical assembly according to teachings of the present disclosure.
Figure 3B:
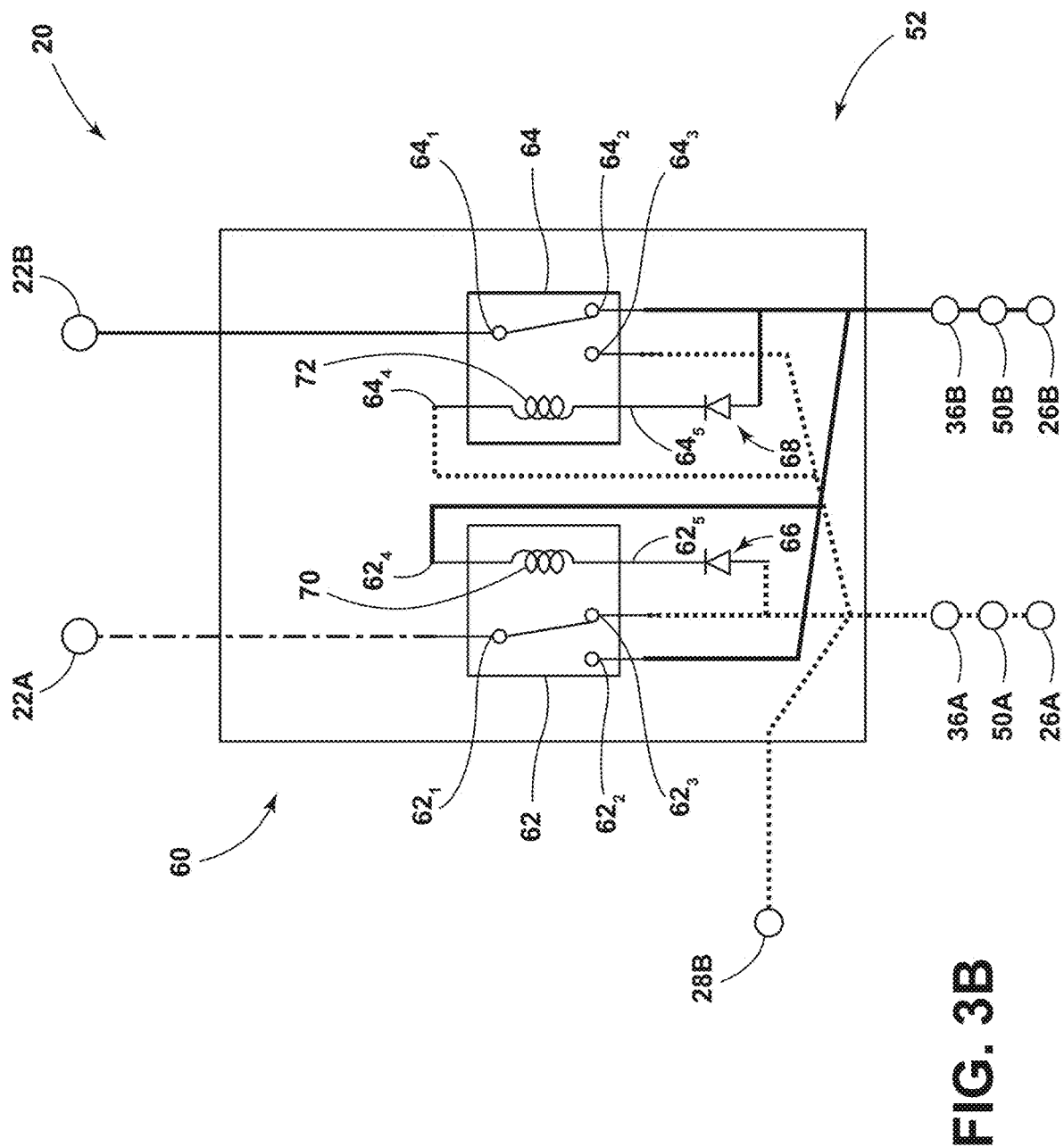
Figure 3C:
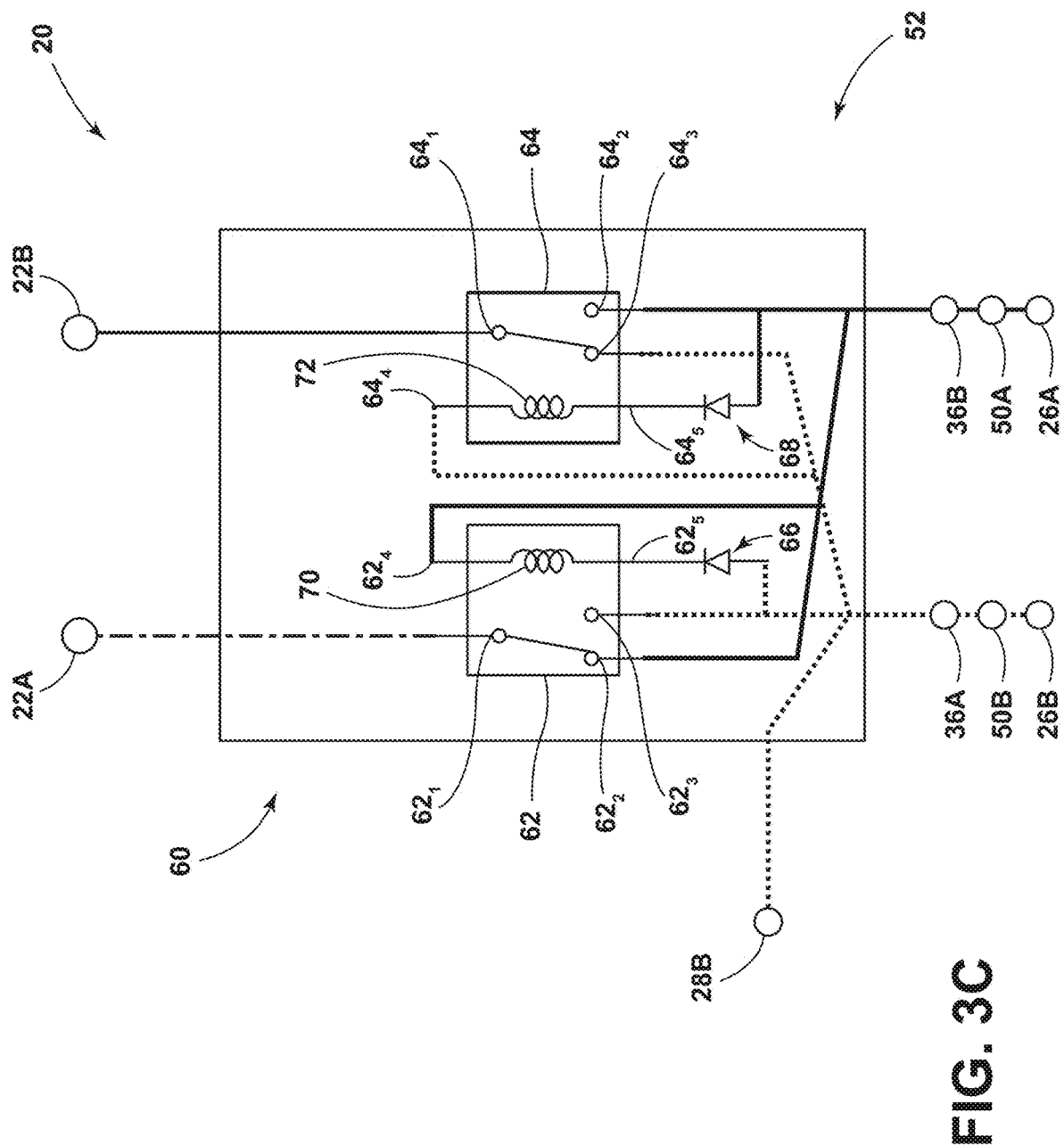

With embodiments, such as generally shown in FIGS. 3A, 3B, and 3C, the control circuit 52 (e.g., the relay assembly 60) may be configured to automatically connect the power source 26 to the correct terminals 22A, 22B of the support assembly 22 regardless of the orientation of the support assembly 22. The relay assembly 60 may include a first relay 62, a second relay 64, a first diode 66, and/or a second diode 68. The first relay 62 and/or the second relay 64 may include a first contact $62_1$, $64_1$, a second contact $62_2$, $64_2$, a third contact $62_3$, $64_3$, a fourth contact $62_4$, $64_4$, and/or a fifth contact $62_5$, $64_5$. The relays 62, 64 may be configured to selectively electrically connect the first contacts $62_1$, $64_1$ with the second contacts $62_2$, $64_2$ or the third contacts $62_3$, $64_3$.

In embodiments, the first relay 62 may be connected to the first diode 66 and/or the second relay 64 may be connected to the second diode 68. The first relay 62 (e.g., the first contact $62_1$) may be connected to the positive terminal 22A of the support assembly 22, and/or the second relay 64 (e.g., the first contact $64_1$) may be connected to the negative terminal 22B (e.g., ground) of the support assembly 22. The first relay 62 and/or the second relay 64 may include a first coil 70 and/or a second coil 72, respectively. The coils 70, 72 may be connected between the fourth contacts $62_4$, $64_4$ and the fifth contacts $62_5$, $64_5$ of the first relay 62 and the second relay 64, respectively. The first diode 66 may be connected to the fifth contact $62_5$ of the first relay 62. The first diode 66 may permit current flow into the fifth contact $62_5$ and/or may restrict current flow out of the fifth contact $62_5$. The second diode 68 may be connected to the fifth contact $64_5$ of the second relay 64. The second diode 68 may permit current flow into the fifth contact $64_5$ and/or may restrict current flow out of the fifth contact $64_5$. The second contact $62_2$ of the first relay 62 may be connected to the fourth contact $62_4$ of the first relay 62, the second contact $64_2$ of the second relay 64, the second diode 68, and/or the second conductor 36B. The third contact $62_3$ of the first relay 62 may be connected to the first diode 66, the fourth contact $64_4$ of the second relay 64, the third contact $64_3$ of the second relay 64, the first conductor 36A, and/or the second ECU 28B (e.g., to output support assembly position information).

With embodiments, such as generally shown in FIG. 3A, the relay assembly 60 may include a first state (e.g., an initial state). When the relay assembly 60 is in the first state, the support assembly 22 may not be connected to the track assembly 38, and/or the support assembly 22 may not be connected to the power source 26. In the first state of the relay assembly 60, the first contact $62_1$ of the first relay 62 may be connected to the second contact $62_2$, and/or the first contact $64_1$ of the second relay 64 may be connected to the second contact $64_2$. Additionally or alternatively, in the first state of the relay assembly 60, the first conductor 36A and/or the second conductor 36B may not be connected to the first bus bar 50A and/or the second bus bar 50B.

In embodiments, such as generally illustrated in FIG. 3B, the relay assembly 60 may include a second state which may correspond to the support assembly 22 being disposed in a first/forward-facing orientation and connected to the track assembly 38. When the relay assembly 60 is in the second state, the support assembly 22 may be connected to the track 40 and/or the support assembly 22 may be connected to the power source 26, such as via the first conductor 36A that may be connected to the first bus bar 50A (which may be connected to the positive terminal 26A) and/or via the second conductor 36B that may be connected to the second bus bar 50B (which may be connected to the negative terminal 26B).

With embodiments, connecting the positive terminal 26A of the power source 26 to the first conductor 36A may cause the first coil 70 to trigger (e.g., energize), which may connect the first contact $62_1$ of the first relay 62 to the third contact $62_3$ instead of the second contact $62_2$. Current may flow from the positive terminal 26A to the first bus bar 50A, to the first conductor 36A, through the first relay 62, and/or to the positive terminal 22A of the support assembly 22. The second coil 72 may not be energized, and/or the second diode 68 may prevent the second coil 72 from energizing when the first coil 70 is energized. In the second state, the first contact $64_1$ and second contact $64_2$ of the second relay 64 may remain connected. For example and without limitation, current may flow from the negative terminal 22B to the first contact $64_1$, to the second contact $64_2$, to the second conductor 36B, to the second bus bar 50B, and/or to the negative terminal 26B of the power source 26.

In embodiments, such as generally illustrated in FIG. 3C, the relay assembly 60 may include a third state that may correspond to the support assembly 22 being disposed in a rearward-facing orientation. When the relay assembly 60 is in the third state, the support assembly 22 may be connected to the track 40 and/or the support assembly 22 may be connected to the power source 26. When the relay assembly 60 is in the third state, the first bus bar 50A may be connected to the second conductor 36B, which may connect the positive terminal 26A of the power source 26 to the second conductor 36B. Additionally or alternatively, in the third state of the relay assembly 60, the second bus bar 50B may be connected to the first conductor 36A, which may connect the negative terminal 26B of the power source 26 to the first conductor 36A.

With embodiments, connecting the positive terminal 26A of the power source 26 to the second conductor 36B may cause the second coil 72 to trigger (e.g., energize), which may connect the first contact $64_1$ of the second relay 64 to the third contact $64_3$ instead of the second contact $64_2$. Current may flow from positive terminal 26A to the first bus bar 50A, to the second conductor 36B, through the first relay 62, and/or to the positive terminal 22A of the support assembly 22. The first coil 70 may not be energized, and/or the first diode 66 may prevent the first coil 70 from energizing when the second coil 72 is energized. The second bus bar 50B may be connected to the third contact $64_3$ of the second relay 64 and/or may be connected to the first contact $64_1$ of the second relay 64 such as to connect to the negative terminal 22B of the support assembly 22.

Figure 4A:
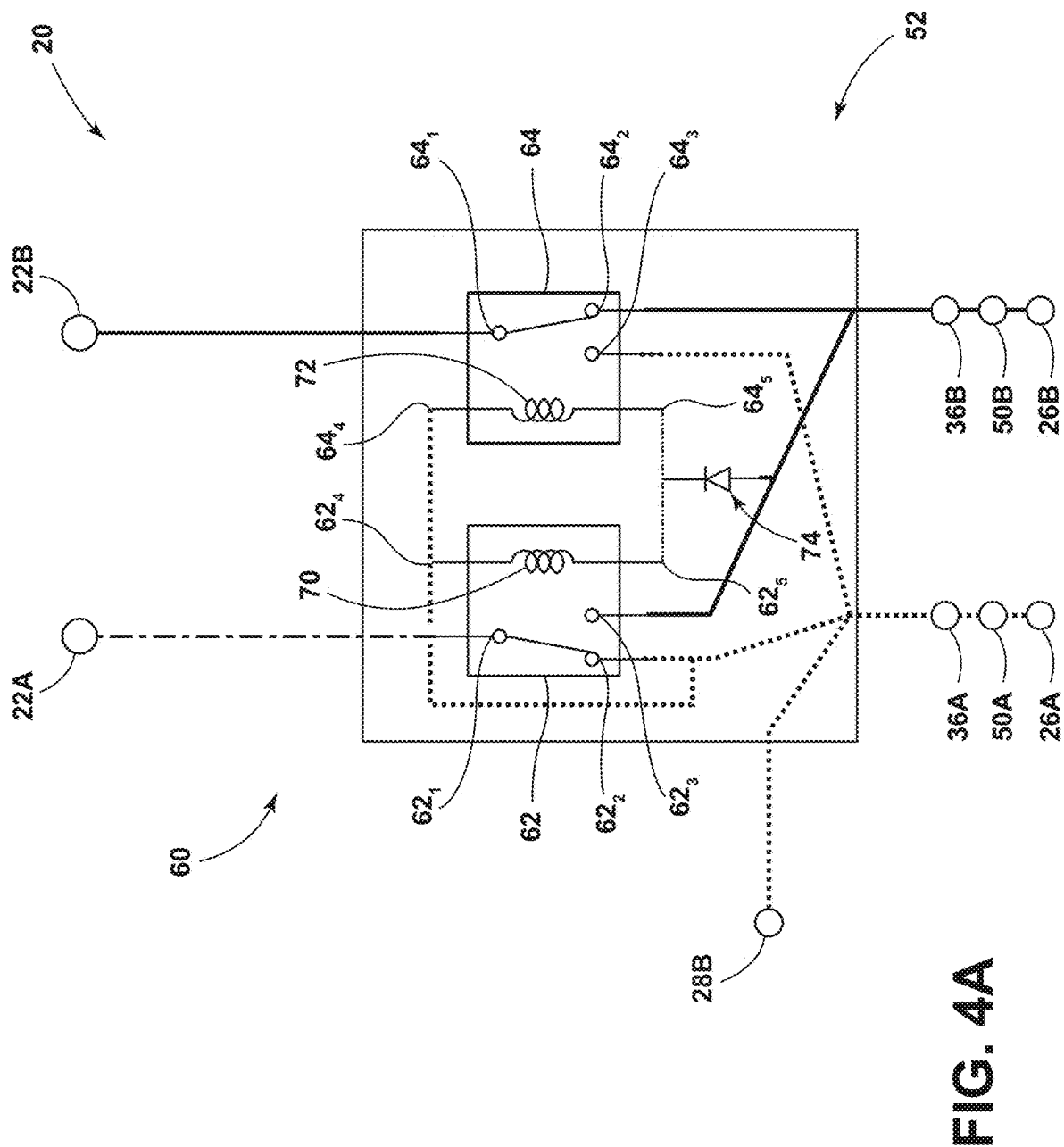
FIGS. 4A and 4B are schematic views generally illustrating portions of embodiments of an electrical assembly according to teachings of the present disclosure.
Figure 4B:
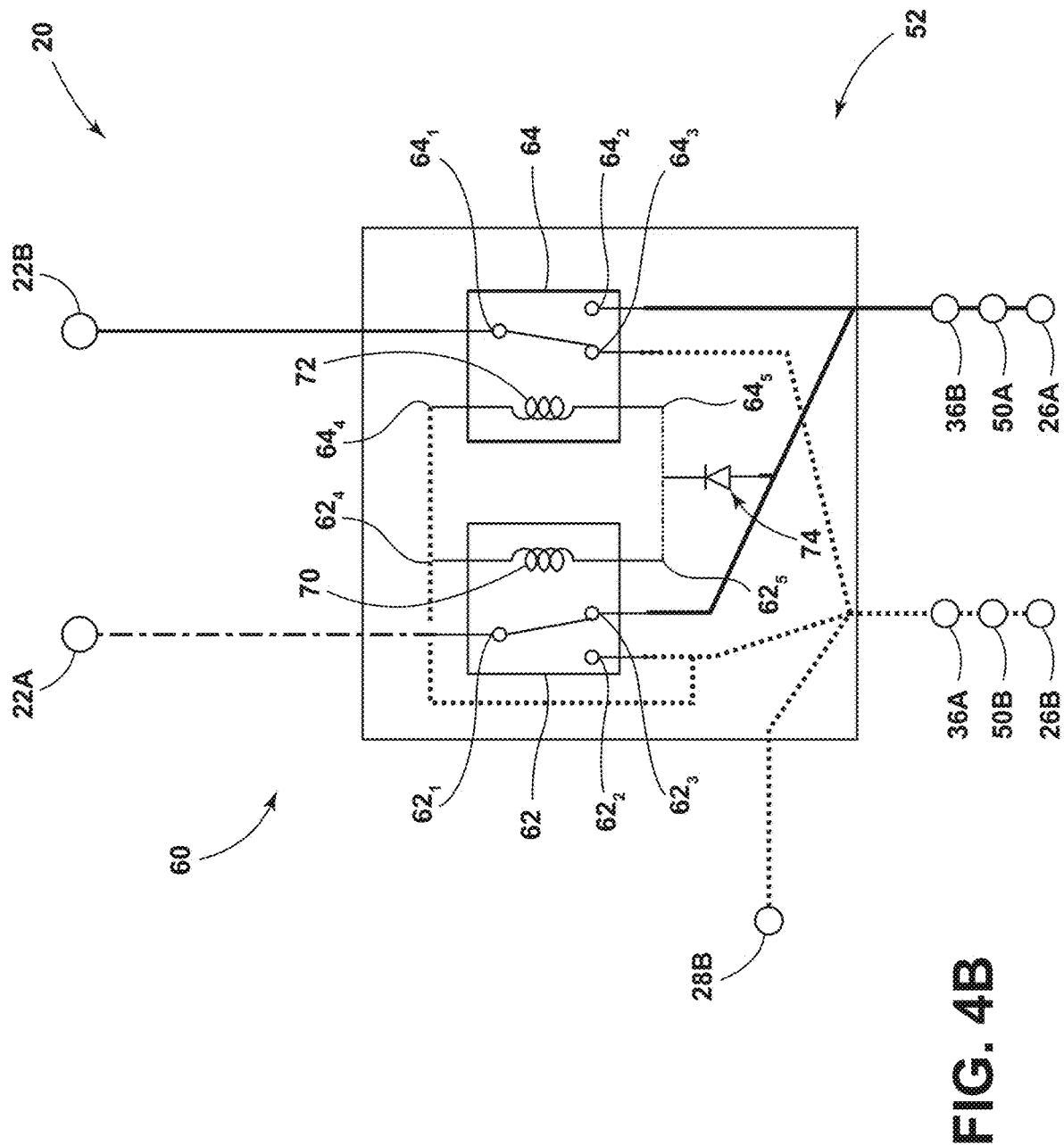

In embodiments, such as generally shown in FIGS. 4A and 4B, a control circuit 52 (e.g., relay assembly 60) may be configured to automatically connect the power source 26 to the correct terminals 22A, 22B of the support assembly 22 regardless of orientation. The relay assembly 60 may include a first relay 62, a second relay 64, and/or a diode 74. The first relay 62 and/or the second relay 64 may be connected to the diode 74. The first relay 62 (e.g., the first contact $62_1$) may be connected to the positive terminal 22A of the support assembly 22, and/or the second contact $64_2$ of the second relay 64 may be connected to the negative terminal 22B of the support assembly 22. The diode 74 may be connected to the fifth contact $62_5$ of the first relay 62 and the fifth contact $64_5$ of the second relay 64. The diode 74 may permit current flow from the second conductor 36B to the fifth contacts $62_5$, $64_5$ of the relays 62, 64 (and from the fifth contacts $62_5$, $64_5$ to the fourth contacts $62_4$, $64_4$), and/or may restrict current flow from the fifth contacts $62_5$, $64_5$ to the second conductor 36B (e.g., to prevent energizing the coils 70, 72 in the first orientation). The second contact $62_2$ of the first relay 62 may be connected to the first conductor 36A, the fourth contact $62_4$ of the first relay 62, the fourth contact $64_4$ of the second relay 64, the third contact $64_3$ of the second relay 64, and/or the second ECU 28B (e.g., to output seat position or other information). The third contact $62_3$ of the first relay 62 may be connected to the second conductor 36B, the diode 74, and/or the second contact $64_2$ of the second relay 64.

With embodiments, such as generally illustrated in FIG. 4A, the relay assembly 60 may include a first state that may correspond to the support assembly 22 being disposed in a first/forward-facing orientation. When the relay assembly 60 is in the first state, the support assembly 22 may be connected to the track 40 and/or support assembly 22 may be connected to the power source 26. When the relay assembly 60 is in the first state, the first bus bar 50A may be connected to the first conductor 36A, which may connect the first conductor 36A with the positive terminal 26A of the power source 26. Additionally or alternatively, in the first state of the relay assembly 60, the second bus bar 50B may be connected to the second conductor 36B, which may connect the second conductor 36B with the negative terminal 26B of the power source 26.

In embodiments, connecting the positive terminal 26A of the power source 26 to the first conductor 36A may not cause the first coil 70 and/or the second coil 72 to trigger (e.g., energize). The first contacts $62_1$, $64_1$ of the relays 62, 64 may remain connected to the second contacts $62_2$, $64_2$. Current may flow from the positive terminal 26A of the power source 26 to the first bus bar 50A, to the first conductor 36A, through the first relay 62, and/or to the positive terminal 22A of the support assembly 22. The first coil 70 and/or the second coil 72 may not be energized, and/or the diode 74 may prevent the first coil 70 and/or the second coil 72 form energizing when the support assembly 22 is in the forward-facing orientation. The second bus bar 50B may be connected via the second conductor 36B to the second contact $64_2$ of the second relay 64 and/or may be connected to the first contact $64_1$ of the second relay 64, such as to connect the negative terminal 26B of the power source 26 to the negative terminal 22B of the support assembly 22.

With embodiments, such as generally illustrated in FIG. 4B, the relay assembly 60 may include a second state that may correspond to the support assembly 22 being disposed in a second/rearward facing orientation. When the relay assembly 60 is in the second state, the support assembly 22 may be connected to the track 40 and/or the support assembly 22 may be connected to the power source 26. When the relay assembly 60 is in the second state, the first bus bar 50A may be connected to the second conductor 36B, which may connect the second conductor 36B with the positive terminal 26A of the power source 26. Additionally or alternatively, in the second state of the relay assembly 60, the second bus bar 50B may be connected to the first conductor 36A, which may connect the first conductor 36A with the negative terminal 26B of the power source 26.

In embodiments, connecting the positive terminal 26A of the power source 26 to the second conductor 36B may cause the first coil 70 and/or the second coil 72 to trigger (e.g., trip/energize) which may connect the first contacts $62_1$, $64_1$ of the relays 62, 64 to the third contacts $62_3$, $64_3$ instead of the second contacts $62_2$, $64_2$. Current may flow from the positive terminal 26A to the first bus bar 50A, to the second conductor 36B, through the first relay 62, and/or to the positive terminal 22A of the support assembly 22. The diode 74 may prevent current from flowing through the second relay 64 to the negative terminal 22B of the support assembly 22. The second bus bar 50B (e.g., ground) may be connected to the third contact $64_3$ of the second relay 64, which may be connected to the first contact $64_1$ of the second relay 64 (which may be connected to the negative terminal 22B of the support assembly 22).

Figure 5A:
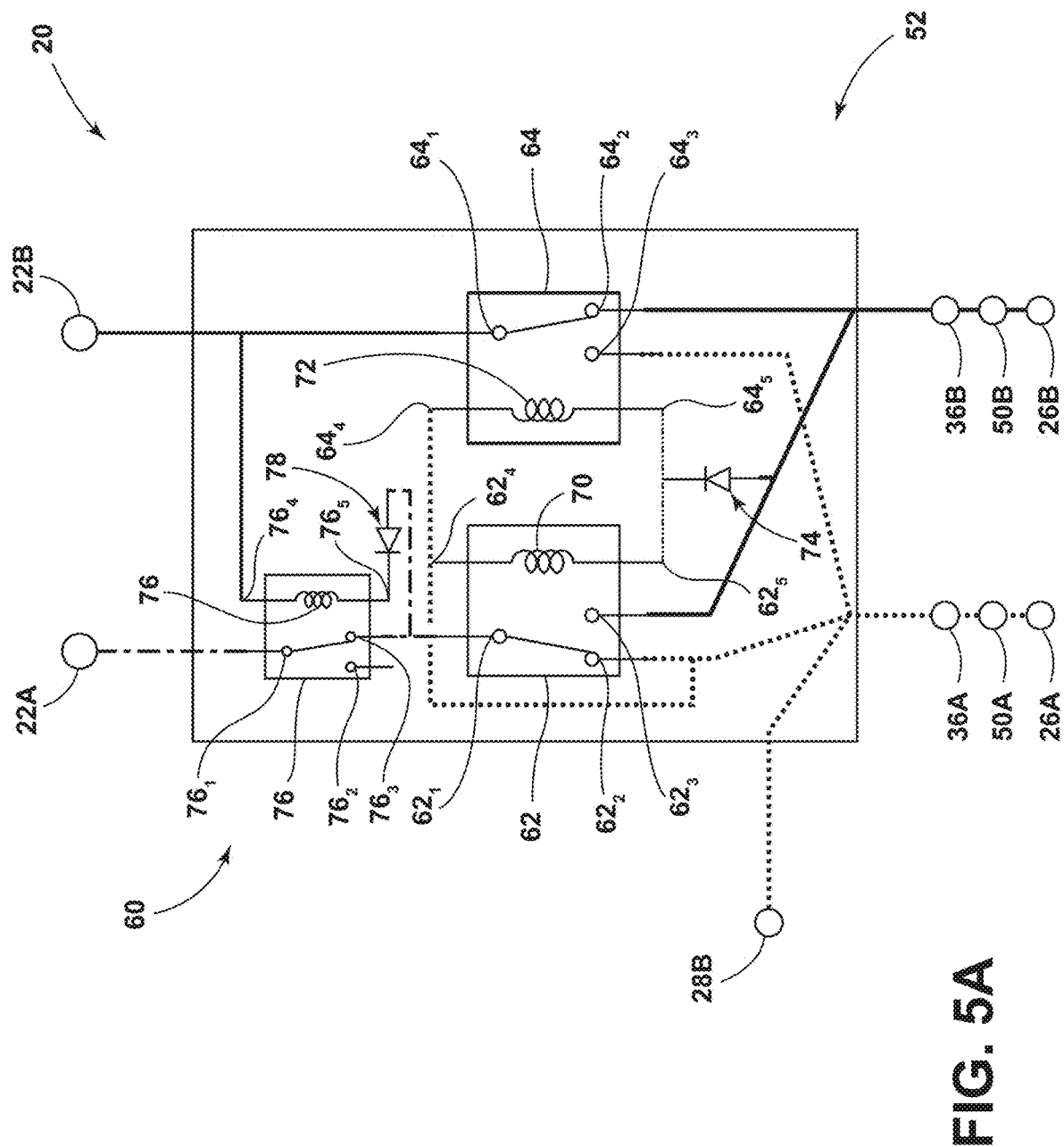
FIGS. 5A and 5B are schematic views generally illustrating portions of embodiments of an electrical assembly according to teachings of the present disclosure.
Figure 5B:
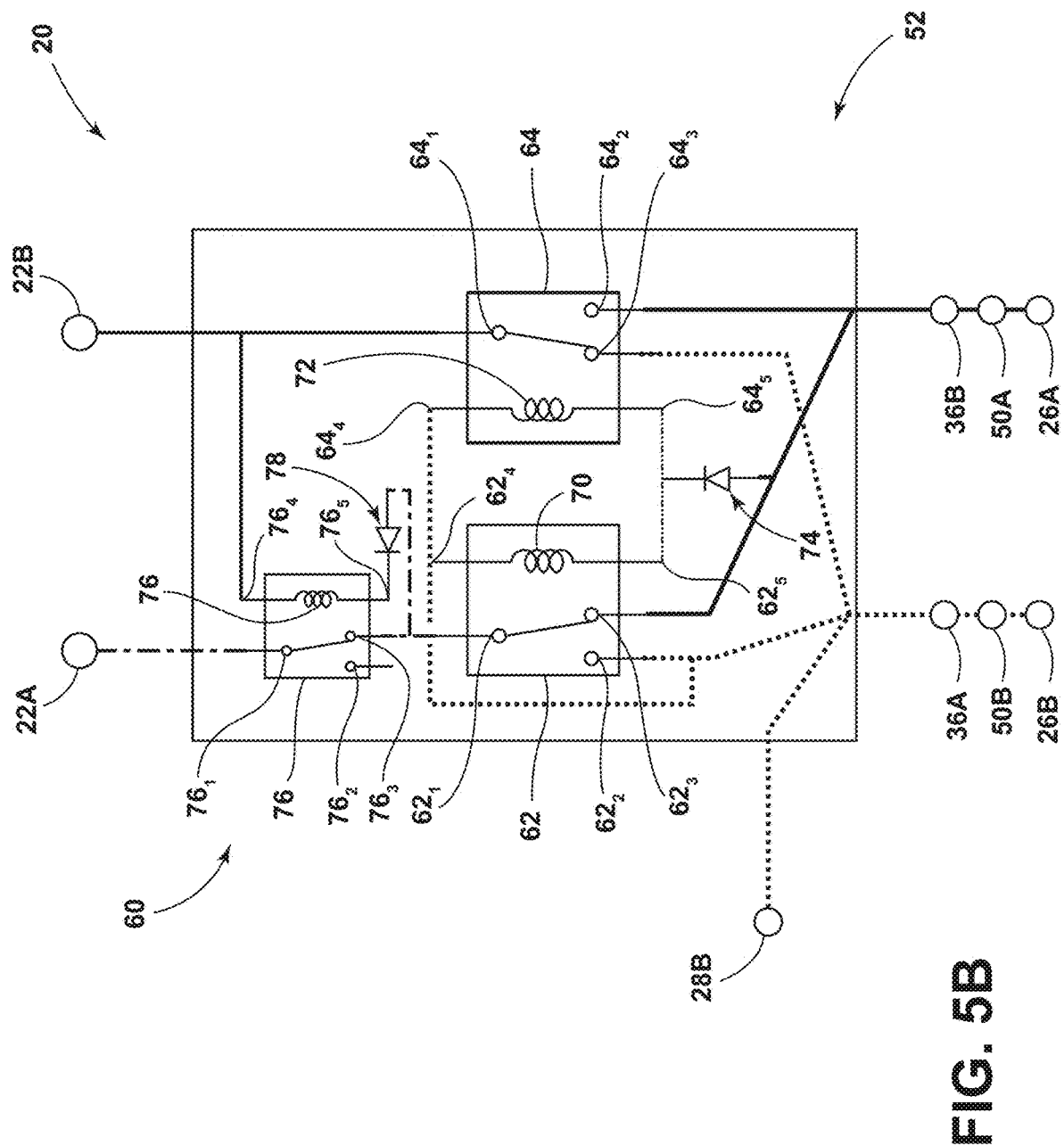

With embodiments, such as generally illustrated in FIGS. 5A and 5B, a control circuit 52 (e.g., the relay assembly 60) may include a first relay 62, a second relay 64, a third relay 76, a first diode 74, and/or a second diode 78 (e.g., a pulse diode). The third relay 76 may include a first contact $76_1$, a second contact $76_2$, a third contact $76_3$, a fourth contact $76_4$, and/or a fifth contact $76_5$. The third relay 76 may include a third coil 76A that may be connected between the fourth contact $76_4$ and the fifth contact $76_5$. The first contact $76_1$ may be connected to the second contact $76_2$, which may be configured as an open contact, when the third coil 76A is not energized, and/or the first contact $76_1$ may be connected to the third contact $76_3$ when the third coil 76A is energized. The first contact $76_1$ of the third relay 76 may be connected to the positive terminal 22A of the support assembly 22. The fourth contact $76_4$ of the third relay 76 may be connected to the first contact $64_1$ of the second relay 64 and/or the negative terminal 22B (e.g., ground) of the support assembly 22. The pulse diode 78 may be connected to the third contact $76_3$ of the third relay 76, the fifth contact $76_5$ of the third relay 76, and/or the first contact $62_1$ of the first relay 62. The pulse diode 78 may be configured to permit current flow into the fifth contact $76_5$ of the third relay 76 and/or may restrict or prevent current flow out from the fifth contact $76_5$ (e.g., to prevent energizing the coils 70, 72 in the first orientation). The first contact $62_1$ of the first relay 62 may be connected to the third contact $76_3$ of the third relay 76.

In embodiments, the third relay 76 and/or the pulse diode 78 of the relay assembly 60 may isolate the first relay 62 and/or the second relay 64 during switching (e.g., coil energizing). Switching the polarity of the contacts at the first conductor 36A and/or second conductor 36B may result in a reverse battery pulse. The pulse diode 78 and/or third relay 76 switching delay may limit the reverse battery pulse from affecting the support assembly 22 (e.g., internal circuitry of the support assembly 22, the second ECU 28B, and/or electrical components 22C that may be connected to the support assembly 22).

In embodiments, such as generally illustrated in FIG. 5A, the relay assembly 60 may include a first state that may correspond to the support assembly 22 being disposed in a first/forward-facing orientation. When the relay assembly 60 is in the first state, the support assembly 22 may be connected to the track 40 and/or the support assembly 22 may be connected to the power source 26. When the relay assembly 60 is in the first state, the first bus bar 50A may be connected to the first conductor 36A, which may connect the first conductor 36A with the positive terminal 26A of the power source 26. Additionally or alternatively, in the first state of the relay assembly 60, the second bus bar 50B may be connected to the second conductor 36B, which may connect the second conductor 36B with the negative terminal 26B of the power source 26.

With embodiments, connecting the positive terminal 26A of the power source 26 to the first conductor 36A may not cause the first coil 70 and/or the second coil 72 to trigger (e.g., energize). The first contacts $62_1$, $64_1$ of the relays 62, 64 may remain connected to the second contacts $62_2$, $64_2$. Connecting the positive terminal 22A to the first conductor 36A may cause the third coil 76A to energize. For example and without limitation, current may flow from the positive terminal 26A, to the first bus bar 50A, to the first conductor 36A, to the first contact $62_1$ of the first relay 62, to the pulse diode 78, to the fifth contact $76_5$ of the third relay 76, and to the third coil 76A, which may energize the third coil 76A. Energizing the third coil 76A may cause the first contact $76_1$ of the third relay 76 to disconnect from the second contact $76_2$ and connect to the third contact $76_3$, which may connect the positive terminal 26A of the power source 26 to the positive terminal 22A of the support assembly 22.

In embodiments, such as generally illustrated in FIG. 5B, the relay assembly 60 may include a second state that may correspond to the support assembly 22 being disposed in a second/rearward-facing orientation. When the relay assembly 60 is in the second state, the support assembly 22 may be connected to the track assembly 38 and/or support assembly 22 may be connected to the power source 26. When the relay assembly 60 is in the second state, the first bus bar 50A may be connected to the second conductor 36B, which may connect the second conductor 36B with the positive terminal 26A of the power source 26. Additionally or alternatively, in the second state of the relay assembly 60, the second bus bar 50B may be connected to the first conductor 36A, which may connect the first conductor 36A with the negative terminal 26B of the power source 26.

With embodiments, connecting the positive terminal 26A of the power source 26 to the second conductor 36B may cause the first coil 70 and/or the second coil 72 to trigger (e.g., energize). The first contacts $62_1$, $64_1$ of the first relay 62 and the second relay 64 may disconnect from the second contacts $62_2$, $64_2$ and/or may connect to the third contacts $62_3$, $64_3$. Current may flow from the positive terminal 26A of the power source 26 to the first bus bar 50A, to the second conductor 36B, to the third contact $62_3$ of the first relay 62, to the first contact $62_1$ of the first relay 62, to the third contact $76_3$ of the third relay 76, and/or to the pulse diode 78, which may energize the third coil 76A. Energizing the third coil 76A may cause the first contact $76_1$ of the third relay 76 to disconnect from the second contact $76_2$ and connect to the third contact $76_3$, which may connect the positive terminal 26A of the power source 26 to the positive terminal 22A of the support assembly 22 via the second conductor 36B.

Figure 6A:
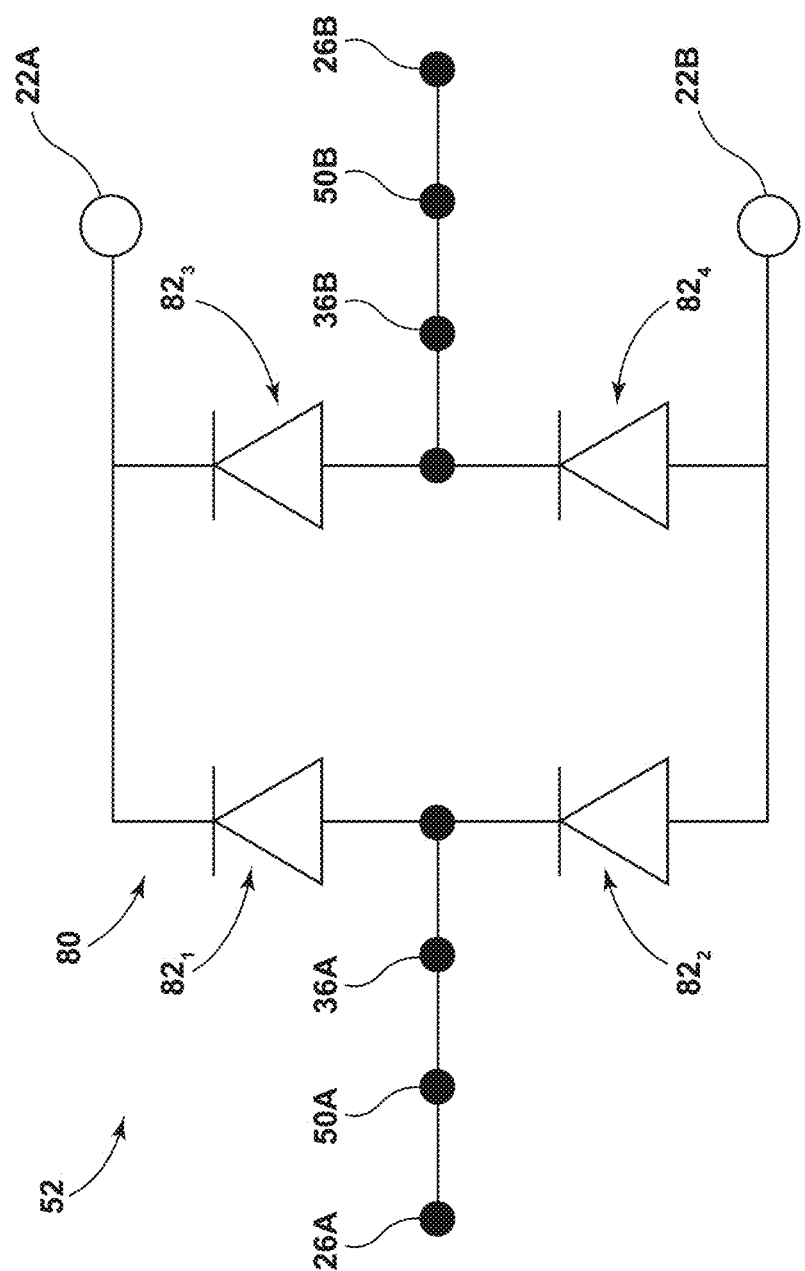
FIGS. 6A and 6B are schematic views generally illustrating portions of an embodiment of a control circuit an electrical assembly according to teachings of the present disclosure.
Figure 6B:
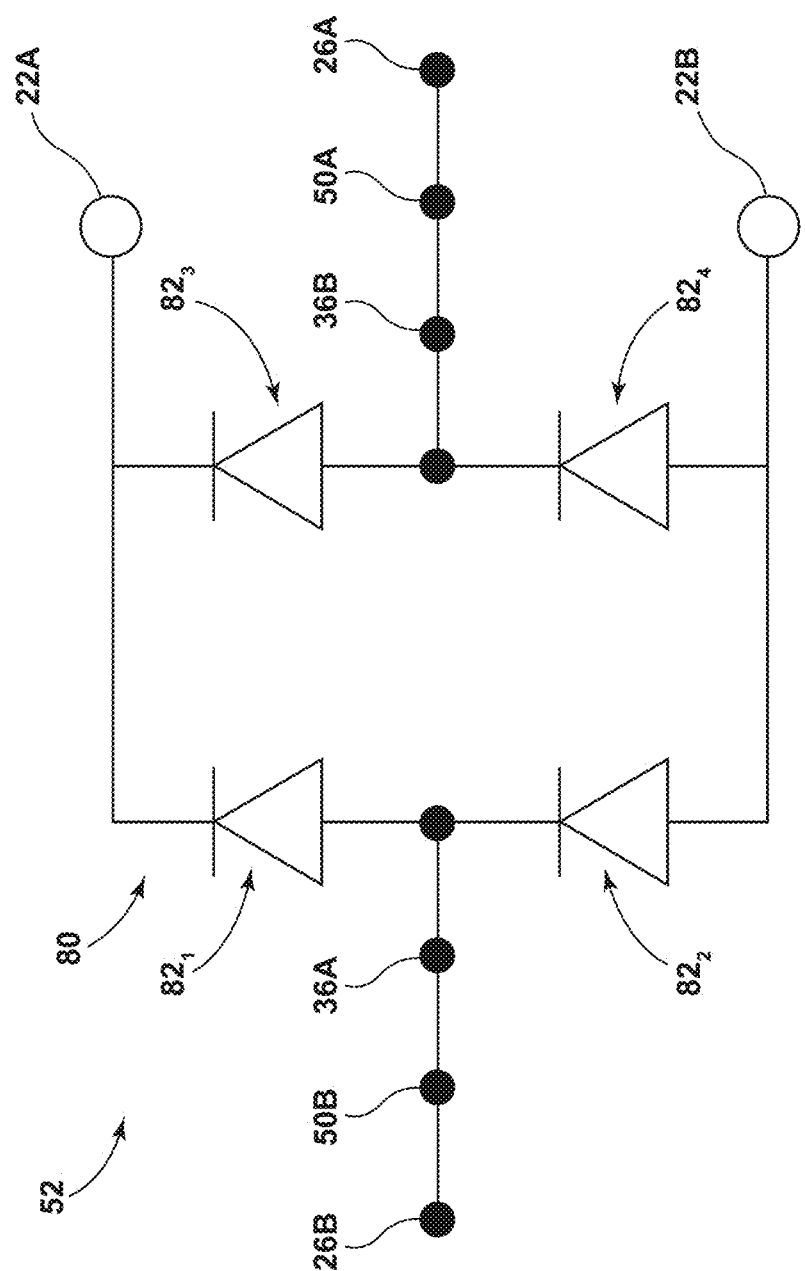

In embodiments, such as generally illustrated in FIGS. 6A and 6B, a control circuit 52 may include a diode assembly 80. The diode assembly 80 may include diodes (e.g., diodes $82_1$, $82_2$, $82_3$, $82_4$) and may or may not include electromechanical components such as relays and/or switches. The diode assembly 80 may be configured to connect the correct terminals 26A, 26B of the power source 26 to the appropriate support assembly terminals 22A, 22B (e.g., such that the first terminal 22A of the support assembly 22 is connected to the first terminal 26A of the power source 26 and the second terminal 22B is connected to the second terminal 26B of the power source 26, regardless of the orientation of the support assembly 22). The diode assembly 80 may include a first diode $82_1$, a second diode $82_2$, a third diode $82_3$, and/or a fourth diode $82_4$. The first diode $82_1$, the second diode $82_2$, the third diode $82_3$, and the fourth diode $82_4$ may be connected as a bridge circuit. The first conductor 36A may be connected between the first diode $82_1$ and the second diode $82_2$. The second conductor 36B may be connected between the third diode $82_3$ and the fourth diode $82_4$. A diode assembly 80 may include and/or be connected to one or more other passive electrical components (e.g., additional diodes or other components).

In embodiments, such as generally illustrated in FIG. 6A, if the support assembly 22 is in a first/forward orientation, the first conductor 36A may be connected to the first bus bar 50A and the positive terminal 26A of the power source 26 and/or the second conductor 36B may be connected to the second bus bar 50B and the negative terminal 26B of the power source 26. Current may flow from the positive terminal 26A to the first bus bar 50A, to the first conductor 36A, through the first diode $82_1$, and to the first terminal 22A of the support assembly 22. In the first orientation, the second diode $82_2$ and/or the third diode $82_3$ may block current from flowing from the positive terminal 26A to the second terminal 22B of the support assembly 22. In the first orientation, current may flow from the second terminal 22B of the support assembly 22 through the fourth diode $82_4$ to the second conductor 36B, the second bus bar 50B, and/or the negative terminal 26B of the power source 26.

In embodiments, such as generally illustrated in FIG. 6B, if the support assembly 22 is in a second/rearward orientation, the first conductor 36A may be connected to the second bus bar 50B and the negative terminal 26B of the power source 26, and/or the second conductor 36B may be connected to the first bus bar 50A and the positive terminal 26A of the power source 26. Current may flow from the positive terminal 26A to the first bus bar 50A to the second conductor 36B, through the third diode $82_3$ and to the first terminal 22A of the support assembly 22. In the second orientation, the first diode $82_1$ and/or the fourth diode $82_4$ may block current from flowing from the positive terminal 26A to the second terminal 22B of the support assembly 22. In the second orientation, current may flow from the second terminal 22B of the support assembly 22 through the second diode $82_2$ to the first conductor 36A, the second bus bar 50B, and/or the negative terminal 26B of the power source 26.

Figure 7A:
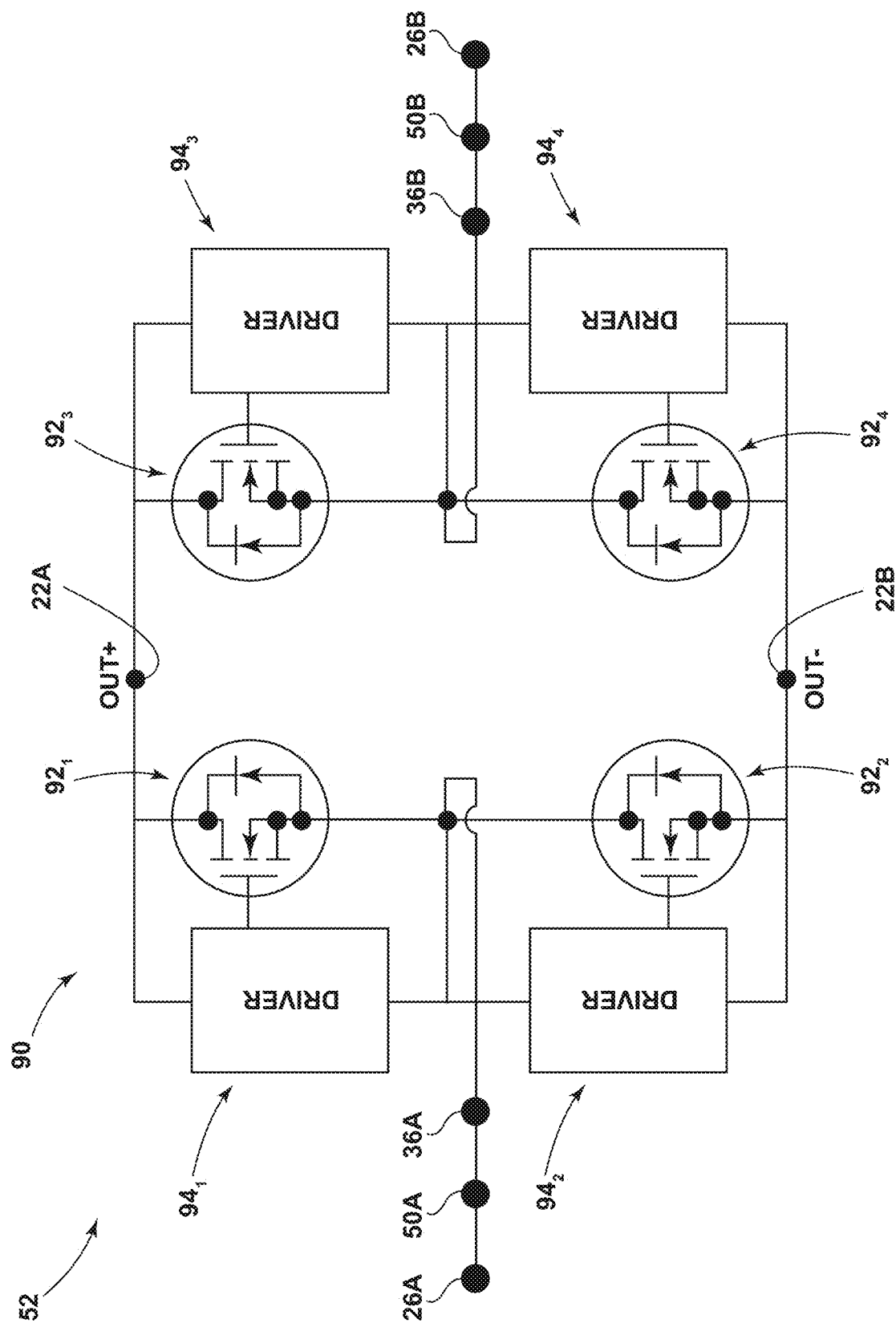
FIGS. 7A and 7B are schematic view generally illustrating portions of an embodiment of a control circuit of an electrical assembly according to teachings of the present disclosure.
Figure 7B:
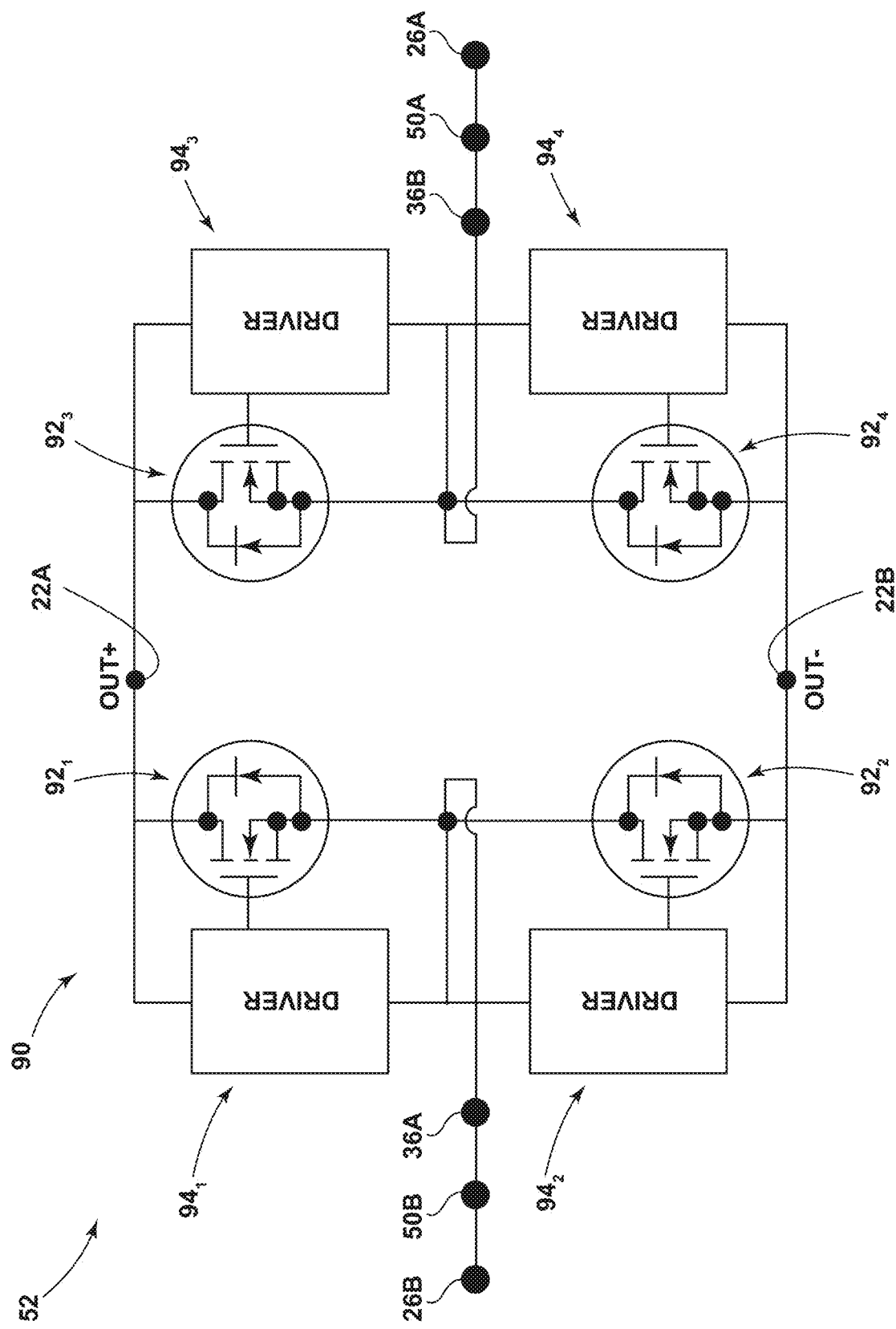

With embodiments, such as generally illustrated in FIGS. 7A and 7B, a control circuit 52 may include a switch assembly 90. The switch assembly 90 may be configured to connect the power source 26 to the support assembly 22 with the correct polarity regardless of the orientation of the support assembly 22. For example and without limitation, the switch assembly 90 may be configured to connect the correct terminals 26A, 26B of the power source 26 to the appropriate support assembly terminals 22A, 22B (e.g., such that the first terminal 22A of the support assembly 22 is connected to the first terminal 26A of the power source 26 and the second terminal 22B is connected to the second terminal 26B of the power source 26, regardless of the orientation of the support assembly 22).

With embodiments, switches of the switch assembly 90 may include one or more of a variety of configurations. The switch assembly 90 may include switches (e.g., the switch assembly 90 may or may not include electromechanical components such as electromechanical relays). For example and without limitation, the switch assembly 90 may include a first switch $92_1$, a second switch $92_2$, a third switch $92_3$, and/or a fourth switch $92_4$ that may include silicon-based switches, transistors, and/or metal-oxide field effect transistors (MOSFETs), among other configurations. The first switch $92_1$ may be connected to a first driver $94_1$, the second switch $92_2$ may be connected to a second driver $94_2$, the third switch $92_3$ may be connected to a third driver $94_3$, and/or the fourth switch $92_4$ may be connected to a fourth driver $94_4$. The first switch $92_1$, the second switch $92_2$, the third switch $92_3$, and the fourth switch $92_4$ may be connected as a bridge circuit. The drivers $94_1$, $94_2$, $94_3$, $94_4$ may be configured to activate the switches $92_1$, $92_2$, $92_3$, $92_4$, respectively. The drivers $94_1$, $94_2$, $94_3$, $94_4$ may not carry power, but may set the gate voltage of the switches $92_1$, $92_2$, $92_3$, $92_4$ such that the switches $92_1$, $92_2$, $92_3$, $92_4$ may selectively open. The first conductor 36A may be connected between the first switch $92_1$ and the second switch $92_2$. The second conductor 36B may be connected between the third switch $92_3$ and the fourth switch $92_4$. The switch assembly 90 may include and/or be connected to one or more other passive electrical components (e.g., additional switches, one or more diodes, etc.).

In embodiments, such as generally illustrated in FIG. 7A, if the support assembly 22 is in a first/forward orientation, the first conductor 36A may be connected to the first bus bar 50A and the positive terminal 26A of the power source 26 and/or the second conductor 36B may be connected to the second bus bar 50B and the negative terminal 26B of the power source 26. Current may flow from the positive terminal 26A to the first bus bar 50A, to the first conductor 36A, and to the first switch $92_1$ and the first driver $94_1$. The first driver $94_1$ may activate the first switch $92_1$ to allow current to flow to the first terminal 22A of the support assembly 22. In the first orientation, the second switch $92_2$ and/or the third switch $92_3$ may not be activated and may block current from flowing from the positive terminal 26A to the second terminal 22B of the support assembly 22. In the first orientation, current may flow from the second terminal 22B of the support assembly 22 to the fourth switch $92_4$ and the fourth driver $94_4$. The fourth driver $94_4$ may activate the fourth switch $92_4$ to allow current to flow from the fourth switch $92_4$ to the negative terminal 26B of the power source 26.

In embodiments, such as generally illustrated in FIG. 7B, if the support assembly 22 is in a second/rearward orientation, the first conductor 36A may be connected to the second bus bar 50B and the negative terminal 26B of the power source 26, and/or the second conductor 36B may be connected to the first bus bar 50A and the positive terminal 26A of the power source 26. Current may flow from the positive terminal 26A to the first bus bar 50A, to the second conductor 36B, and to the third switch $92_3$ and the third driver $94_3$. The third driver $94_3$ may activate the third switch $92_3$ to allow current to flow to the first terminal 22A of the support assembly 22. In the second orientation, the first switch $92_1$ and/or the fourth switch $92_4$ may not be activated and may block current from flowing from the positive terminal 26A to the second terminal 22B of the support assembly 22. In the second orientation, current may flow from the second terminal 22B of the support assembly 22 to the second switch $92_2$ and the second driver $94_2$. The second driver $94_2$ may activate the second switch $92_2$ to allow current to flow to the first conductor 36A, the second bus bar 50B, and/or the negative terminal 26B of the power source 26.

With embodiments, switches and drivers of a switch assembly 90 (e.g., switches $92_1$, $92_2$, $92_3$, $92_4$ and drivers $94_1$, $94_2$, $94_3$, $94_4$) may be configured for automatic activation (e.g., independent of any separate controllers, such as the ECUs 28A, 28B). If the correct polarity is provided to a switch and a driver, the driver may automatically activate the switch. If the reverse polarity is provided to the switch and the driver, the driver may not activate the switch. The switches $92_1$, $92_2$, $92_3$, $92_4$ may, for example and without limitation, be connected in a bridge configuration.

In embodiments, a control circuit 52, a diode assembly 80, and/or a switch assembly 90 may include at least four electrical components (e.g., non-electromechanical components) configured to connect the correct terminals 26A, 26B of the power source 26 to the appropriate support assembly terminals 22A, 22B regardless of the orientation of the support assembly 22.

Figure 7C:
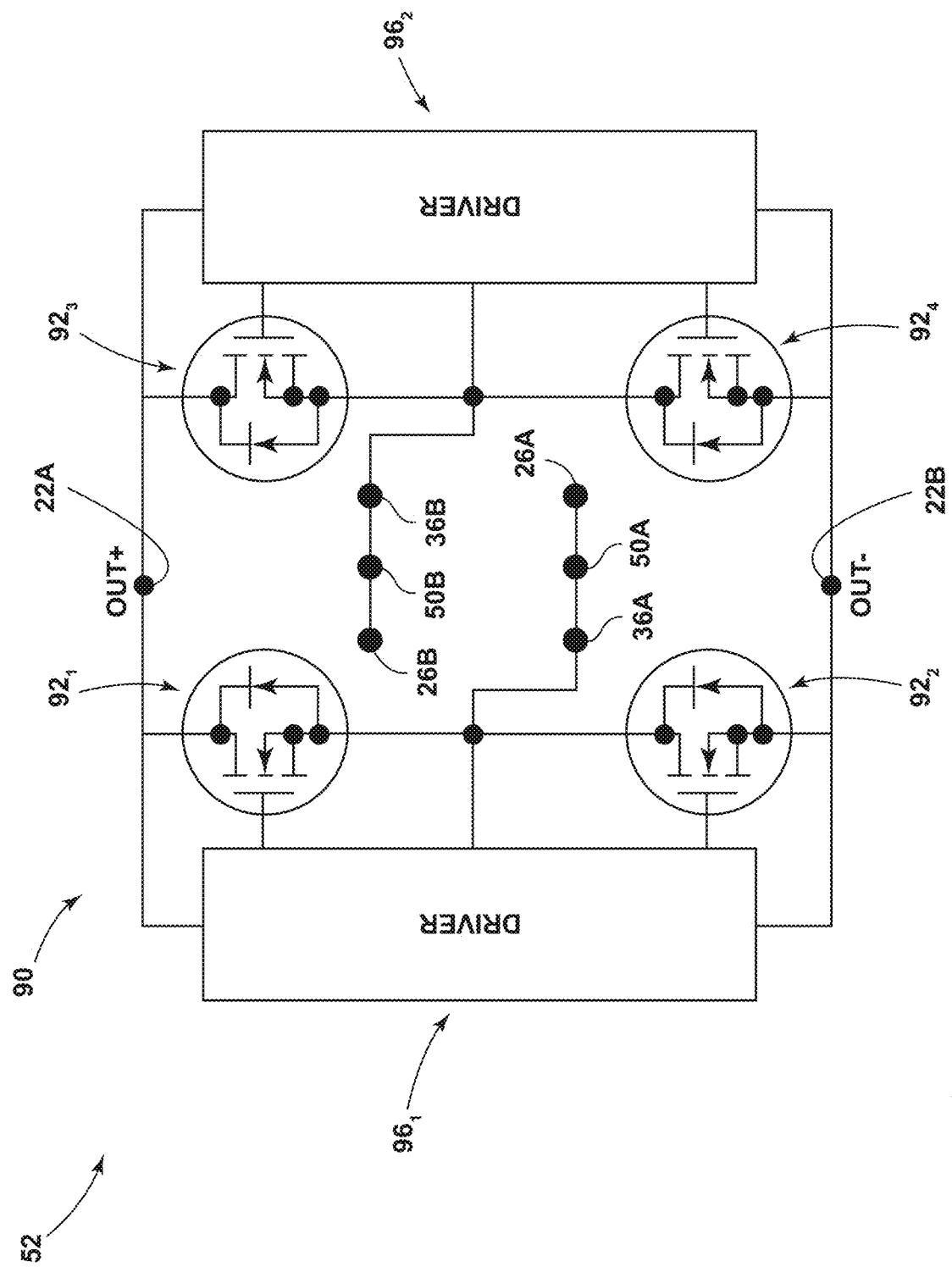
FIGS. 7C and 7D are schematic views generally illustrating portions of embodiments of a control circuit of an electrical assembly according to teachings of the present disclosure.
Figure 7D:
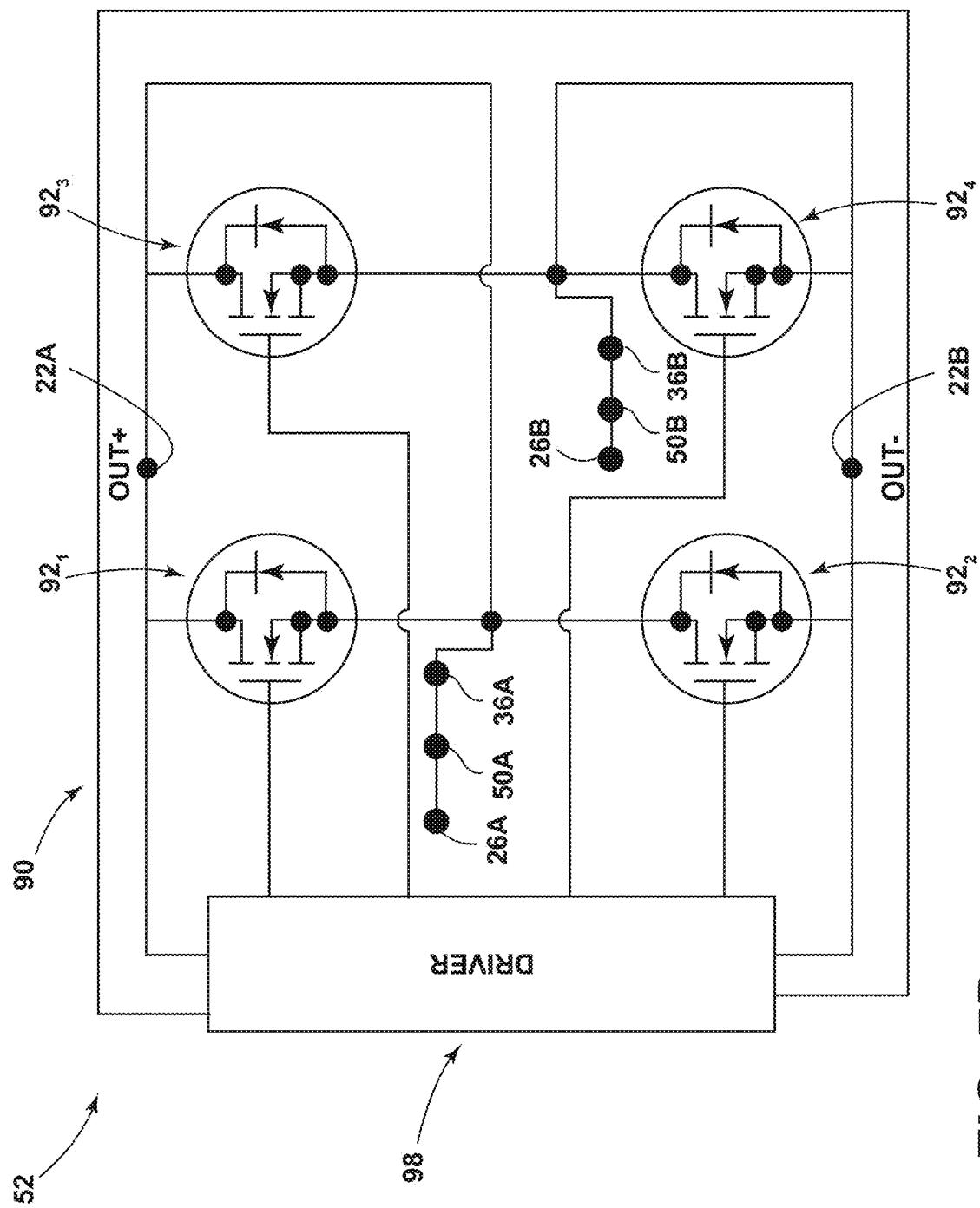

With embodiments, such as generally illustrated in FIGS. 7C and 7D, the first driver $94_1$, the second driver $94_2$, the third driver $94_3$, and the fourth driver $94_4$ may be combined into any number of drivers to control the switches $92_1$, $92_2$, $92_3$, $92_4$ (see, e.g., FIG. 7C for two drivers and see FIG. 7D for one driver). For example and without limitation, the first driver $94_1$, the second driver $94_2$, the third driver $94_3$, and the fourth driver $94_4$ may be combined into a first driver $96_1$ and a second driver $96_2$ (see, e.g., FIG. 7C). The first driver $96_1$ may be connected to the first switch $92_1$ and the second switch $92_2$. The second driver $96_2$ may be connected to the third switch $92_3$ and the fourth switch $92_4$. The first driver $96_1$ may be configured to control/activate the first switch $92_1$ and the second switch $92_2$. The second driver $96_2$ may be configured to control/activate the third switch $92_3$ and the fourth switch $92_4$. In embodiments, the control circuit 52, may include a single driver 98 that may be configured to control/activate the first switch $92_1$, the second switch $92_2$, the third switch $92_3$, and the fourth switch $92_4$ (see, e.g., FIG. 7D). The driver 98 may be connected to each of the switches $92_1$, $92_2$, $92_3$, $92_4$.

Embodiments of control circuits 52, such as the five embodiments illustrated in FIGS. 3A-3C, 4A and 4B, 5A and 5B, 6A and 6B, and 7A-7D, may include various advantages and/or potential drawbacks. The embodiment of FIGS. 3A-3C may, for example and without limitation, include a compact configuration, may involve medium cost, and may involve a relatively low voltage drop, but may experience reduced relay life cycle (e.g., each maneuver of the support assembly 22 may actuate a relay) and/or may involve increased noise from the relays 62, 64. The embodiment of FIGS. 4A and 4B may, for example and without limitation, involve low cost, a relatively low voltage drop, a relative long relay life cycle/minimal relay noise (e.g., relays may only be actuated when a support assembly 22 is disposed in a second orientation), but may experience a reverse pulse from the power source 26 during an initial connection of the support member 30 with the track assembly 38. The embodiment of FIGS. 5A and 5B may, for example and without limitation, not involve a reverse pulse from the power source 26, but may involve a higher cost, a higher voltage drop, and/or may experience a shorter life cycle for the third relay 76 which may actuate for each maneuver of the support assembly 22. The embodiment of FIGS. 6A and 6B may, for example and without limitation, involve high cost, a relatively high voltage drop, a relatively long diode life (e.g., longer than the expected life of a vehicle), a no-noise and compact control circuit 52. The embodiment of FIGS. 7A-7D may, for example and without limitation, involve a high cost, a relatively low voltage drop, minimum power waste, a longer circuit life (e.g., longer than the expected life of a vehicle), low or substantially no noise, and/or a compact control circuit 52.

In embodiments, an electrical assembly 20 may be configured to avoid a reverse polarity conduction, provide power to the support assembly 22 in the second/rearward-facing configuration, and/or provide digital monitoring of the position of the support assembly 22.

With embodiments, a control circuit 52 may operate automatically, such as independently of the ECUs 28A, 28B. For example and without limitation, a control circuit 52 (e.g., a relay assembly) 60 may switch between states (e.g., a first state, a second state, and/or a third state) without being controlled by an ECU 28A, 28B. One or both of the ECUs 28A, 28B may be connected to the control circuit 52 and the connection may be a passive/monitoring connection. A control circuit 52 may be configured as a passive assembly and may not involve a capacitor or internal energy storage.

With embodiments, such as generally illustrated in FIGS. 8-19, it may be desirable to limit or remove involvement of an ECU (e.g., ECU 28) when providing/ensuring a proper electrical connection (e.g., with the correct polarity) between a track and a support member, and/or between a power source 190 and a load 160. For example and without limitation, limiting or removing involvement of an ECU may reduce complexity and/or power consumption.

Figure 8:
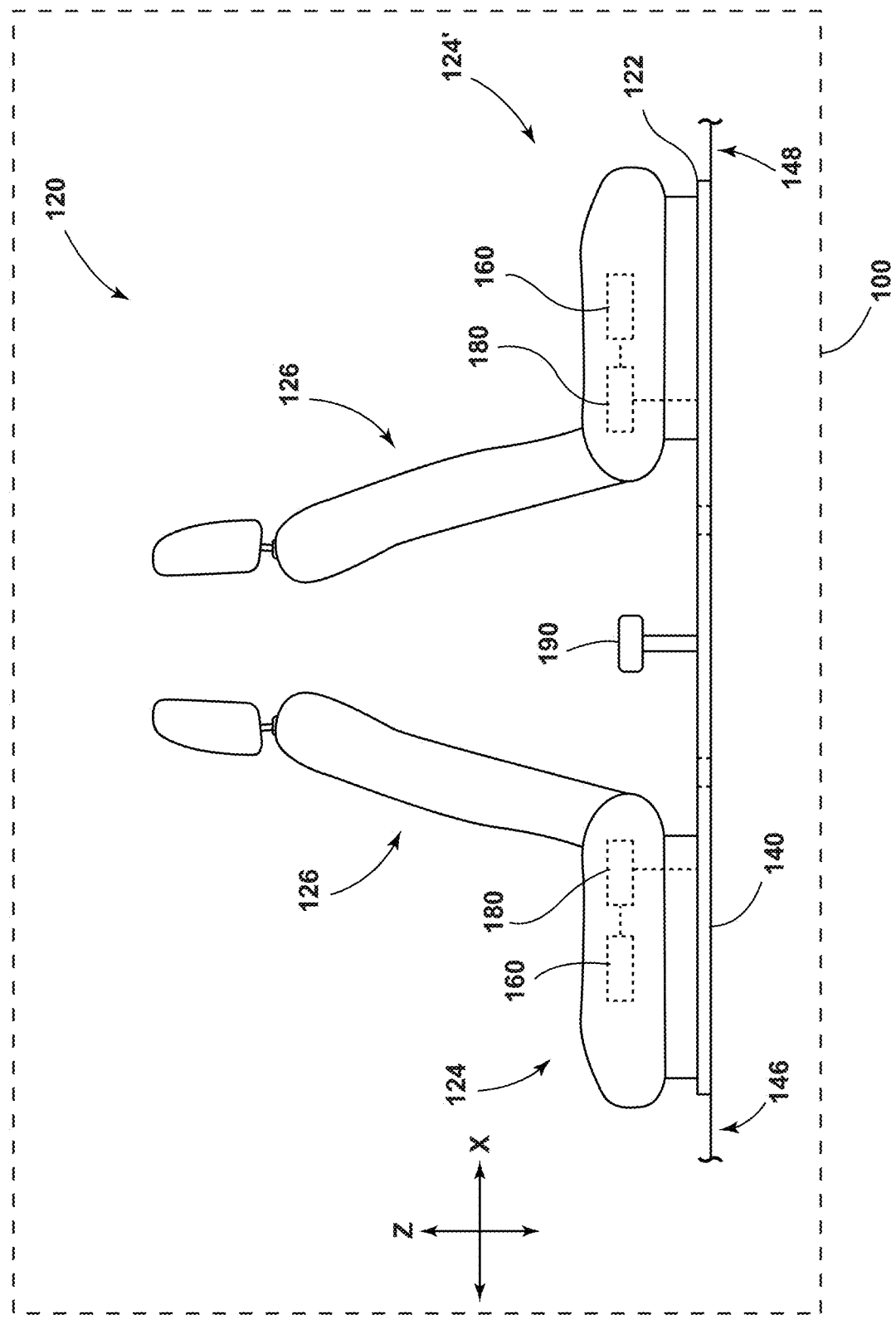
FIG. 8 is a side view generally illustrating an embodiment of an electrical track assembly with a first support member in a first configuration and a second support member in a second configuration according to teachings of the present disclosure.
Figure 9:
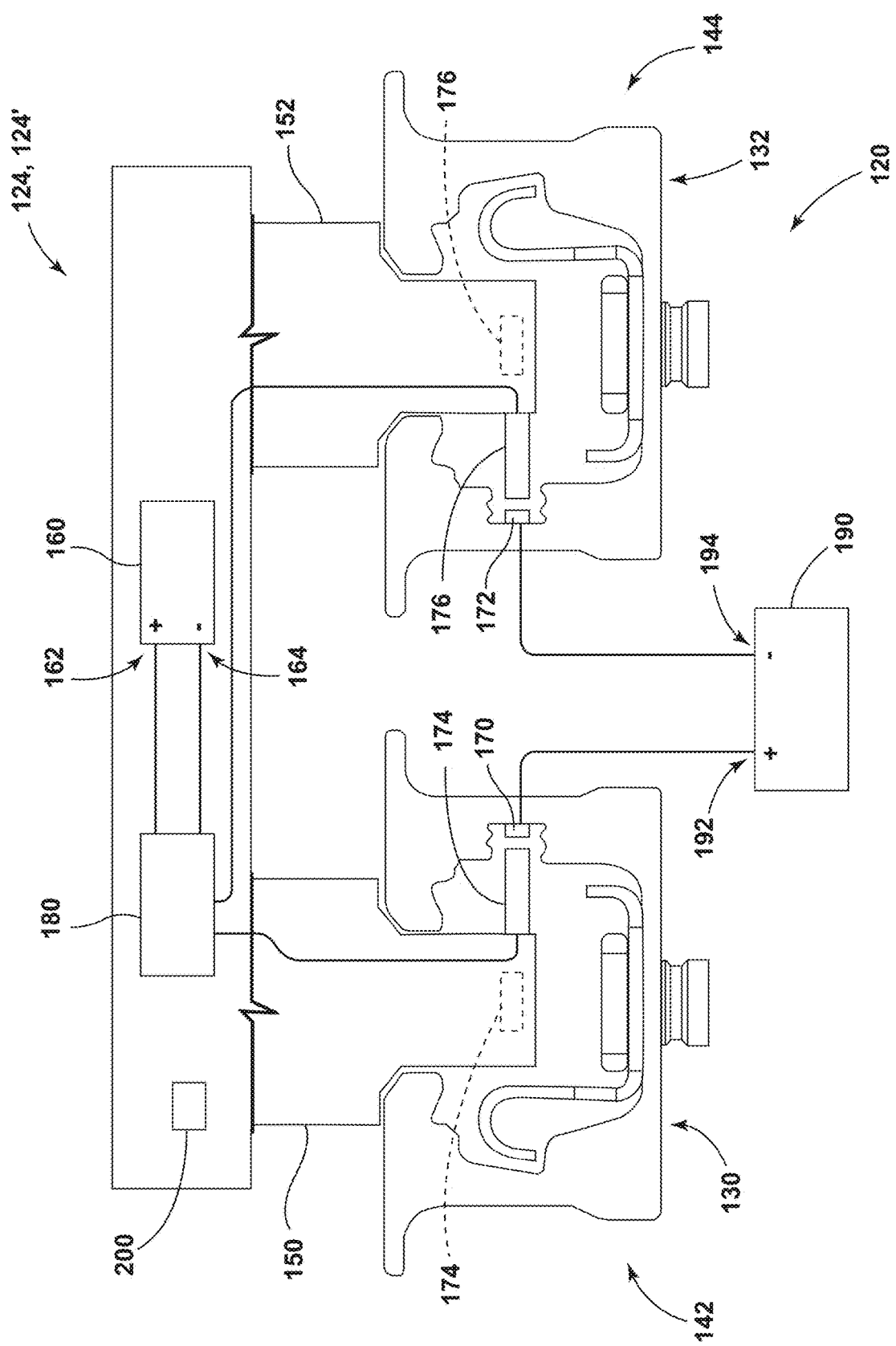
FIG. 9 is an end view generally illustrating an embodiment of an electrical track assembly with a support member in a first configuration according to teachings of the present disclosure.
Figure 10:
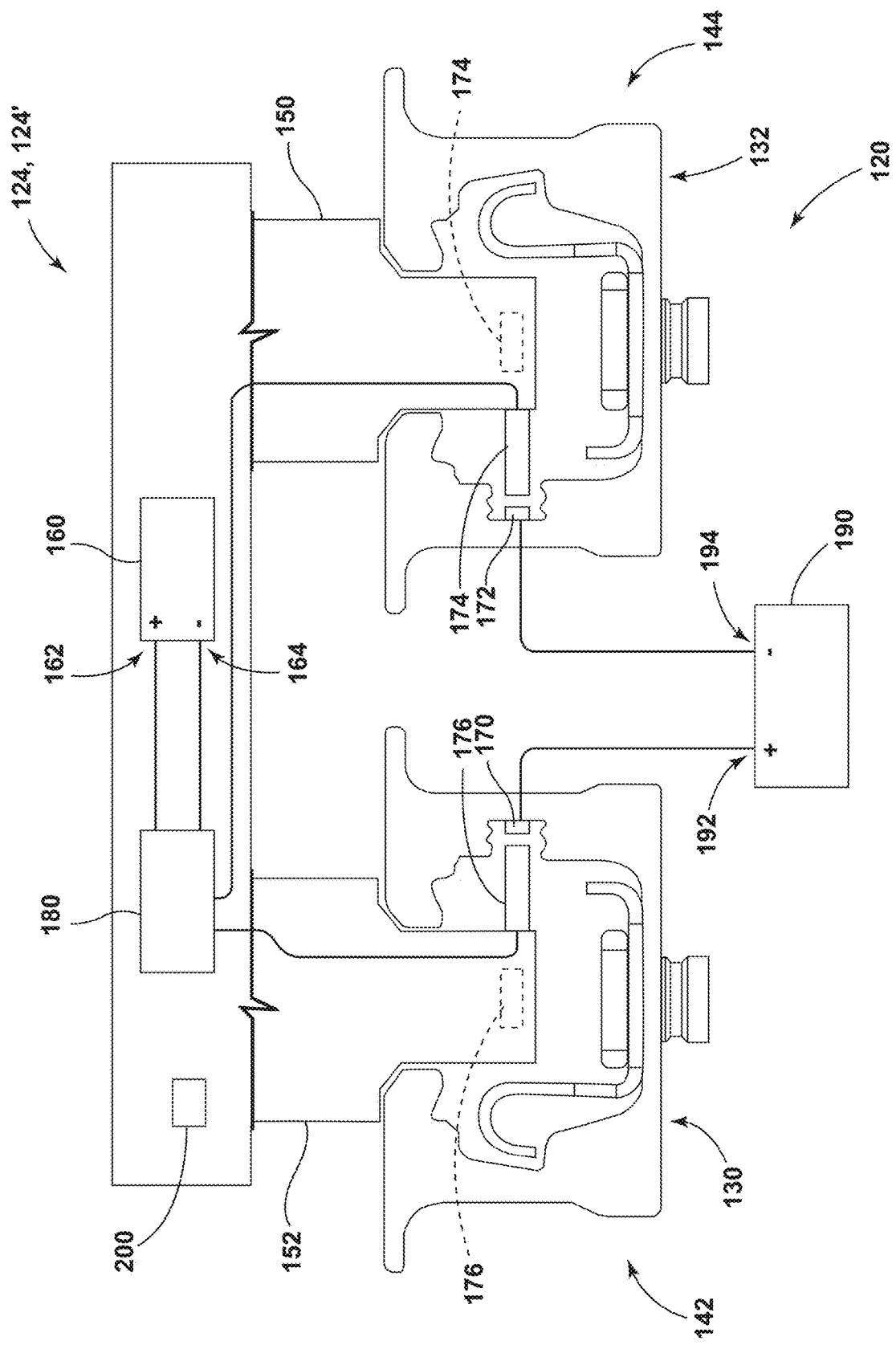
FIG. 10 is an end view generally illustrating an embodiment of an electrical track assembly with a support member in a second configuration according to teachings of the present disclosure.
Figure 11:
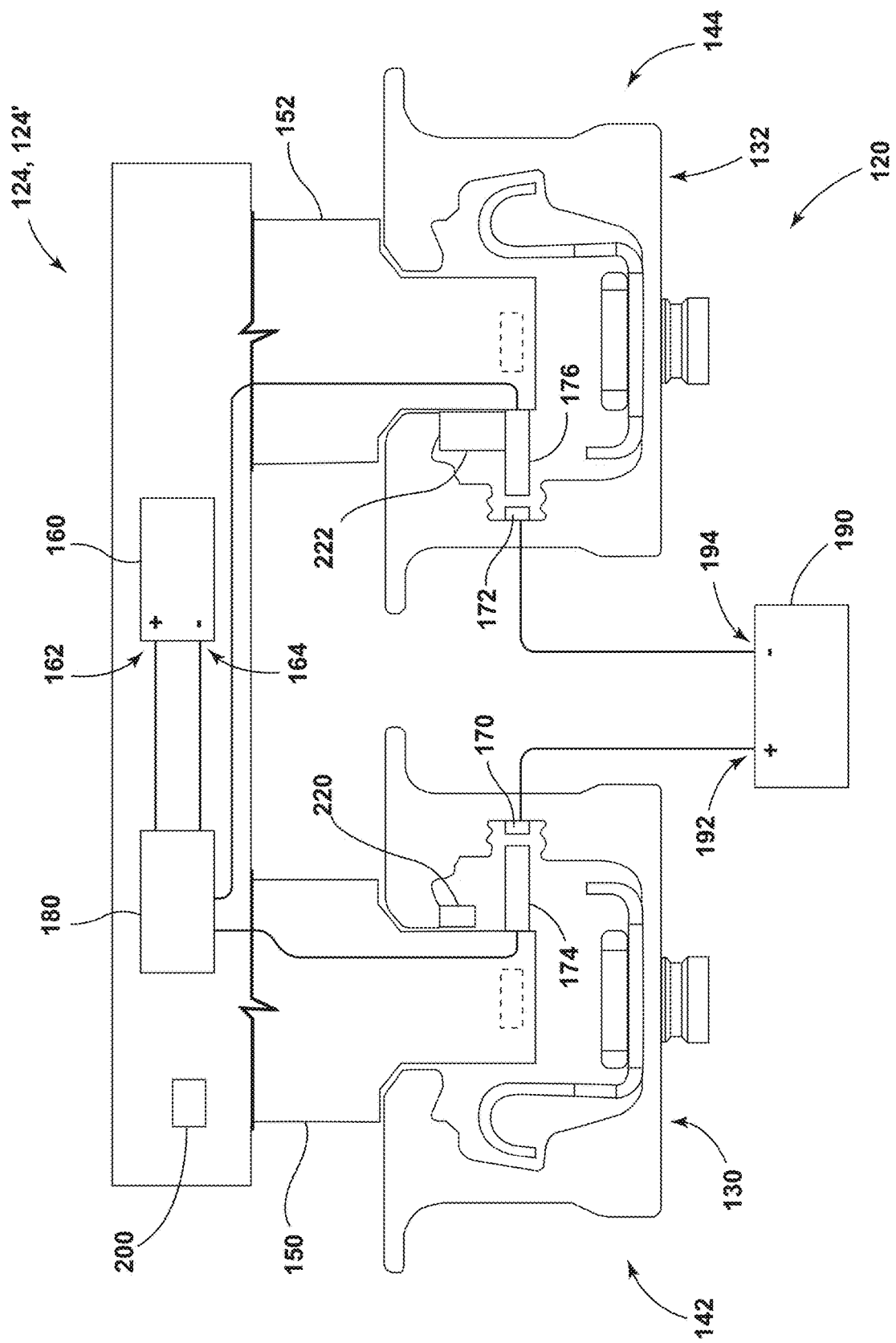
FIG. 11 is an end view generally illustrating an embodiment of an electrical track assembly with a support member in a second configuration according to teachings of the present disclosure.

In embodiments, such as generally illustrated in FIGS. 8-10, an electrical track assembly 120 may include a pair of tracks 122 and one or more support members, such as a first support member 124 and/or a second support member 124'. The one or more support members 124, 124' may be configured for selective connection with, removal from, and/or movement along the pair of tracks 122, such as in one or more configurations. For example and without limitation, the one or more support members 124 may be configured for selective connection with, removal from, and/or movement along the pair of tracks 122 in a first configuration (e.g., facing a first direction, such as forward—see first support member 124 in FIGS. 8 and 9) and a second configurations (e.g., facing a second direction, such as rearward—see second support member 124' in FIG. 8 and first support member 124 in FIG. 10). A support member 124, 124' may, for example, be connected to the pair of tracks 122 in the first configuration, move along the tracks 122 while in the first configuration, be removed from the pair of tracks 122 while in the first configuration, and then be connected with the tracks 122 in the second configuration.

With embodiments, the pair of tracks/rails 122 may include a first track/rail 130 and a second track/rail 132 that may be disposed in parallel with each other, such as on a mounting surface 140 (e.g., a floor of a vehicle 100), and may be offset from each other, such as in a Y-direction (e.g., a lateral direction). The pair of tracks 122 may be separately connected (e.g., fixed) to the mounting surface 140. The mounting surface 140 may include a first side 142 (e.g., a left side), a second side 144 (e.g., a left side), a first end 146 (e.g., a front end), and/or a second end 148 (e.g., a rear end). A support member 124, 124' may be configured for connection with both of the first track 130 and the second track 132 when connected in the first configuration or the second configuration. For example and without limitation, a support member 124, 124' may include a first connection portion 150 that may be configured for connection with the first track 130 in the first configuration and the second track 132 in the second configuration, and/or may include a second connection portion 152 that may be configured for connection with the second track 132 in the first configuration and the first track 130 in the second configuration. The tracks 130, 132 may include a generally U-shaped configuration that may open upward (e.g., in a Z-direction) and the connection portions 150, 152 may extend into and/or engage the tracks 130, 132.

With embodiments, such as generally illustrated in FIGS. 8-10, a support member 124, 124' may include an electrical load 160. An electrical load 160 may, for example and without limitation, include one or more of an electronic controller, an electric motor, a heater, a fan, fluid bladders, and/or pumps, among others. The first track 130 may include a first conductor 170 and/or the second track 132 may include a second conductor 172 that may be configured for providing electrical power to the electrical load 160 when the support member 124, 124' is connected with the tracks 130, 132. The first conductor 170 and/or the second conductor 172 may include electrically conductive material that may extend along some, most, or all of the respective track 130, 132, and/or may be configured as bus bars. The conductors 170, 172 may be connected (e.g., attached) to and/or disposed at least partially in a wall (e.g., a substantially vertical wall) of a respective track 130, 132.

In embodiments, such as generally illustrated in FIGS. 9 and 10, a support member 124, 124' may include one or more electrical contacts, such as a first support member contact 174 and/or a second support member contact 176 that may be configured to provide an electrical connection between the support member 124, 124' and the conductors 170, 172. The first support member contact 174 may be configured to move (e.g., rotate) into and out of contact with the first conductor 170 and/or the second conductor 172. The second support member contact 176 may be configured to move (e.g., rotate) into and out of contact with the first conductor 170 and/or the second conductor 172. Movement of the support member contacts 174, 176 may, for example, be conducted manually (e.g., by a user), mechanically (e.g., via one or more levers, sliders, linkages, etc. upon connection with the tracks 130, 132), and/or electromechanically (e.g., via an electric motor).

With embodiments, a support member 124, 124' may include a switch assembly 180 (e.g., a manual switch assembly) that may selectively electrically connect the electrical load 160 with the conductors 170, 172, such as via the support member contacts 174, 176. The electrical load 160 may include a first load contact 162 and/or a second load contact 164. The first load contact 162 may, for example, include a positive contact. The second load contact 164 may, for example, include a negative contact. The first conductor 170 may be a positive conductor that may be connected to a positive power source contact 192 of a power source 190. The second conductor 172 may be a negative conductor that may be connected to a negative power source contact 194 of the power source 190. The power source 190 may, for example and without limitation, include a battery and/or an electrical generator, among others.

In embodiments, a switch assembly 180 may be configured to connect the first load contact 162 with the first conductor 170 and connect the second load contact 164 with the second conductor 172, such as regardless of the configuration of the support member 124, 124'. The electrical track assembly 120 and/or the switch assembly 180 may be configured to prevent current flow between the first load contact 162 and the second conductor 172, and/or prevent current flow between the second load contact 164 and the first conductor 170 (e.g., to prevent a reversed polarity connection).

Figure 12:
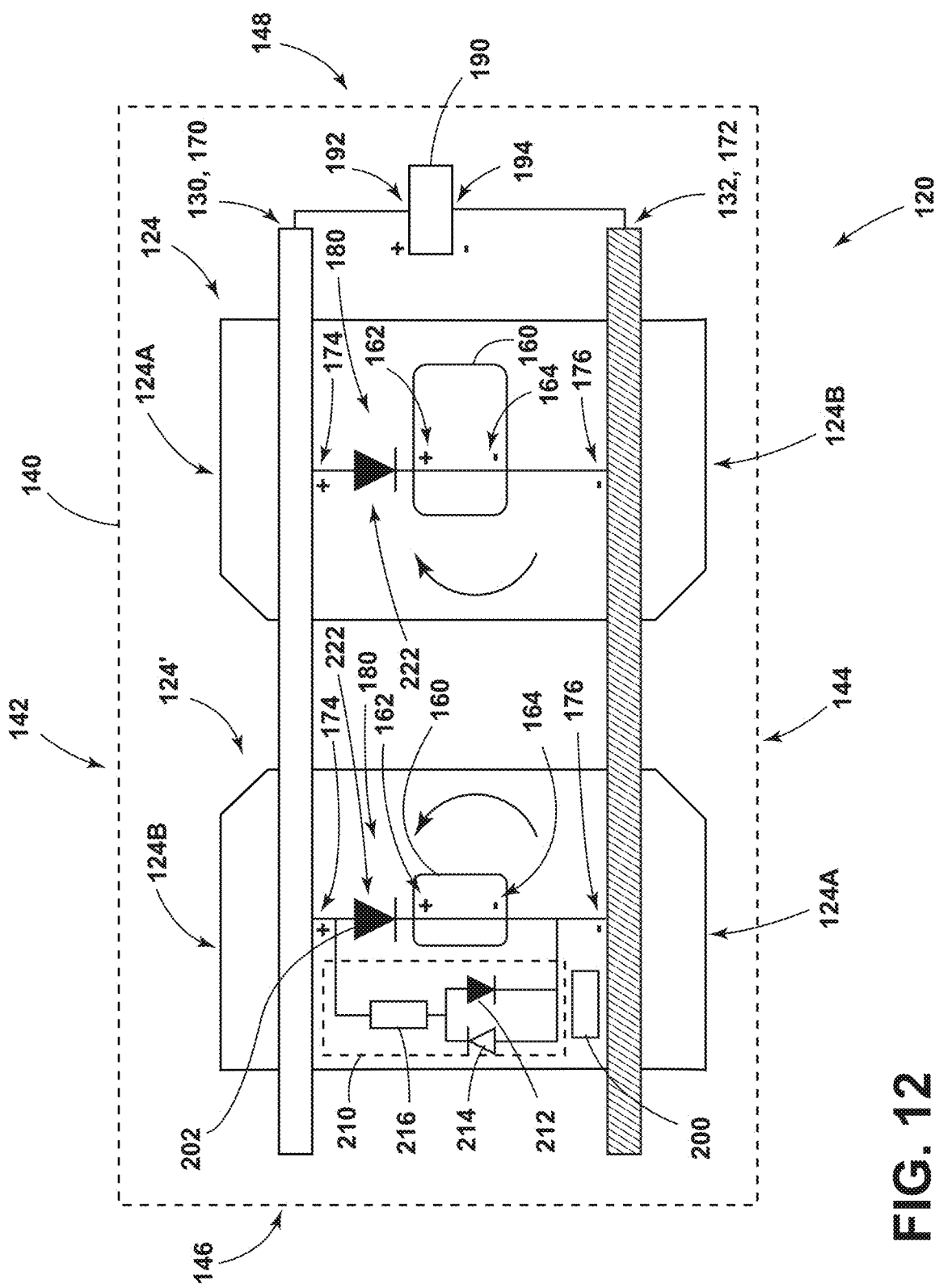
FIG. 12 is a diagram generally illustrating an embodiment of an electrical track assembly with a switch circuit in a first switch circuit position according to teachings of the present disclosure.
Figure 13:
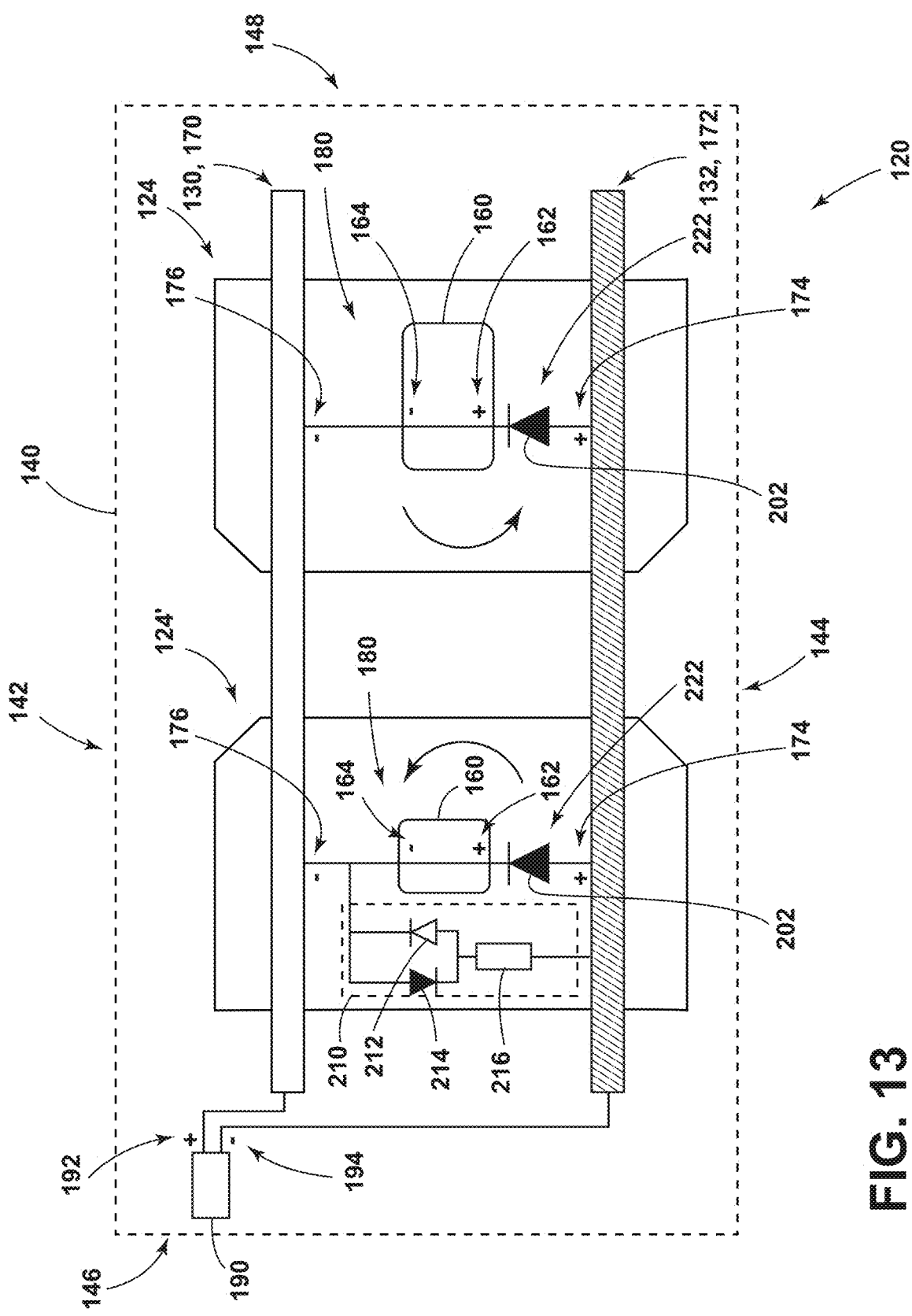
FIG. 13 is a diagram generally illustrating an embodiment of an electrical track assembly with a switch circuit in a second switch circuit position according to teachings of the present disclosure.
Figure 14:
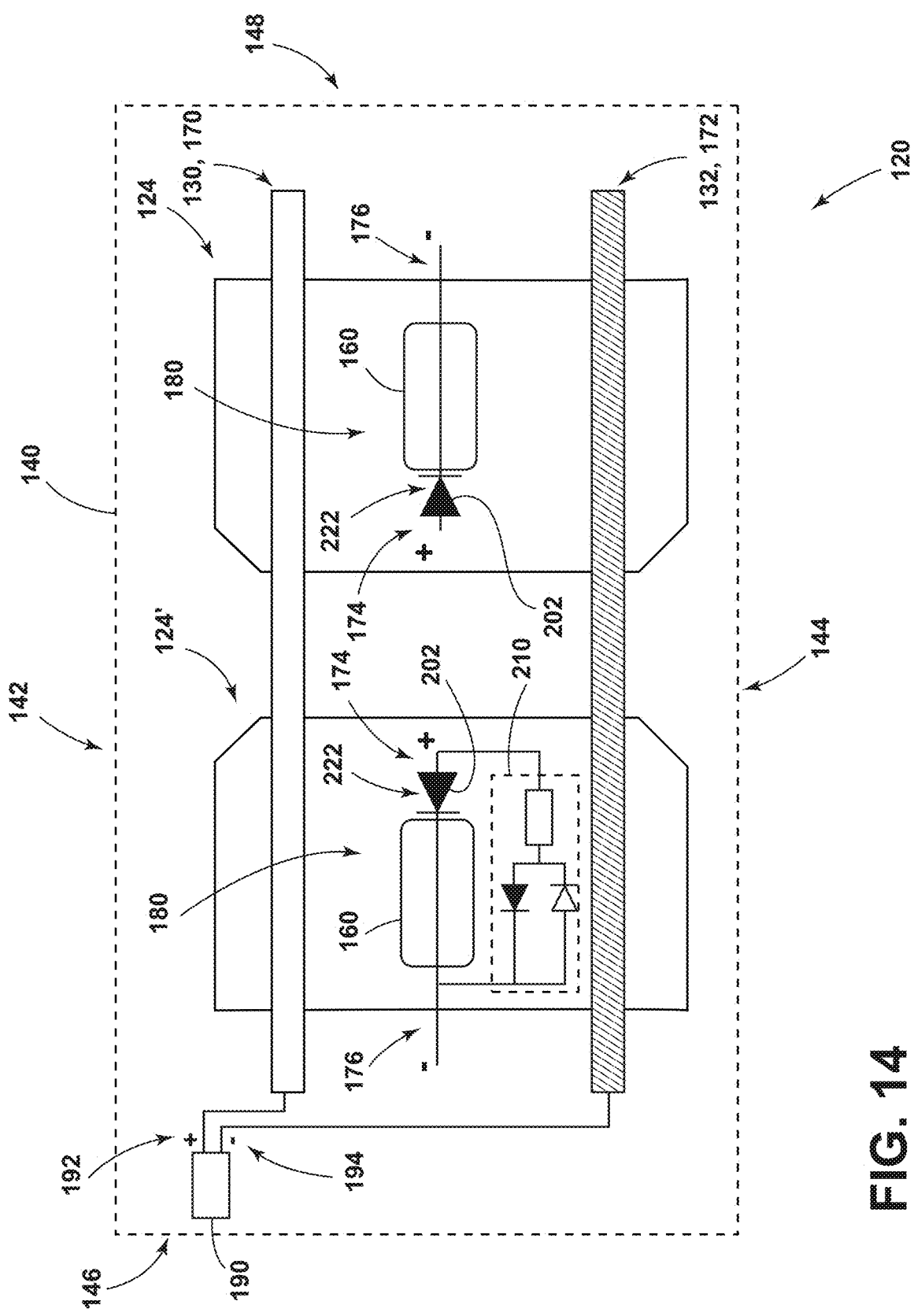
FIG. 14 is a diagram generally illustrating an embodiment of an electrical track assembly with a switch circuit in a third switch circuit position according to teachings of the present disclosure.

With embodiments, such as generally illustrated in FIGS. 12-14, a switch assembly 180 may be configured to move between a first position (see, e.g., switch assembly 180 of support member 124 in FIG. 12), a second position (see, e.g., switch assembly 180 of support member 124' in FIG. 12), and/or a third position (see, e.g. switch assemblies 180 in FIG. 14). The first position may correspond to the first support member contact 174 being disposed proximate a first side 124A of the support member 124, 124' and the second support member contact 176 being disposed proximate a second side 124B of the support member 124, 124'. The second position may correspond to the first support member contact 174 being disposed proximate the second side 124B of the support member 124, 214' and the second support member contact 176 being disposed at the first side 24A of the support member 124, 124'. The third position may correspond to a neutral position in which the first support member contact 174 and the second support member contact 176 may be disposed proximate a middle of the support member 124, 124'. The first support member contact 174 and the second support member contact 176 may move with the switch assembly 180 such as to the first position, the second position, and/or the third position (e.g., may be manually operated via actuation of the switch assembly 180).

In embodiments, a switch assembly 180 may be configured to be moved (e.g., by a user) from a disengaged position (e.g., the third/neutral position) in which the support member 124, 124' is not electrically connected with first conductor 170 and the second conductor 172, to an engaged position (e.g., the first position and/or the second position) in which the support member 124, 124' is electrically connected with first conductor 170 and the second conductor 172 (and vice versa). For example and without limitation, contact between the support member contacts 174, 176, and the conductors 170, 172 may (e.g., immediately) provide an electrical connection for and/or power to the electrical load 160, if properly switched/actuated.

In embodiments, such as generally illustrated in FIG. 12, if a support member 124 is connected with the tracks in a first configuration, the first side 124A of the support member 124, may be disposed proximate the first track 130, and the second side 124B of the support member 124 may be disposed proximate the second track 132. In the first configuration, the switch assembly 180 may be actuated (e.g., rotated) to the first position to connect the first support member contact 174 with the first conductor 170, which may provide an electrical connection from the first conductor 170 to the first load contact 162. Additionally or alternatively, actuating the switch assembly 180 to the first position while the support member 124 is in the first configuration may connect the second support member contact 176 with the second conductor 172, which may provide an electrical connection between the second conductor 172 and the second load contact 164. For example and without limitation, actuating the switch assembly 180 to the first position when the support member 124 is in the first configuration may provide power from the pair of tracks 122 and/or a power source 190 to the electrical load 160.

With embodiments, such as generally illustrated in FIG. 12, if a support member 124' is connected with the tracks 130, 132 in a second configuration, the first side 124A of the support member 124' may be disposed proximate the second track 132, and the second side 124B of the support member 124' may be disposed proximate the first track 130. In the second configuration, the switch assembly 180 may be actuated (e.g., rotated by a user) to the second position to connect the first support member contact 174 with the first conductor 170, which may provide an electrical connection from the first conductor 170 to the first load contact 162. Additionally or alternatively, actuating the switch assembly 180 to the second position when the support member 124' is in the second configuration may connect the second support member contact 176 with the second conductor 172, which may provide an electrical connection between the second conductor 172 and the second load contact 164. For example and without limitation, actuating the switch assembly 180 to the second position when the support member 124' is in the second configuration may provide power from the pair of tracks 122 and/or a power source 190 to an electrical load 160.

In embodiments, such as generally illustrated in FIG. 12, if a support member 124, 124' is connected with the tracks 130, 132 in the first configuration and the switch assembly 180 is actuated to the second position, or if the support member 124, 124' is connected with the tracks 130, 132 in the second configuration and the switch assembly 180 is actuated to the first position, an improper current may flow (e.g., a reverse polarity current) between the first conductor 170 and the second load contact 164 and/or between the second conductor 172 and the first load contact 162 may be provided. The electrical track assembly 120 and/or the switch assembly 180 may be configured to prevent such a current. For example and without limitation, the switch assembly 180 may include a blocking element 222, such as a diode 202, that may allow current to flow from the first support member contact 174 to the load 160 and to the second support member contact 176, but may prevent current flow from the second support member contact 176 to the load 160 and to the first support member contact 174. The diode 202 may, for example, interrupt a current path that would otherwise flow from the first conductor 170 to the second support member contact 176, to the second load contact 164, to the first load contact 162, to the first support member contact 174, to the second conductor 172.

In embodiments, a switch assembly 180 may be configured to be switched toward the first side 142 of the mounting surface 140 into the first switch position when the support member 124, 124' is in the first configuration to connect the first load contact 162 with the first conductor 170. Additionally or alternatively, the switch assembly 180 may be configured to be switched toward the first side 142 of the mounting surface 140 into the second switch position when the support member 124, 124' is in the second configuration to electrically connect the first load contact 162 with the first conductor 170. For example and without limitation, the switch assembly 180 may be actuated toward the first side 142 regardless of the configuration of the support member 124, 124' to provide a proper electrical connection. A label 200 (or other marking) may be disposed proximate the switch assembly 180 to indicate that the switch assembly 180 (and/or the first support member contact 174) should be actuated toward the first side 142. If the switch assembly 180 is actuated toward the second side 144, power may not be provided to the electrical load 160.

With embodiments, such as generally illustrated in FIGS. 12-14, a switch assembly 180 may include an indicator circuit 210. The indicator circuit 210 may be configured to provide an indication to a user about whether the switch assembly 180 has been actuated correctly. The indication may include a visual indication and/or an audible indication, among others. An indicator circuit 210 may, for example, include a first light emitting diode (LED) 212 and/or a second LED 214. The first LED 212 and the second LED 214 may be disposed in parallel with each other and/or with the diode 202 and the load 160 such that the diode 202 does not prevent current flow to the LEDs 212, 214 and the indicator circuit 210 does not provide power to the load 160. The first LED 212 may be disposed to allow current to flow from the first support member contact 174 to the second support member contact 176, and in the presence of such current, may provide a first light (e.g., a green light), which may indicate correct actuation of the switch assembly 180 (see, e.g., FIG. 12). The second LED 214 may be disposed to allow current to flow from the second support member contact 176 to the first support member contact 174, and in the presence of such current, may provide a second light (e.g., a red light), which may indicate incorrect actuation of the switch assembly 180 (see, e.g., FIG. 13). The indicator circuit 210 may include a resistor 216 upstream of the first LED 212 and downstream of the second LED 214. The indicator circuit 210 may move with the switch assembly 180, such as to the first position, the second position, and/or the third position.

Figure 15:
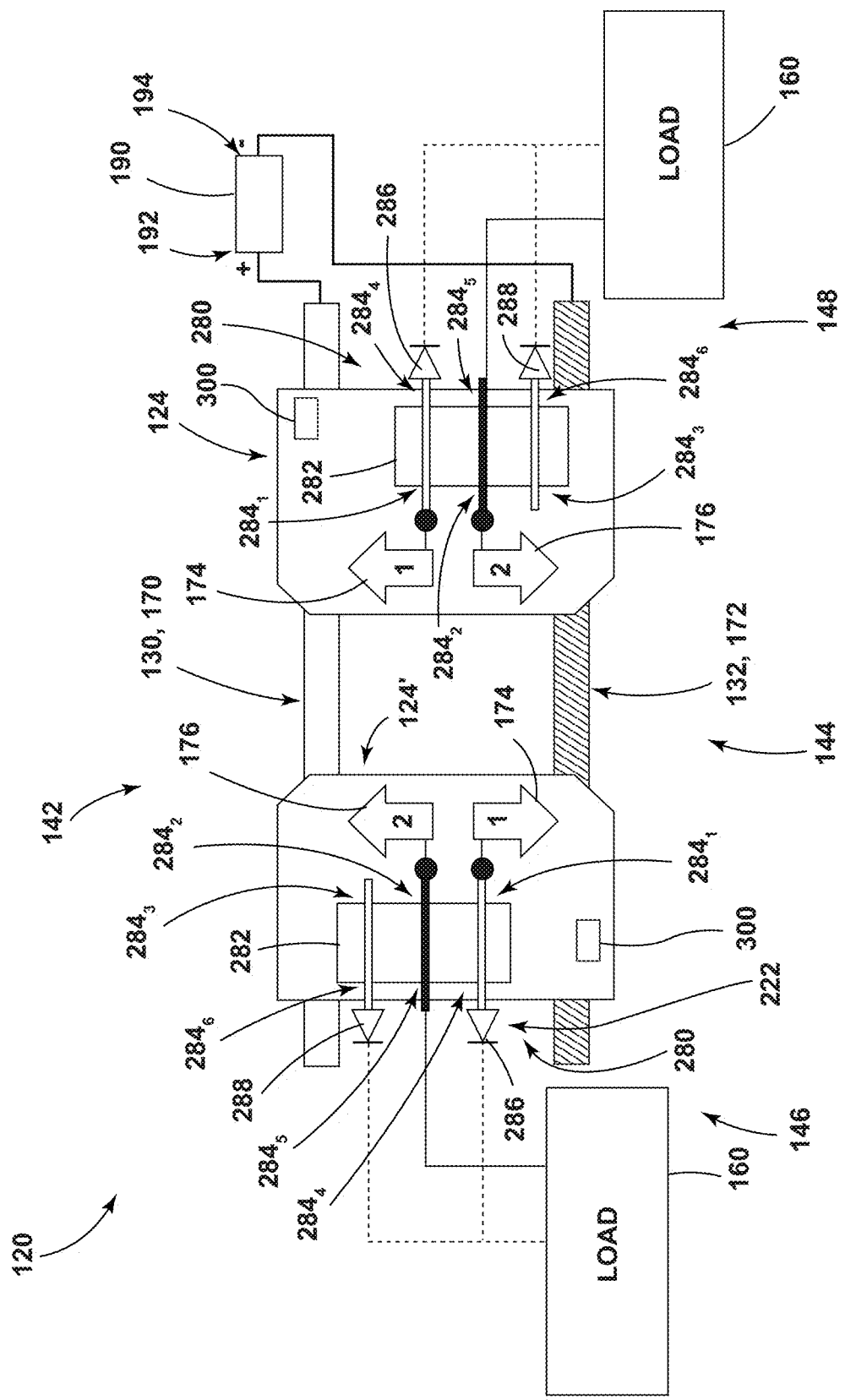
FIG. 15 is a diagram generally illustrating an embodiment of an electrical track assembly with two support members having switches in first positions according to teachings of the present disclosure.
Figure 16:
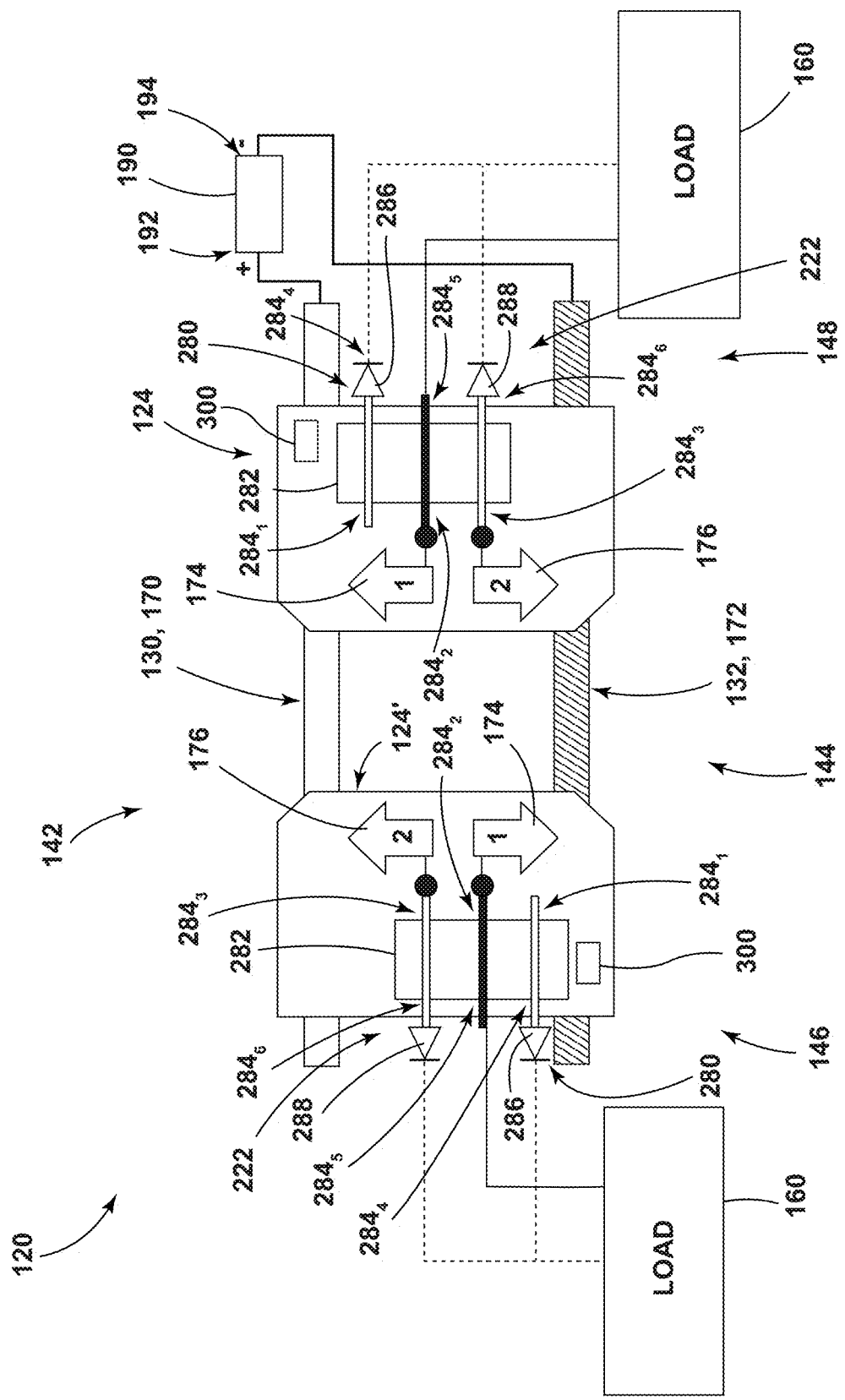
FIG. 16 is a diagram generally illustrating an embodiment of an electrical track assembly with two support members having switches in second positions according to teachings of the present disclosure.

In embodiments, such as generally illustrated in FIGS. 15 and 16, an electrical track assembly 120 may include a switch assembly 280 that may include a switch 282 (e.g., a manual electrical switch) that may be connected (e.g., electrically) to the first support member contact 174 and the second support member contact 176. The manual electrical switch 282 may selectively connect the first support member contact 174 with the first load contact 162 and connect the second support member contact 176 with the second load contact 164. A manual electrical switch 282 may include a first switch contact $284_1$, a second switch contact $284_2$, a third switch contact $284_3$, a fourth switch contact $284_4$, a fifth switch contact $284_5$, and/or a sixth switch contact $284_6$. The first switch contact $284_1$ may be connected (e.g., permanently, electrically) to the fourth switch contact $284_4$. The second switch contact $284_2$ may be connected (e.g., permanently, electrically) to the fifth switch contact $284_5$. The third switch contact $284_3$ may be connected (e.g., permanently, electrically) to the sixth switch contact $284_6$. The fourth switch contact $284_4$ and the sixth switch contact $284_6$ may be connected (e.g., permanently, electrically) together and/or to first load contact 162 of the electrical load 160. The fifth switch contact $284_5$ may be connected (e.g., permanently, electrically) to the second load contact 164 of the electrical load 160.

With embodiments, a manual electrical switch 282 may move between a first position (see, e.g., FIG. 15) and a second position (see, e.g., FIG. 16). In the first position of the switch 282, the first switch contact $284_1$ may be connected with the first support member contact 174, the second switch contact $284_2$ may be connected to the second support member contact 176, and/or the third switch contact $284_3$ may be open. If the support member 124, 124' is in the first configuration and the switch 282 is in the first position (see, e.g., switch 282 of support member 124 of FIG. 15), the switch 282 may provide an electrical connection from the first conductor 170 to the first load contact 162 and from the second load contact 164 to the second conductor 172, which may provide power to the electrical load 160. In the second position of the switch 282, the second switch contact $284_2$ may be electrically connected to the first support member contact 174, the third switch contact $284_3$ may be electrically connected to the second support member contact 176, and the first switch contact $284_1$ may be open. If the support member 124, 124' is in the second configuration and the switch 282 is in the second position (see, e.g., switch 282 of support member 124' of FIG. 16), the switch 282 may provide an electrical connection from the first conductor 170 to the first load contact 162 (e.g., via the second support member contact 176, the third switch contact $284_3$, and the sixth switch contact $284_6$) and from the second load contact 164 to the second conductor 172 (e.g., via the fifth switch contact $284_5$, the second switch contact $284_2$, and the first support member contact 174), which may provide power to the electrical load 160. For example and without limitation, the switch 282 may be actuated to provide power to the electrical load 160 in either the first configuration or the second configuration of the support member 124, 124'.

In embodiments, if the switch 282 is in the second position when the support member 124, 124' is in the first configuration (see, e.g., switch 282 of support member 124 of FIG. 16) or if the switch 282 is in the first position when the support member 124, 124' is in the second configuration (see, e.g., switch 282 of support member 124' of FIG. 15), flow of an improper current between the conductors 170, 172 and the electrical load 160 could result (e.g., a reversed polarity connection/flow). The switch assembly 180 may be configured to prevent such an improper flow of current, such as via a blocking element 222. A blocking element 222 may, for example and without limitation, include electrical blocking elements, such as a first switch diode 286 and/or a second switch diode 288, and/or include mechanical blocking elements, such as a block and/or lever. The first switch diode 286 may be connected to the fourth switch contact $284_4$ and may be configured to allow current flow from the fourth switch contact $284_4$ to the first load contact 162, but may prevent current flow from the first load contact 162 to the fourth switch contact $284_4$. The second switch diode 288 may be connected to the sixth switch contact $284_6$ and may be configured to allow current flow from the sixth switch contact $284_6$ to the first load contact 162, but may prevent current flow from the first load contact 162 to the sixth switch contact $284_6$. For example and without limitation, the first switch diode 286 and the second switch diode 288 may interrupt a current path from the first conductor 170 to the second conductor 172 when the switch 282 is in first position and the support member 124, 124' is in the second configuration and when the switch 282 is in the second position and the support member 124, 124' is in the first configuration, respectively.

With embodiments, a switch 282 of a switch assembly 280 may be configured such that the correct position of the switch 282 is proximate the same side of a mounting surface 140 when the support member 124, 124' is in the first configuration and when the support member 124, 124' is in the second configuration. For example and without limitation, a switch 282 may be configured such that actuating the switch 282 toward the second side 144 (e.g., the left side of a vehicle) may provide power to the electrical load 160. A label 300 (or other marking) may be disposed proximate the switch assembly 280 to indicate that the switch 282 should be actuated toward the second side 144. If the switch 282 is actuated toward the first side 142 (e.g., a right side), power may not be provided to the electrical load 160 (e.g., may be prevented by a switch diode 286, 288).

In embodiments, a first track 130 may be disposed proximate a first side 142 of a mounting surface and a second track 132 may be disposed proximate a second side 144 of the mounting surface 140. A manual electrical switch 282 may be configured to be switched toward the first side 142 into a first switch position when the support member 124, 124' is in the first configuration to connect (e.g., electrically) the first load contact 162 with the first conductor 170. Additionally or alternatively, the manual electrical switch 282 may be configured to be switched toward the first side 142 into a second switch position when the support member 124, 124' is in the second configuration to connect (e.g., electrically) the first load contact 162 with the first conductor 170. The first switch position and the second switch position may be different and/or opposite. With embodiments, a switch assembly 280 may include an indicator circuit 210, such as generally described above in connection with switch assembly 180.

Figure 17:
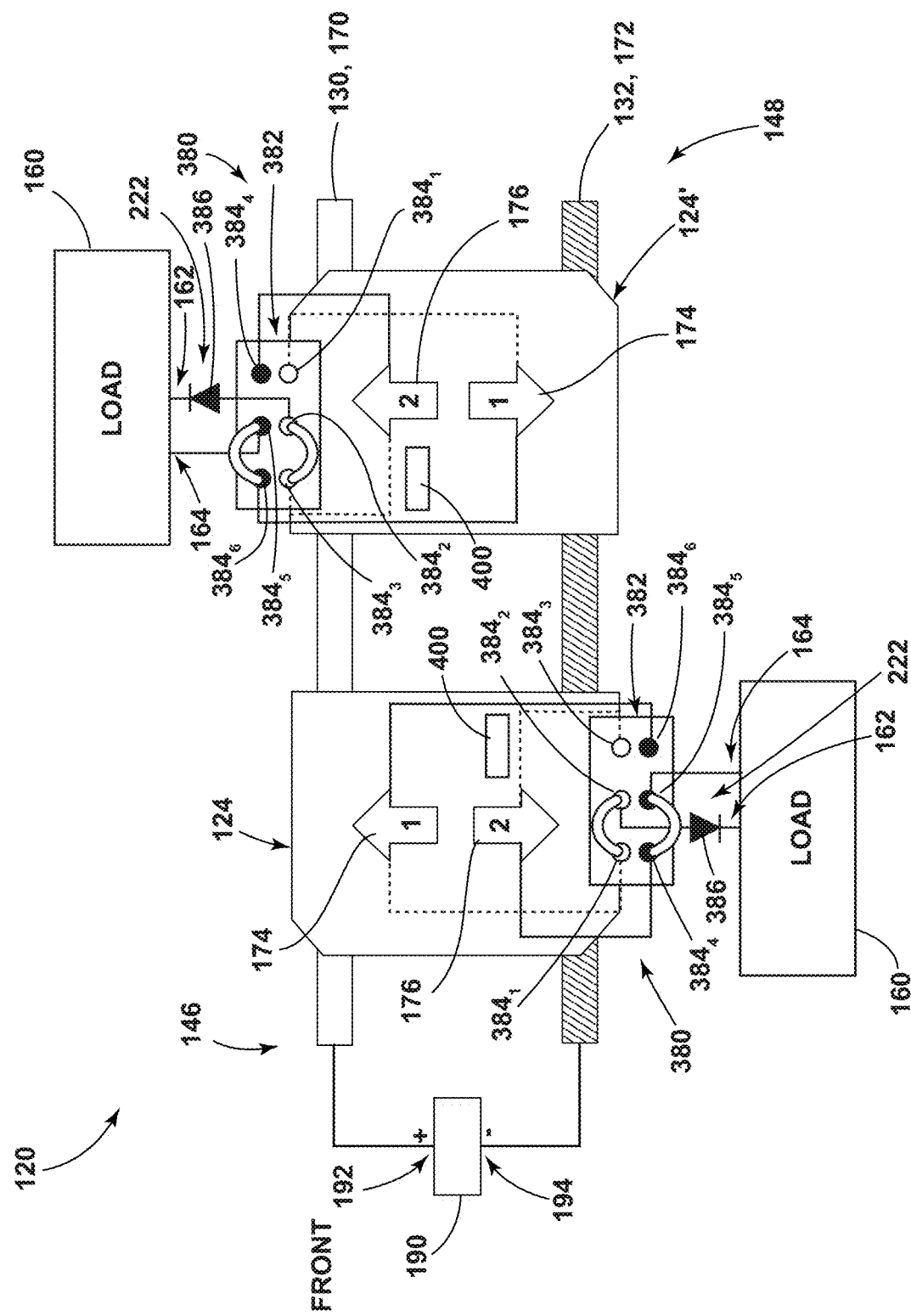
FIG. 17 is a diagram generally illustrating an embodiment of an electrical track assembly with two support members having switches in a first position and a second position, respectively, according to teachings of the present disclosure.
Figure 18:
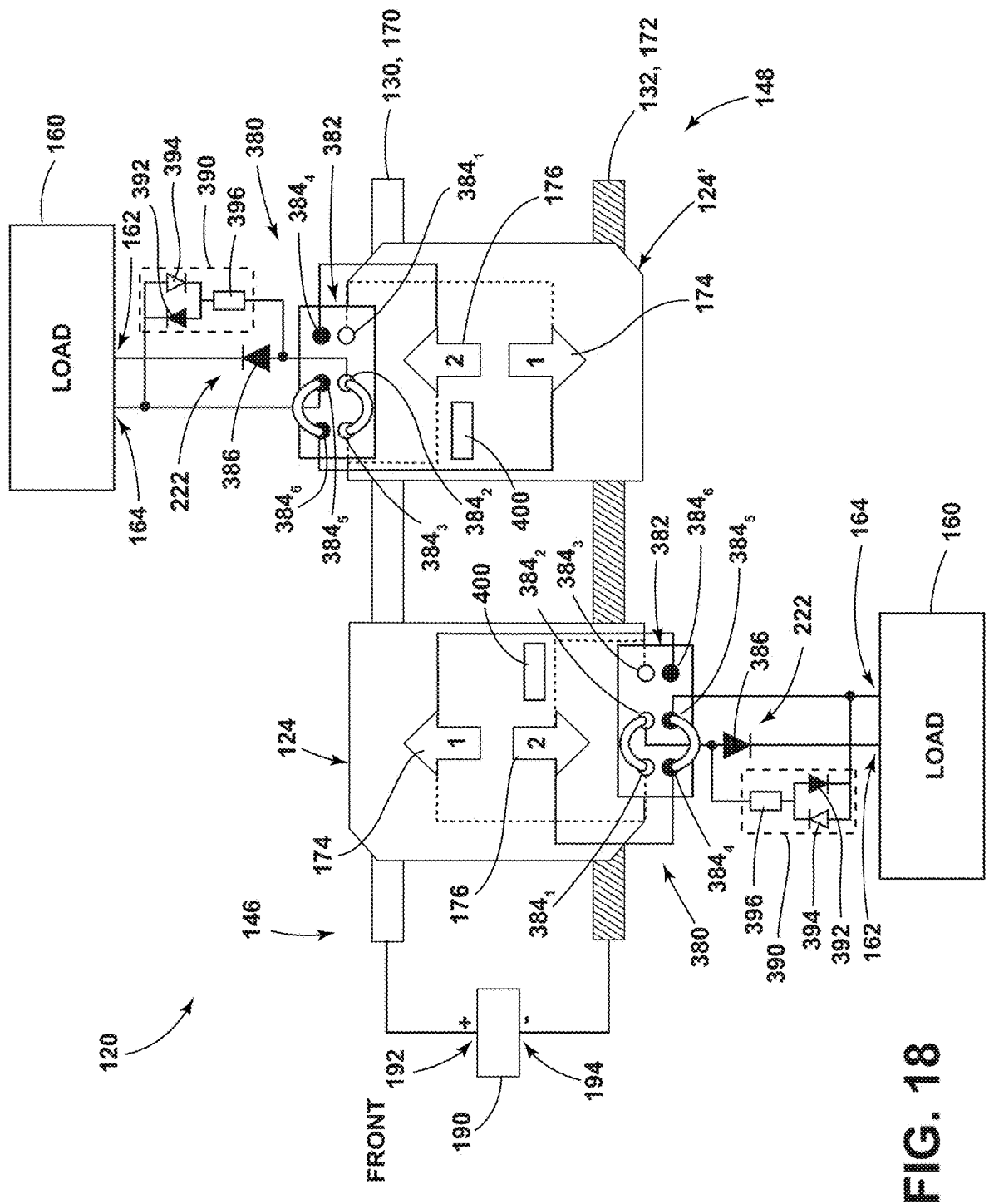
FIG. 18 is a diagram generally illustrating an embodiment of an electrical track assembly with two support members having switches in a first position and a second position, respectively, according to teachings of the present disclosure.

With embodiments, such as generally illustrated in FIGS. 17 and 18, an electrical track assembly 120 may include a switch assembly 380 that may include a manual electrical switch 382. The manual electrical switch 382 may include a first switch contact $384_1$, a second switch contact $384_2$, a third switch contact $384_3$, a fourth switch contact $384_4$, a fifth switch contact $384_5$, and/or a sixth switch contact $384_6$. The first switch contact $384_1$ and/or the sixth switch contact $384_6$ may be connected (e.g., permanently, electrically) to the first support member contact 174. The second switch contact $384_2$ may be connected (e.g., permanently, electrically) to the first load contact 162 of the electrical load 160. The third switch contact $384_3$ and/or the fourth switch contact $384_4$ may be connected (e.g., permanently, electrically) to the second support member contact 176. The fifth switch contact $384_5$ may be connected (e.g., permanently, electrically) to the second load contact 164.

In embodiments, a manual electrical switch 382 may include a first position (see, e.g., switch 382 of support member 124 in FIGS. 17 and 18) in which the manual electrical switch 382 may electrically connect the first switch contact $384_1$ with the second switch contact $384_2$, which may electrically connect the first support member contact 174 with the first load contact 162, and/or the manual electrical switch 382 may connect the fourth switch contact $384_4$ with the fifth switch contact $384_5$, which may connect the second support member contact 176 with the second load contact 164. If the support member 124, 124' is in the first configuration and the manual electrical switch 382 is in the first position, the first support member contact 174 may be in contact with the first conductor 170, and the second support member contact 176 may be in contact with the second conductor 172, which may provide power to the electrical load 160.

In embodiments, a manual electrical switch 382 may include a second position (see, e.g., switches 382 of support members 124' of FIGS. 17 and 18) that may connect the second switch contact $384_2$ with the third switch contact $384_3$, which may electrically connect the second support member contact 176 with the first load contact 162, and/or the manual electrical switch 382 may connect the fifth switch contact $384_5$ with the sixth switch contact $384_6$, which may electrically connect the first support member contact 174 with the second load contact 164. If the support member 124, 124' is in the second configuration and the manual electrical switch 382 is in the second position, the second support member contact 176 may be in contact with the first conductor 170, and the first support member contact 174 may be in contact with the second conductor 172, which may provide power to the electrical load 160.

With embodiments, if a manual electrical switch 382 is in the first position when the support member 124, 124' is in the second configuration and/or is in the second position when the support member 124, 124' is in the first configuration (e.g, the opposite arrangements of those in FIGS. 17 and 18), an improper flow of current (e.g., reversed polarity) could result. An electrical track assembly 120 and/or a switch assembly 380 may be configured to prevent such an improper flow of current. For example and without limitation, a diode 386 may be connected to the second switch contact $384_2$ (e.g., between the second switch contact $284_2$ and the first load contact 162). The diode 386 may be configured to allow current flow from the second switch contact $384_2$ to the first load contact 162, but may prevent current flow from the first load contact 162 to the second switch contact $384_2$ (e.g., prevent a reversed polarity connection).

In embodiments, a switch 382 may include a third position (e.g., a neutral position) in which none of the contacts $384_{1-6}$ are connected together. A switch 382 may, for example and without limitation, include a double pole double throw switch.

With embodiments, a switch 382 of a switch assembly 380 may be configured such that the correct position of the switch 382 is proximate the same end of a mounting surface 140 when the support member 124, 124' is in the first configuration and when the support member 124, 124' is in the second configuration. For example and without limitation, a switch 382 may be configured such that actuating the switch 382 toward the first end 146 (e.g., a vehicle front) may provide power to the electrical load 160 regardless of the configuration of the support member 124, 124'. A label 400 (or other marking) may be disposed proximate the switch assembly 380 to indicate that the switch 382 should be actuated toward the first end 146. If the switch 382 is actuated toward the second end 148, power may not be provided to the electrical load 160 (e.g., from the power source 190).

With embodiments, such as generally illustrated in FIG. 18, a switch assembly 380 may include an indicator circuit 390 that may be configured in a similar manner as the indicator circuit 210 of switch assembly 180. The indicator circuit 390 may be connected in parallel with the diode 386 and may include two LEDs 392, 394 disposed in opposite directions to provide an indication of whether the switch 382 has been actuated to the correct position. A first LED 392 may, for example, provide green light when the switch 382 is actuated to the correct position (e.g., to electrically connect the first load contact 162 with the first conductor 170 and to electrically connect the second load contact 164 with the second support member conductor 172). A second LED 394 may, for example, provide red light when the switch 382 has been actuated to an incorrect position (e.g., that would otherwise connect the first load contact 162 with the second conductor 172 or connect the second load contact 164 with the first conductor 170). The indicator circuit 390 may be connected to the second switch contact $384_2$, the fifth switch contact $384_5$, and/or the second load contact 164. A resistor 396 may be disposed upstream of the first LED 392 and/or downstream of the second LED 394.

In embodiments, such as generally illustrated in FIGS. 15-18, a first support member contact 174 and/or a second support member contact 176 of a support member 124, 124' may move independently of the switch assembly 380 (or not move if the switch assembly 380 moves). For example and without limitation, the first support member contact 174 and the second support member contact 176 may move from a disengaged position in which the support member contacts 174, 176 do not contact the conductors 170, 172 to an engaged position in which the support member contacts 174, 176 do contact the conductors 170, 172, regardless of the position of the switch assembly 380. In the disengaged position, the support member contacts 174, 176 may, for example, be generally aligned with a longitudinal direction of the tracks 130, 132 (e.g., an X-direction) and may not restrict removal of the support member 124, 124' from the tracks 130, 132 (see, e.g., hidden lines in FIGS. 9 and 10). In the engaged position, the support member contacts 174,

176 may, for example, be generally aligned with a transverse direction (e.g., a Y-direction) and may restrict removal of the support member 124, 124' from the tracks 130, 132 (e.g., may overlap with portions of the tracks 130, 132 in a vertical/Z-direction).

With embodiments, a first support member contact 174 may be configured for selective electrical connection with the first conductor 170 when the support member 124, 124' is connected to the pair of tracks 122 in the first configuration and/or for selective electrical connection with the second conductor 172 when the support member 124, 124' is connected with the pair of tracks 122 in the second configuration. Additionally or alternatively, a second support member contact 176 may be configured for selective electrical connection with the second conductor 172 when the support member 124, 124' is connected to the pair of tracks 122 in the first configuration and/or selective electrical connection with the first conductor 170 when the support member 124, 124' is connected with the pair of tracks 122 in the second configuration.

In embodiments, such as generally illustrated in FIGS. 12-18, an electrical track assembly 120 may include a support member 124 and a second support member 124' (and/or additional support members). The second support member 124' may include the same or a similar configuration as the support member 124, and may be configured for connection with, removal from, and movement along the first track 130 and the second track 132. The second support member 124' may include a first support member contact 174 (e.g., a third support member contact of the electrical track assembly 120) that may be configured for selective electrical connection with the first conductor 170 when the second support member 124' is connected to the first track 130 and/or the second track 132 in the first configuration and with the second conductor 172 when the second support member 124' is connected with the first track 130 and/or the second track 132 in the second configuration. The second support member 124' may include a second support member contact 176 (e.g., a fourth support member contact of the electrical track assembly 120) that may be configured for selective electrical connection with the second conductor 172 when the second support member 124' is connected to the first track 130 and/or the second track 132 in the first configuration and with the first conductor 170 when the second support member 124' is connected with the first track 130 and/or the second track 132 in the second configuration. The second support member 124' may include an electrical load 160 (e.g., a second electrical load) including a first load contact 162 and a second load contact 164 (e.g., third and fourth load contacts of the electrical assembly 20), and/or may include a switch assembly 180, 280, 380 (e.g., a second switch assembly of the electrical assembly 20) that may be configured to selectively electrically connect the first conductor 170 with the first load contact 162, selectively electrically connect the second conductor 172 with the second load contact 164, prevent current flow between the first conductor 170 and the second load contact 164, and/or prevent current flow between the second conductor 172 and the first load contact 162. The first switch assembly 180, 280, 380 of the support member 124 may include a first manual electrical switch 282, 382, and the (second) switch assembly 180, 280, 380 of the second support member 124' may include a (second) manual electrical switch 282, 382 connected to the first support member contact 174, the second support member contact 176, the first load contact 162, and/or the second load contact 164 of the support member 124'. The second switch assembly 180, 280, 380 may include a second diode 202, 286, 288, 386 that may be connected to the second manual electrical switch 282, 382.

With embodiments, a support member 124 and a second support member 124' may be configured for connection with the pair of tracks 122 at the same time with some or all of the following arrangements: (i) both the first support member 124 and the second support member 124' in the first configuration, (ii) the first support member 124 in the first configuration and the second support member 124' in the second configuration, (iii) the first support member 124 in the second configuration and the second support member 124' in the first configuration, and/or (iv) the first support member 124 and the second support member 124' in the second configuration. In some or each of such arrangements, a switch assembly 180, 280, 380 may be configured to facilitate current flow between (i) the first load contact 162 of the first support member 124 and the first conductor 170, (ii) the second load contact 164 of the first support member 124 and the second conductor 172, (iii) the first load contact 162 of the second support member 124' (e.g., a third load contact) and the first conductor 170, and/or (iv) the second load contact 164 of the second support member 124' (e.g., a fourth load contact) and the second conductor 172.

Figure 19:
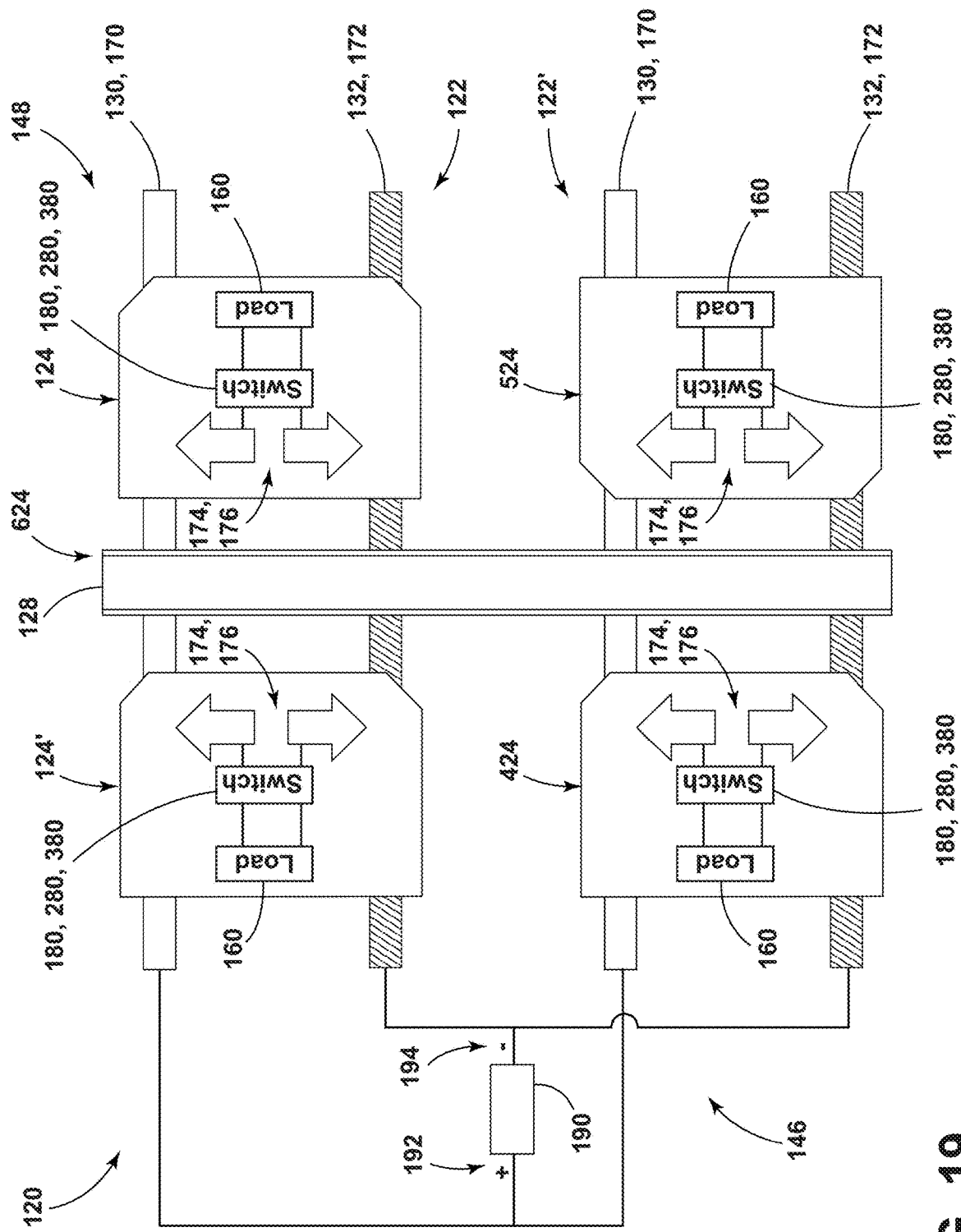
FIG. 19 is a diagram generally illustrating an embodiment of an electrical track assembly with two pairs of tracks and five support members according to teachings of the present disclosure.

With embodiments, such as generally illustrated in FIG. 19, an electrical track assembly 120 may include a first pair of tracks 122 and a second pair of tracks 122'. One or more support members (e.g., support members 124, 124') may be connected with the first pair of tracks 122 and one or more support members (e.g., support members 424, 524) may be connected to the second pair of tracks 122'. One or more support members (e.g., support member 624) may be connected to one or more tracks of both the first pair of tracks 122 and the second pair of tracks 122'. Some or all of the support members 124, 124', 424, 524, 624 may include a respective switch assembly 180, 280, 380, which may allow for the support members to be connected with the tracks 122, 122' in multiple configurations and provide power to a respective electrical load 160 (e.g., with the proper polarity).

With embodiments, a support member 124, 124', 424, 524, 624 may include, be connected to, and/or support one or more of a variety of components. For example and without limitation, an as generally illustrated in FIGS. 8 and 19, a support member 124, 124', 424, 524 may include, be connected to, and/or support a seat 126, such as a vehicle seat. Additionally or alternatively, a support member (e.g., support member 624) may include, be connected to, and/or support a table/console 128.

In embodiments, such as generally illustrated in FIGS. 11, 20, 21, and 22, an electrical track assembly 120 may include one or more asymmetric features 220, 320. The one or more asymmetric features 220, 320 may include one or more features (e.g., protrusions, tracks, bars, etc.) that may be configured to facilitate preventing an improper electrical connection. For example and without limitation, asymmetric feature(s) 220 may be configured to mechanically prevent connection of the first support member contact 174 with the second conductor 172 and/or connection of the second support member contact 176 with the first conductor 170 (see, e.g., FIG. 11). The feature(s) 220 may be included with and/or connected to the first track 130 and may restrict movement (e.g., rotation) of the second support member contact 176 into engagement with the first conductor 170.

With embodiments, such as generally illustrated in FIGS. 11, 20, 21, and 22, a support member 124, 124' and/or a switch assembly 180, 280, 380 may include a blocking element 222, 322 that may be configured to engage and/or detect the asymmetric features 220. A blocking element 222, 322 may, for example, be configured to detect/engage an asymmetric feature 220, 320 to prevent an improper electrical connection. For example and without limitation, a blocking element 322 may detect/engage an asymmetric feature 220 to prevent electrical connection of the second support member contact 176 with the first conductor 170 (see, e.g., FIG. 11). The blocking element 222 may be connected to and/or incorporated with the second support member contact 176 such that the blocking element 222 moves with the second support member contact 176 and contacts the feature 220 to restrict movement of the second support member contact 176.

Figure 20:
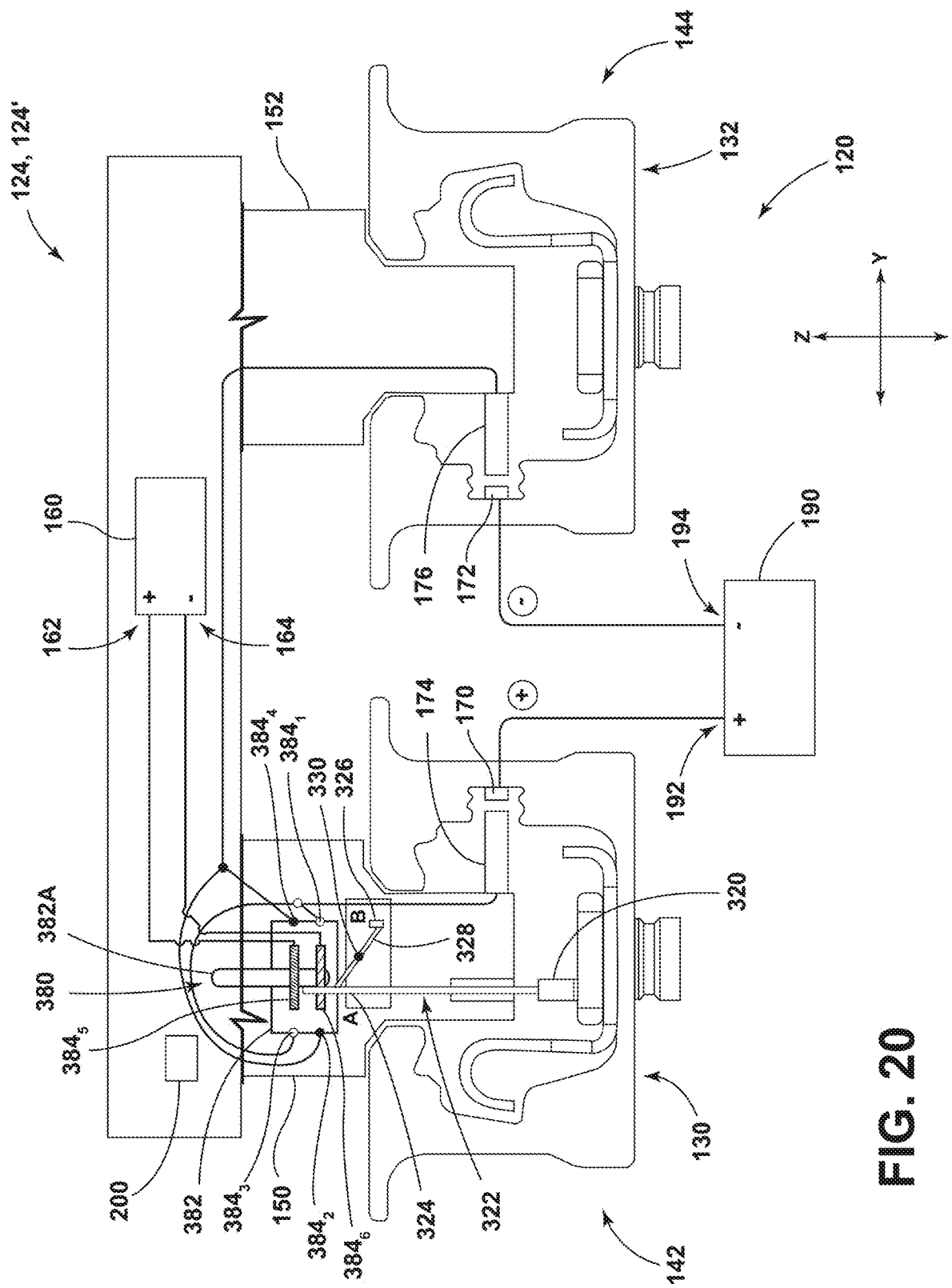
FIG. 20 is an end view generally illustrating an embodiment of an electrical track assembly with a support member in a first configuration according to teachings of the present disclosure.
Figure 21:
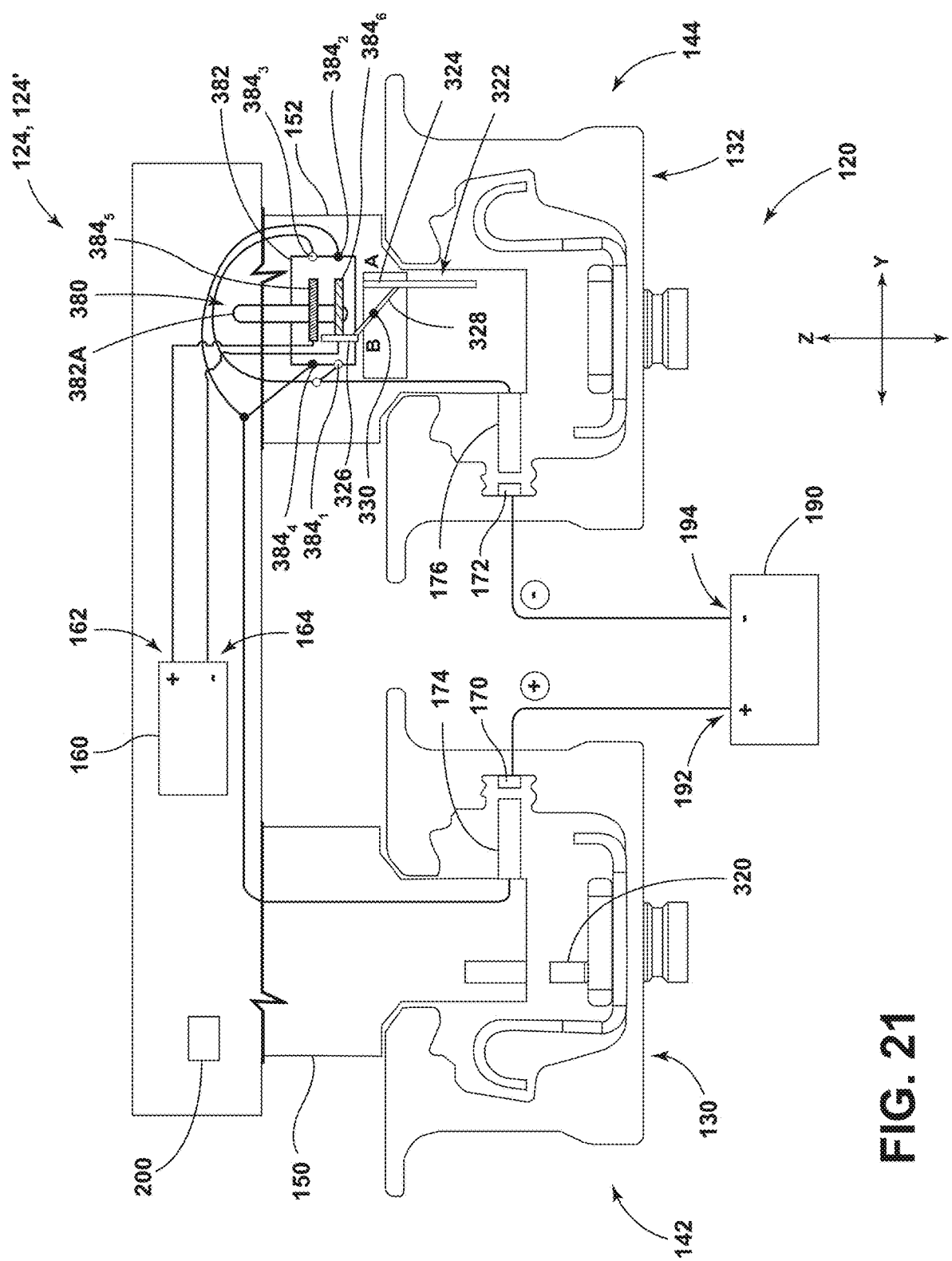
FIG. 21 is an end view generally illustrating an embodiment of an electrical track assembly with a support member in a second configuration according to teachings of the present disclosure.
Figure 22:
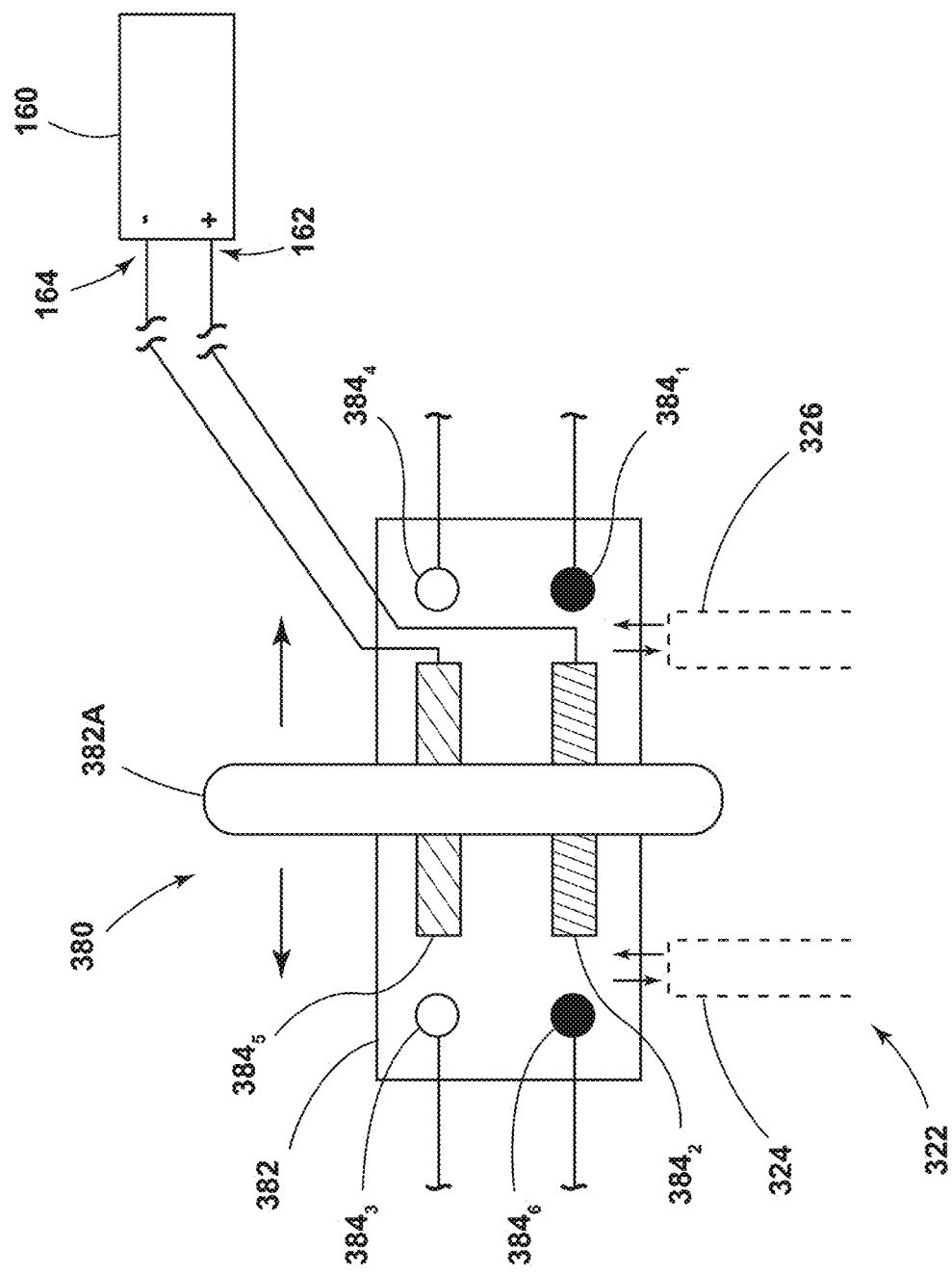
FIG. 22 is an enlarged view an embodiment of a switch and portions of an embodiment of a blocking element according to teachings of the present disclosure.

In embodiments, such as generally illustrated in FIGS. 20, 21, and 22, a blocking element 322 may be configured to limit actuation of one or more switches of a switch assembly. For example and without limitation, a blocking element 322 of a switch assembly 380 may be configured to physically/mechanically restrict and/or prevent actuation of a switch 382 of the switch assembly 380 into a position that would result in an improper connection (e.g., reversed polarity). The blocking element 322 may include and/or be configured as a linkage that may include a first portion 324, a second portion 326, and/or a third portion 328, and/or that may be configured to restrict actuation of a switch assembly 380. The first portion 324 may, for example, include a lever (e.g., bar, rod, tube, elongated plate, etc.) that may extend substantially in a Z-direction (e.g., in a vertical direction). The second portion 326 may, for example, include a lever that may extend substantially in a Z-direction in parallel with and offset from the first portion 324, such as in a Y-direction (e.g., if the switch 382 is substantially aligned with the Y-direction, such as generally shown in FIGS. 20-22) and/or in an X-direction (e.g., if the switch 382 is substantially aligned with an X-direction).

With embodiments, a third portion 328 may include a lever that may be rotatably connected with the support member 124, 124', such as via a pivot 330. The third portion 328 may rotate in a plane substantially parallel with the switch 382. For example and without limitation, if the switch 382 is substantially aligned with the Y-direction, such as generally shown in FIGS. 20-22, the third portion may, for example, be configured to rotate substantially in a Y-Z plane, and if the switch 382 is substantially aligned with an X-direction, the third portion may, for example, be configured to rotate substantially in a X-Z plane.

In embodiments, the first portion 324 may be connected (e.g., rotatably) at or about a first end of the third portion 328, and/or the second portion 326 may be connected (e.g., rotatably) at or about a second end of the third portion 328, which may be opposite the first end. The portions 324, 326, 328 may be configured such that movement (e.g., translation) of the first portion 324 in a vertical direction may cause rotation of the third portion 328, which may cause movement (e.g., translation) of the second portion 326 in a substantially opposite vertical direction.

In embodiments, the first portion 324 may include a first portion blocking position (see, e.g., FIG. 20), and/or the second portion 326 may include a second portion blocking position (see, e.g., FIG. 21). In the first portion blocking position, the first portion 324 may be disposed to restrict and/or prevent movement of a lever 382A of the switch 382 to the second switch position. For example, in the first portion blocking position, the first portion 324 may be disposed adjacent to the lever 382A (e.g., to the left of the lever 382A in FIG. 20), which may restrict and/or prevent the lever 382A from moving to the second position (e.g., to the left in FIG. 20), which may prevent an improper electrical connection between the load 160 and the power source 190. In the first portion blocking position, a top of the first portion 324 may be disposed at a higher vertical level than a top of the second portion 326, and the second portion 326 may be in a second portion inactive position.

With embodiments, in the second portion blocking position, the second portion 326 may be disposed to restrict and/or prevent movement of the lever 382A of the switch 382 to the first switch position. For example, in the second portion blocking position, the second portion 326 may be disposed adjacent to the lever 382A (e.g., to the left of the lever 382A in FIG. 21), which may restrict and/or prevent the lever 382A from moving to the first position (e.g., to the left in FIG. 21), which may prevent an improper electrical connection between the load 160 and the power source 190. In the second portion blocking position, the top of the second portion 326 may be disposed at a higher vertical level than the top of the first portion 324, and the first portion 324 may be in a first portion inactive position.

With embodiments, the first portion 324 may extend (e.g., downward) from the support member 124, 124' such that when the support member 124, 124' is disposed on the tracks 130, 132, the first portion 324 may extend into one of the tracks 130, 132, such as to detect/engage an asymmetric feature 320, if present. For example, if the support member 124, 124' is disposed on the tracks 130, 132 such that the first connection portion 150 is connected with and/or inserted into the first track 130, the first portion 324 may extend down into the first track 130 and engage the asymmetric feature 320. Engagement between the first portion 324 and the asymmetric feature 320 may cause the first portion 324 to translate upward from a first portion inactive position into the first portion blocking position (e.g., automatically), which may cause rotation of the third portion 328 (e.g., clockwise in FIG. 20), which may cause the second portion 326 to translate downward out of a second portion blocking position and into a second portion inactive position.

In embodiments, a blocking element 322 may be biased such that the second portion 326 is biased toward the second portion blocking position and/or such that the first portion 324 is biased toward the first portion inactive position. The blocking element 322 may, for example, be biased by gravity acting on the first portion 324, which may be heavier and/or connected at a greater distance from the pivot 330 than the second portion 326, and/or may be biased by a biasing member that may be included with and/or connected to the pivot 330 (e.g., the pivot 330 may bias the third portion counterclockwise in FIG. 20 and clockwise in FIG. 21). For example and without limitation, if the support member 124, 124' is disposed on the tracks 130, 132 such that the first connection portion 150 is connected with and/or inserted into the second track 132 (see, e.g., FIG. 21), the first portion 324 may extend down into the first track 132, but there may not be an asymmetric feature to engage, so the blocking element 322 may remain in the same state, which may include the first portion 324 in the first portion inactive position and the second portion 326 in the second blocking position.

If the first track 130 includes an asymmetric feature 220, 320, the second track 132 may not include an asymmetric feature 220, 320 or may include a different type/configuration of an asymmetric feature. An electrical track assembly 120 may include an opposite configuration in which the second track 132 may include the asymmetric feature 220, 320, and a blocking element 222, 322 may detect/engage an asymmetric feature 220, 320 of the second track 132 to prevent an improper electrical connection.

In some circumstances, it may be desirable for an electrical track assembly to be configured for connections between support members and tracks without electrical switching, such as automatic switching via a control circuit 52 or via a switch assembly 180, 280, 380.

Figure 23A:
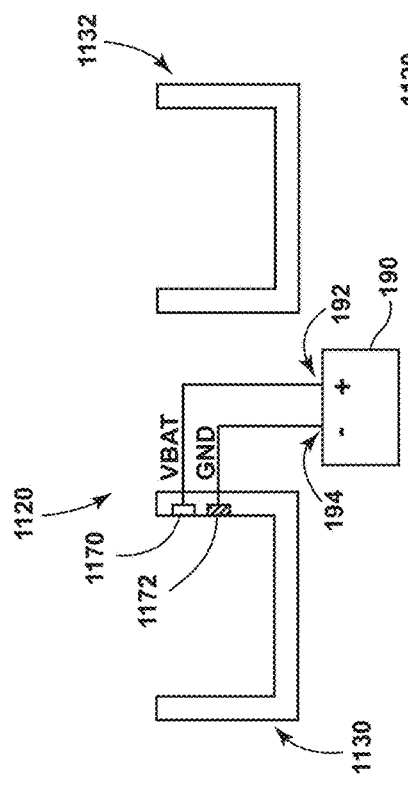
FIGS. 23A-23C are end views of embodiments of tracks and power sources of electrical track assemblies according to teachings of the present disclosure.
Figure 23B:
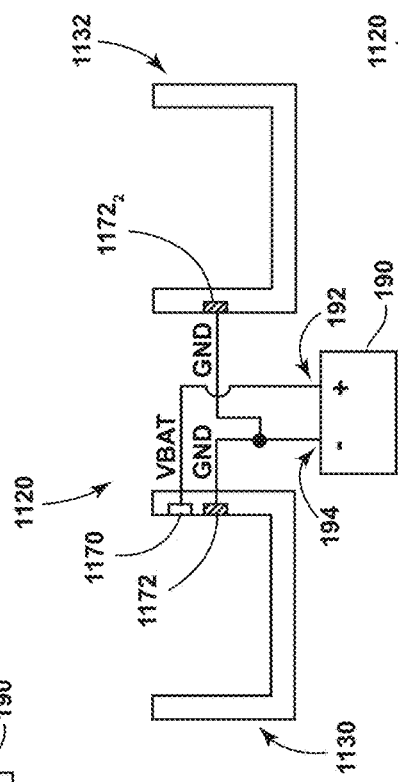
Figure 23C:
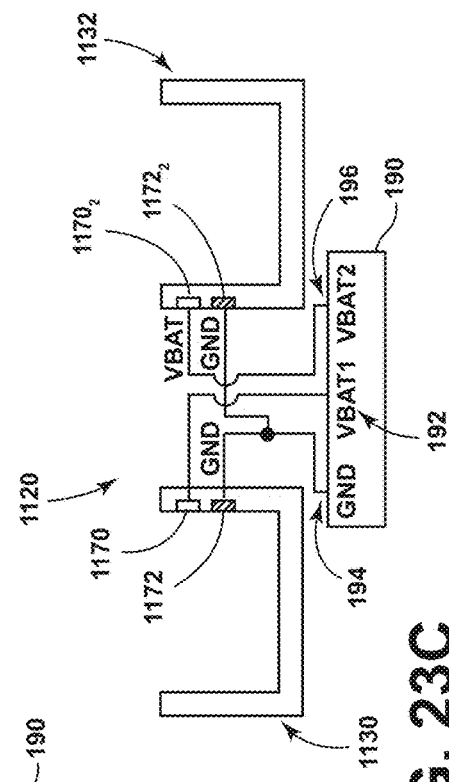
Figure 24:
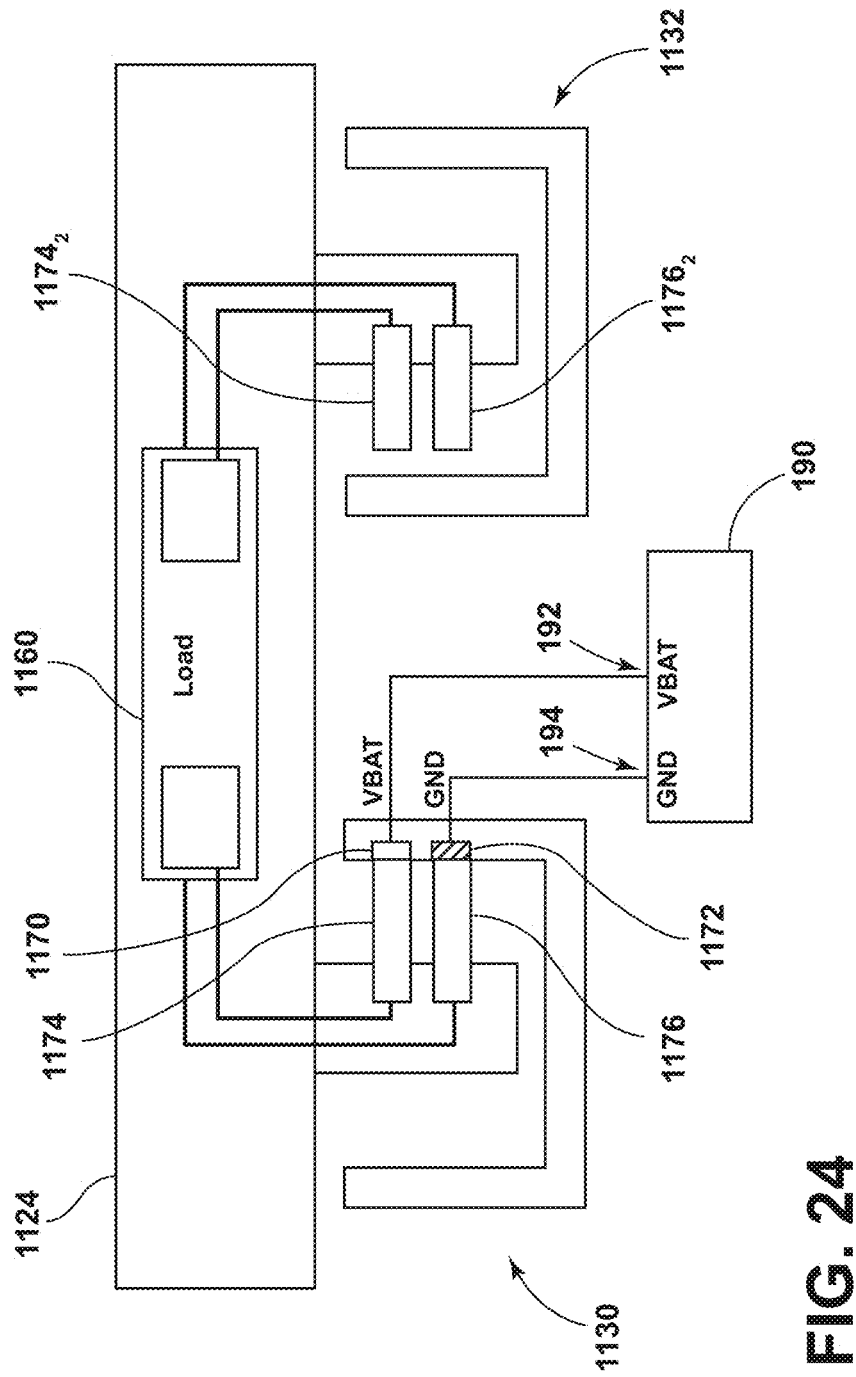
FIGS. 24-28B are end views generally illustrating embodiments of electrical track assemblies with support members according to teachings of the present disclosure.

With embodiments, such as generally illustrated in FIGS. 23A-23C, an electrical track assembly 1120 may include a first track/rail 1130, a second track/rail 1132, and/or an electrical load 1160 that may be connected to a support member 1124. An electrical track assembly 1120 may include one or more conductors 1170, $1170_2$, 1172, $1172_2$ (e.g., electrical bus bars) that may be connected to and/or included with the first track/rail 1130 and/or the second track/rail 1132. For example, in some configurations, a first track 1130 may include a first conductor 1170 and/or a second conductor 1172, and the second track 1132 may not include a conductor (see, e.g., FIGS. 23A and 24). As generally illustrated in FIG. 24, for example, a support member 1124 may include a first sets of contacts 1174, 1176 for electrically contacting the conductors 1170, 1172 when a support member 1124 is in a first orientation while the second set of contacts $1174_2$, $1176_2$ may not provide an electrical connection. In the second orientation of the support member 1124, the second set of contacts $1174_2$, $1176_2$ may be configured to electrically contact conductors 1170, 1172 while the first set of contacts 1174, 1176 may not provide an electrical connection. For example, in a first orientation, the first set of contacts 1174, 1176 may move into electrical contact with conductors 1170, 1172, and, in the second orientation, the second set of contacts $1174_2$, $1176_2$ may move into electrical contact with conductors 1170, 1172. With such a configuration, the support member 1124 may automatically electrically connect with the conductors 1170, 1172 of the track 1130 regardless of the orientation of the support member 1124.

Figure 25:
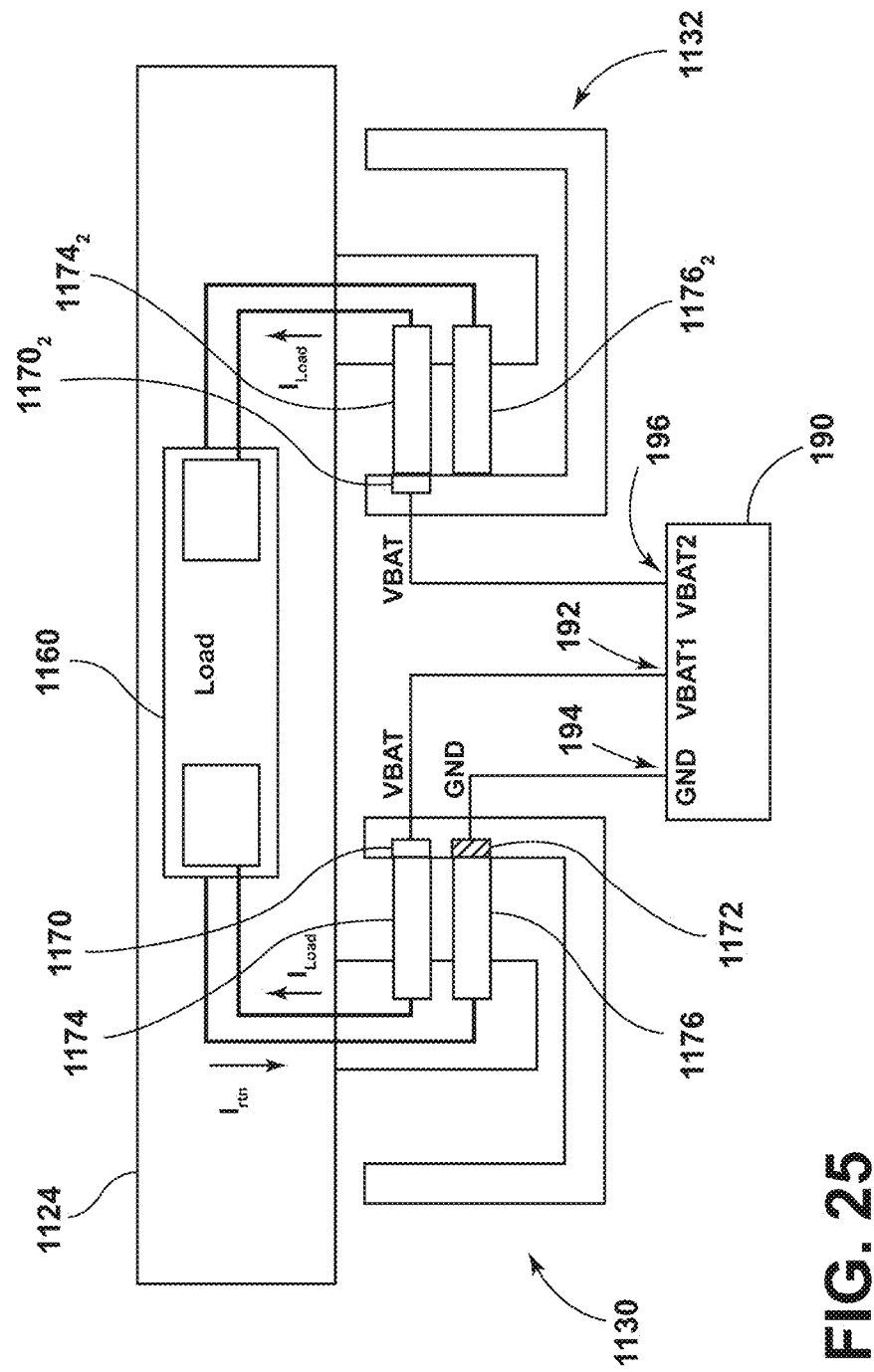
Figure 26:
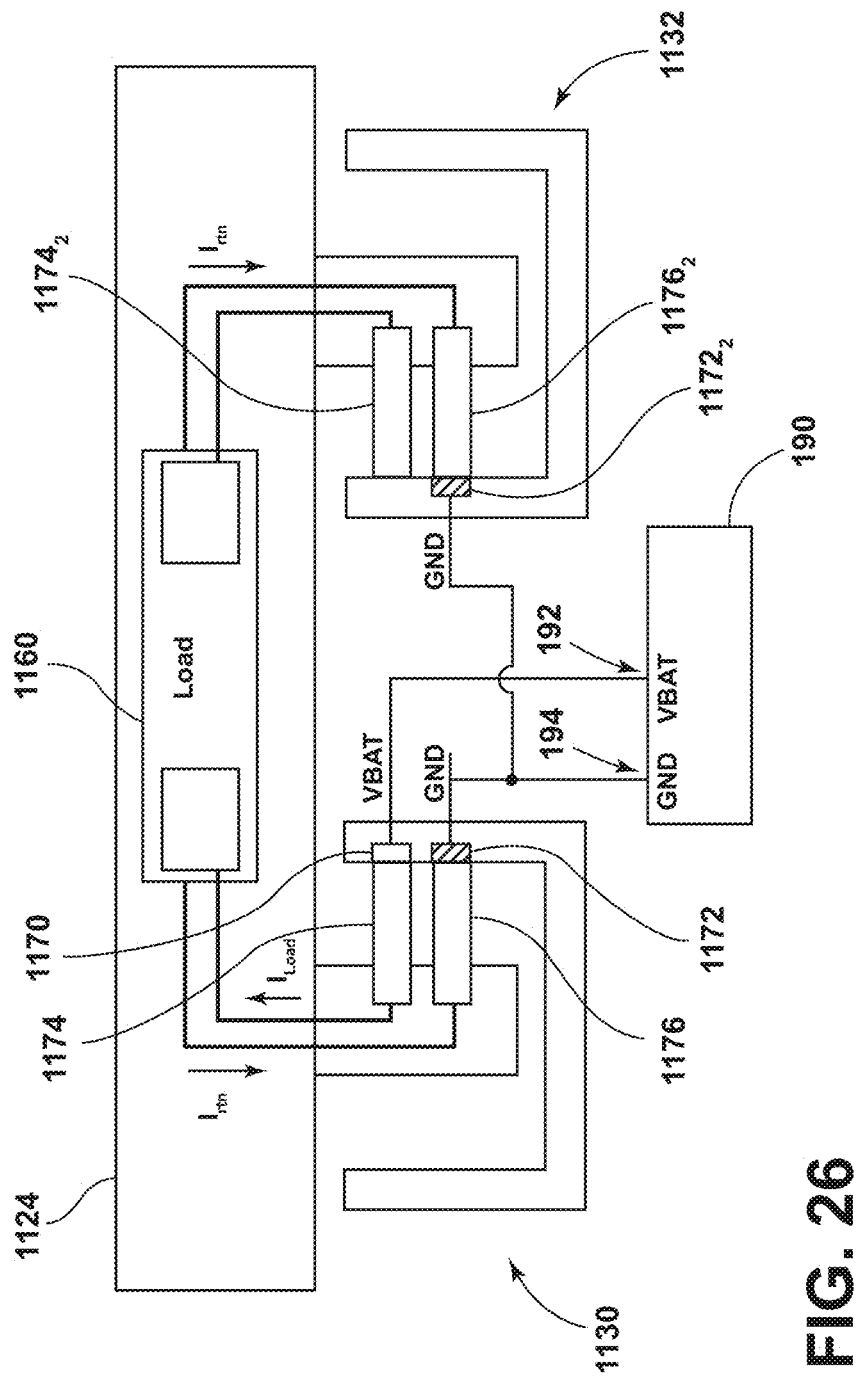

In other configurations, for example, a first track 1130 may include a first conductor 1170 and/or a second conductor 1172, and the second track 1132 may include an additional conductor $1170_2$ or $1172_2$ (see, e.g., FIGS. 23B, 25, and 26). Similar to the configuration shown in FIG. 24, a support member 1124 may include a first set of contacts 1174, 1176 and a second set of contacts $1174_2$, $1176_2$ that may be configured to electrically contact conductors 1170, 1172, $1170_2$ of the tracks 1130, 1132 (see, e.g., FIG. 25). In the first orientation, the first set of contacts 1174, 1176 may electrically contact the conductors 1170, 1172, respectively of the first track 1130, and the third contact $1174_2$ may contact the conductor $1170_2$ of the second track 1132. The first conductor 1170 and the third conductor $1170_2$ may be electrically connected to positive contacts 192, 196 of a power source 190, and the second conductor 1172 may be electrically connected with a negative contact 194 of the power source 190.

In another configuration, the second track 1132 may include a fourth conductor $1172_2$ (e.g., instead of a third conductor $1170_2$), and the second contact 1176 and the fourth contact $1176_2$ may be configured to electrically contact the fourth conductor $1172_2$ in the second and first orientations, respectively (see, e.g., FIG. 26). In the first orientation, as shown in FIG. 26, the third contact $1174_2$ may not be electrically connected to a conductor, and, in the second orientation, the first contact 1174 may not be electrically connected to a conductor.

With other configurations, for example, a first track 1130 may include a first conductor 1170 and a second conductor 1172, and the second track 1132 may include a third conductor $1170_2$ and a fourth conductor $1172_2$ (see, e.g., FIGS. 23C, 27, 28A, and 28B). A power source 190 may be connected to the four conductors 1170, 1172, $1170_2$, $1172_2$. For example, the second conductor 1172 and the fourth conductor $1172_2$ may be connected to a negative or ground contact 194 of the power source, the first conductor 1170 may be connected to a first positive contact of the power source 190, and/or the third conductor $1170_2$ may be connected to a second positive contact of the power source 190. The power source 190 may, in some examples, provide power with different characteristics (e.g., current, voltage, etc.) to the first and second positive contacts 192, 196, which may be utilized by the support member 1124, the electrical track assembly 1120, and/or a vehicle 100 to determine the orientation in which the support member 1124 is disposed.

Figure 27:
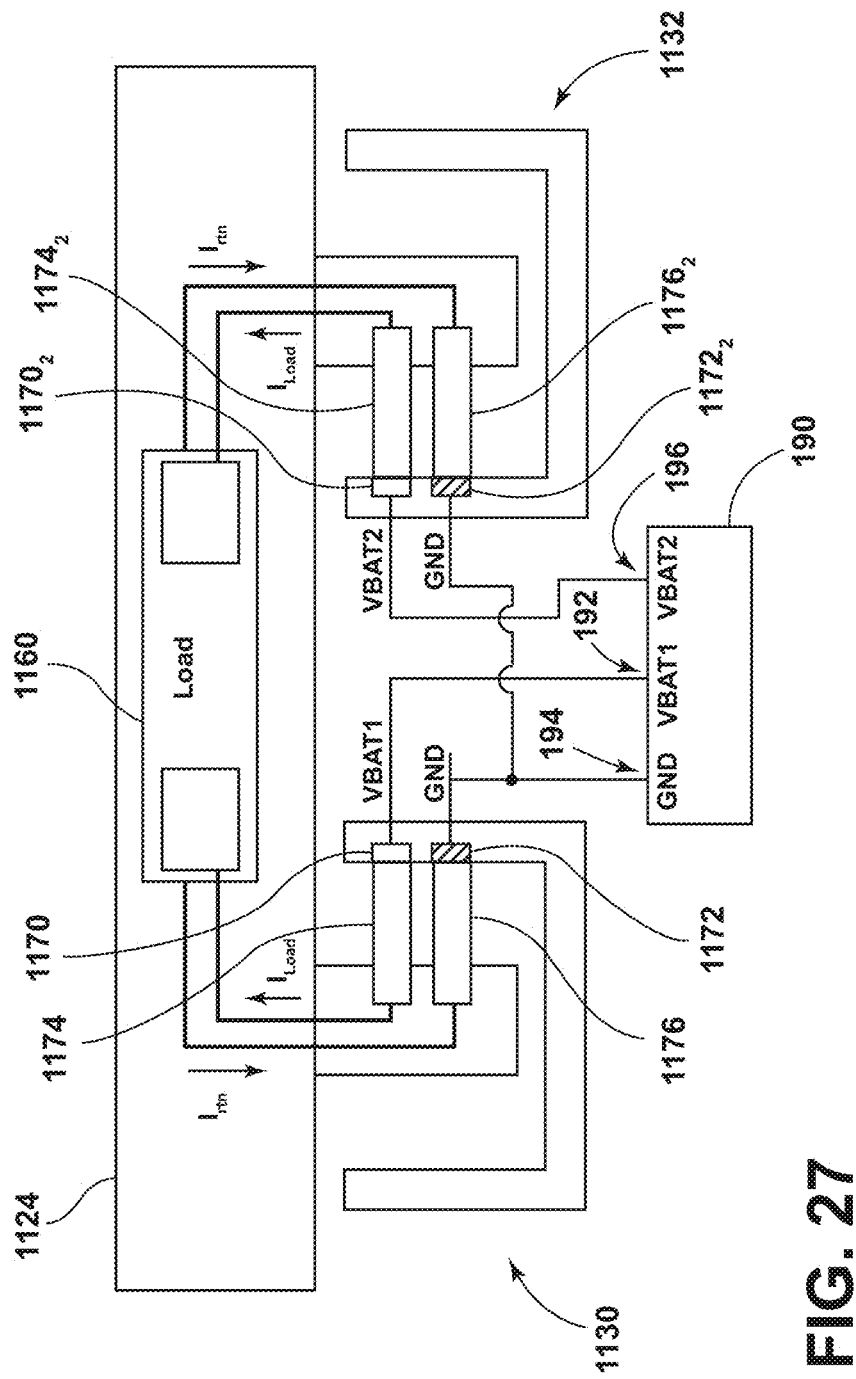

As generally illustrated in FIG. 27, in some configurations, a support member 1124 may include two sets of electrical contacts 1174, 1176 and $1174_2$, $1176_2$ such that a contact electrically contacts/connects with a respective one of the conductors 1170, 1172, $1170_2$, $1172_2$ in both orientations of the support member 1124.

Figure 28A:
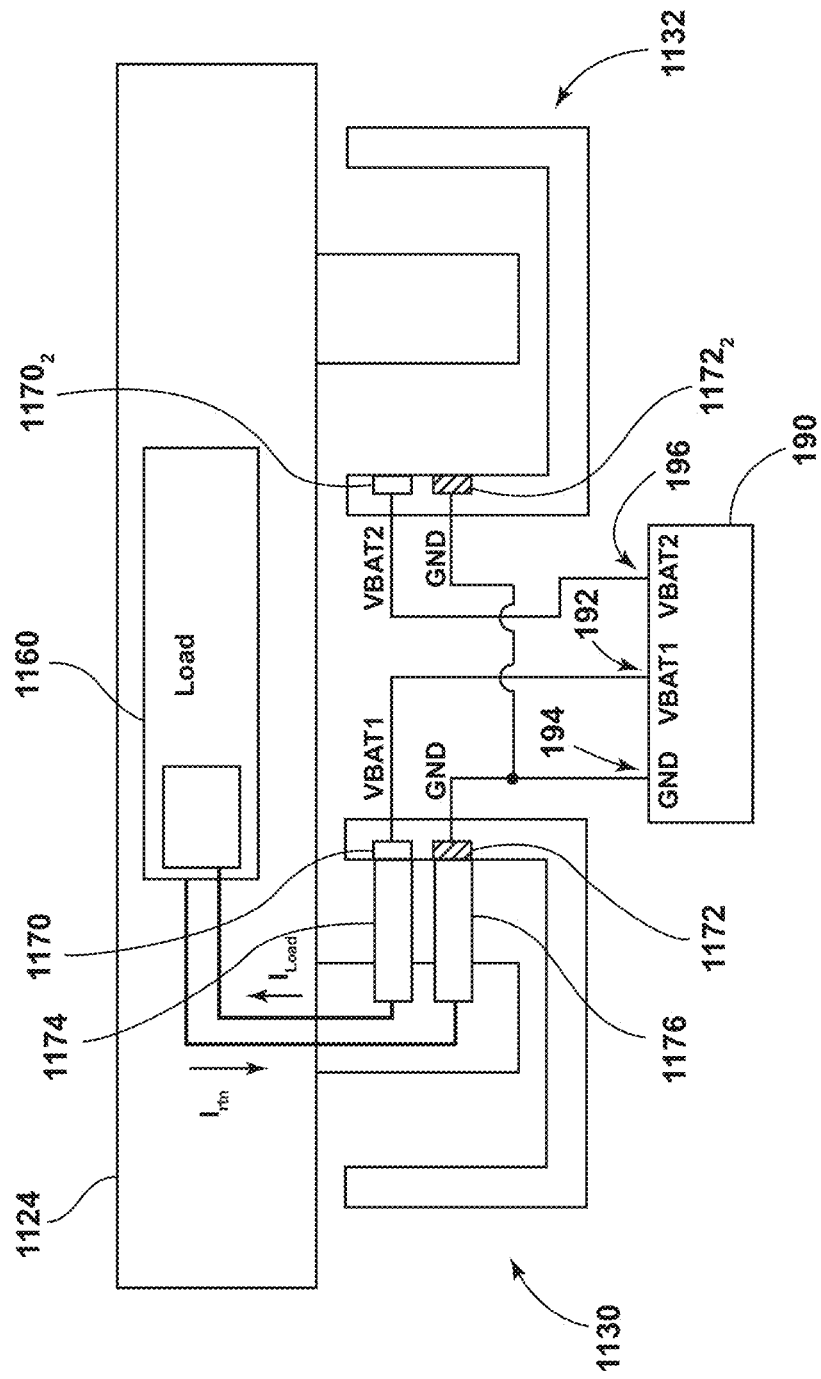
Figure 28B:
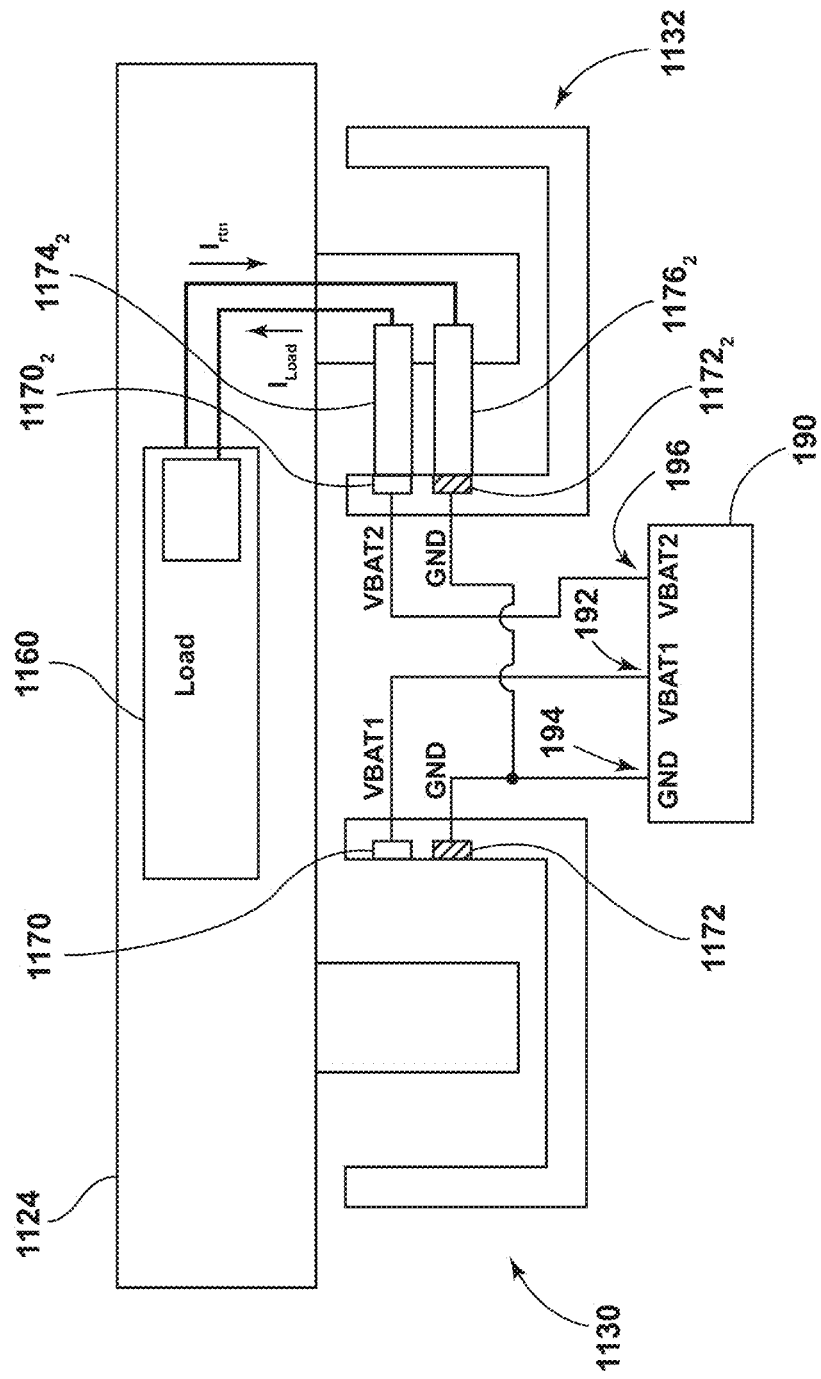

In another configuration, such as generally shown in FIGS. 28A and 28B, a support member 1124 may include a single set of contacts 1174, 1176 that electrically contact a first of conductors 1170, 1172 in the first orientation (see, e.g., FIG. 28A), and electrically contact a second set of conductors $1170_2$, $1172_2$ of the second track 1132 in the second orientation (see, e.g., FIG. 28B). In the first orientation, the third and fourth conductors $1170_2$, $1172_2$ may not be electrically connected (e.g., directly) with electrical contacts of the support member 1124. In the second orientation, the first and second conductors 1170, 1172 may not be electrically connected (e.g., directly) with electrical contacts of the support member 1124.

In embodiments, an electrical track assembly 120 may be configured to provide power to an electrical load 160 of a support member 124, 124', 424, 524, 624 via manual and/or mechanical operation of a switch assembly 180, 280, 380, such as without utilizing an electronic controller (e.g., without an ECU 28) and/or utilizing an automatic control circuit (e.g., without a control circuit 52) to control or actuate any portion of the switch assembly 180, 280, 380. Such a configuration may reduce complexity and/or power consumption by the electrical track assembly 120 compared to designs in which an electronic controller or automatic control circuit is utilized, such as in one or more embodiments of electrical assembly 20.

Figure 29:
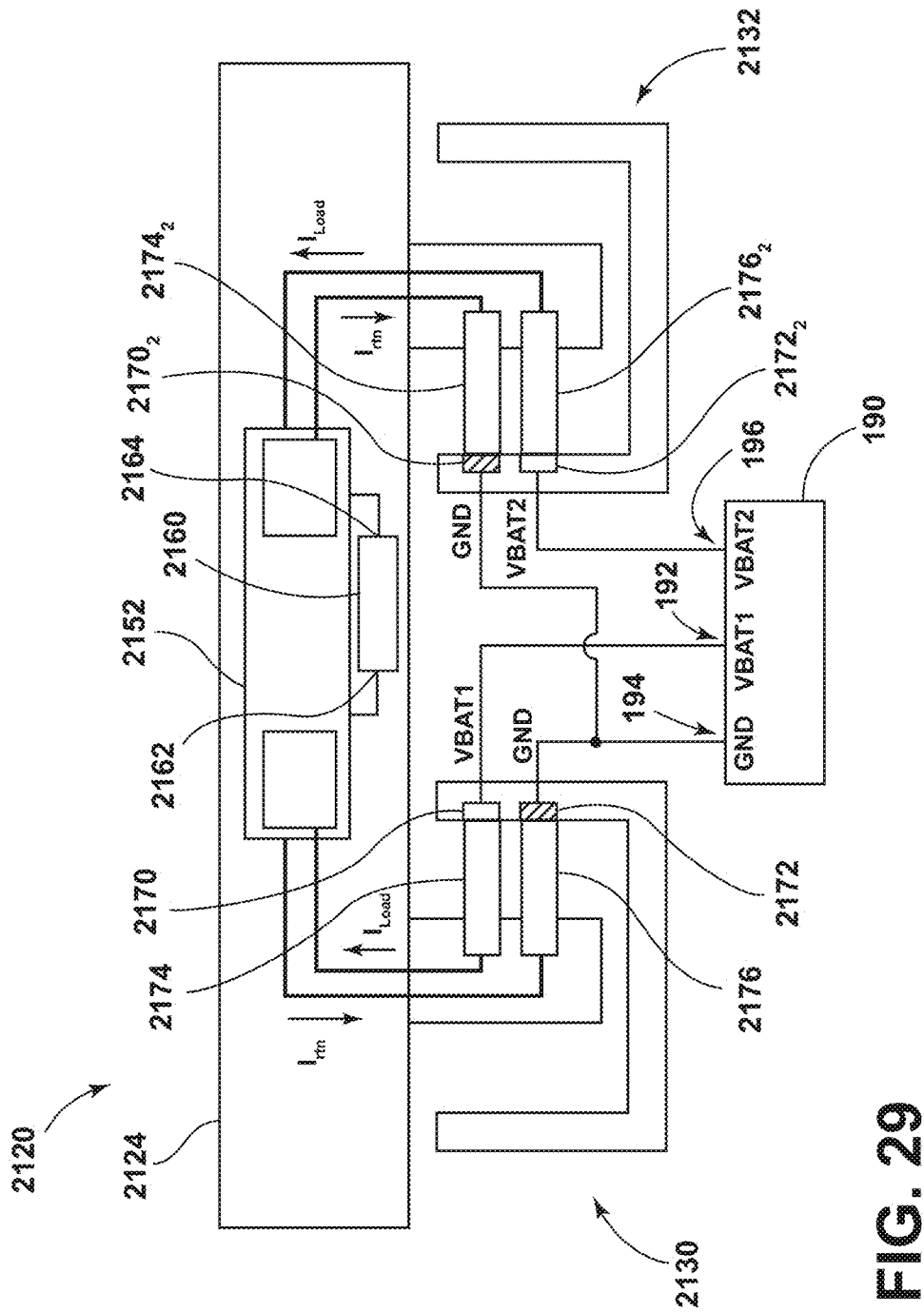
FIG. 29 is an end view generally illustrating an embodiment of an electrical track assembly with a support member according to teachings of the present disclosure.

In embodiments, such as generally illustrated in FIG. 29, an electrical track assembly 2120 that may include a first track/rail 2130 and a second track/rail 2132. The first track 2130 may include a first conductor 2170 and a second conductor 2172 that may be disposed in a stacked configuration (e.g., with the first conductor 2170 above the second conductor 2172) and/or that may extend in the X-direction, such as along some or most of the first track 2130. The second track 2132 may include a third conductor $2170_2$ and a fourth conductor $2172_2$ that may be disposed in a stacked configuration (e.g., with the fourth conductor $2172_2$ above the third conductor $2170_2$) and/or that may extend in the X-direction, such as along some or most of the second track 2132. A support member 2124 may be configured for selective connection (e.g., mechanical and electrical) with, movement along, and/or removal from the tracks 2130, 2132. The support member 2124 may include a first electrical contact 2174, a second electrical contact 2176, a third electrical contact $2174_2$, and/or a fourth electrical contact $2176_2$. In a first connected configuration, the first and second electrical contact 2174, 2176 may move (e.g., rotate) into electrical contact with first and second conductors 2170, 2172, respectively, and the third and fourth contacts 2174₂, 2176₂ may move into contact with the fourth and third conductors 2172₂, 2170₂, respectively. A control circuit 2152 of the support member 2124 may be configured to ensure that the first and fourth conductors 2170, 2172₂ of the tracks 2130, 2132 are electrically connected with positive contact(s) 2162 of the electrical load 2160 and that the second and third conductors 2172, 2170₂ are electrically connected with the negative contact(s) 2164 of the electrical load 2160. The control circuit 2152 may be configured in the same or a similar manner as the control circuit 52 described above.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A support member for an electrical track assembly, the support member comprising:
   an electrical load including a first load contact and a second load contact; and
   a switch assembly configured to:
      selectively provide electrical connection between a first conductor associated with a first track of a pair of tracks of the electrical track assembly and the first load contact,
      selectively provide electrical connection between a second conductor associated with a second track of the pair of tracks and the second load contact, and
      control current flow (i) between the first conductor and the second load contact and (ii) between the second conductor and the first load contact.

2. The support member of claim 1, further comprising:
   a first support member contact; and
   a second support member contact;
   wherein the switch assembly comprises a manual switch electrically connected to the first support member contact, the second support member contact, the first load contact, and the second load contact,
   the manual switch is configured to switch into a first switch position when the support member is in a first configuration to connect the first load contact with the first conductor, and
   the manual switch is configured to switch into a second switch position when the support member is in a second configuration to connect the first load contact with the first conductor.

3. The support member of claim 2, wherein the manual switch includes a third switch position in which the manual switch does not connect the first load contact with either of the first conductor or the second conductor.

4. The support member of claim 2, wherein, when the support member is in a first configuration, the first support member contact is configured to move between one of (i) an engaged position in which the first support member contact is in contact with the first conductor and restricts removal of the support member from the first track, or (ii) a disengaged position in which the first support member contact is not in contact with the first conductor and does not restrict removal of the support member from the first track.

5. The support member of claim 2, wherein
in the first switch position, the manual switch connects the first support member contact with the first load contact, and
in the second switch position, the manual switch connects the first support member contact with the second load contact.

6. The support member of claim 5, wherein the switch assembly further comprises an indicator circuit configured to:
provide at least one of a first visual indication or an audible indication if (i) the manual switch is switched to the second switch position when the support member is in the first configuration, or (ii) the manual switch is switched to the first switch position when the support member is in the second configuration, and
provide a second visual indication if (a) the manual switch is switched to the first switch position when the support member is in the first configuration, or (b) the manual switch is switched to the second switch position when the support member is in the second configuration.

7. The support member of claim 6, wherein the switch assembly further comprises a blocking element including a blocking diode configured to restrict current flow between the first load contact and the second conductor,
the indicator circuit includes a pair of light emitting diodes disposed in parallel with each other and in parallel with at least one of a switch and the blocking diode, and
the pair of light emitting diodes are connected in opposite directions.

8. The support member of claim 1, wherein the switch assembly includes a double pole double throw switch.

9. The support member of claim 1, wherein the switch assembly comprises a blocking element including a diode configured to restrict current flow between the first load contact and the second conductor.

10. An electrical track assembly, comprising:
the support member of claim 1, wherein the support member further comprises a first support member contact and a second support member contact;
the pair of tracks including:
the first track, and
the second track; and
a second support member configured for connection with, removal from, and movement along the first track and the second track, the second support member including:
a third support member contact configured for selective electrical connection with the first conductor when the second support member is connected to the pair of tracks in a first configuration, and with the second conductor when the second support member is connected with the pair of tracks in a second configuration;
a fourth support member contact configured for selective electrical connection with the second conductor when the second support member is connected to the pair of tracks in the first configuration, and with the first conductor when the second support member is connected with the pair of tracks in the second configuration;
a second electrical load including a third load contact and a fourth load contact; and
a second switch assembly configured to selectively connect the first conductor with the third load contact, selectively connect the second conductor with the fourth load contact, control current flow between the first conductor and the fourth load contact, and control current flow between the second conductor and the third load contact.

11. The electrical track assembly of claim 10, wherein the support member and the second support member are configured for connection with the pair of tracks at the same time with each of the following arrangements:
(i) the support member and the second support member are in the first configuration,
(ii) the support member in the first configuration and the second support member in the second configuration,
(iii) the support member in the second configuration and the second support member in the first configuration, and
(iv) the support member and the second support member in the second configuration, and
wherein with each of the arrangements, the switch assembly is further configured to facilitate current flow (a) between the first conductor and the first load contact, and (b) between the first conductor and the third load contact.

12. The support member of claim 11, wherein the switch assembly is further configured to be moved by a user from a disengaged position in which the support member is not electrically connected with the first conductor and the second conductor, to an engaged position in which the support member is electrically connected with the first conductor and the second conductor.

13. An electrical track assembly, comprising:
the support member of claim 1, the support member including a first support member contact and a second support member contact;
the first track including the first conductor; and
the second track including the second conductor;
wherein the switch assembly is connected to or includes the first support member contact and the second support member contact.

14. The electrical track assembly of claim 13, wherein the switch assembly is further configured to move between a first switch assembly position when the support member is in a first configuration and a second switch assembly position when the support member is in a second configuration to connect the first support member contact to the first conductor and connect the second support member contact to the second conductor.

15. An electrical track assembly, comprising:
the support member of claim 1;
the first track including the first conductor; and
the second track including the second conductor;
wherein the first track includes an asymmetric feature.

16. The electrical track assembly of claim 15, wherein the switch assembly includes a blocking element configured to engage the asymmetric feature and mechanically restrict actuation of the switch assembly.

17. The electrical track assembly of claim 16, wherein the blocking element comprises a first portion, a second portion, and a third portion, and wherein the first portion is rotatably connected about a first end of the third portion, and the second portion is rotatably connected about a second end of the third portion, which is opposite to the first end, such that movement of the first portion in a vertical direction causes rotation of the third portion, which further causes movement of the second portion in a substantially opposite vertical direction.

18. An electrical track assembly, comprising:
the support member of claim 1, wherein the support member further comprises a first support member contact and a second support member contact; and
the pair of tracks, including:
the first track including the first conductor, and
the second track including the second conductor,
wherein the first support member contact is configured for selective electrical connection with the first conductor when the support member is connected to the pair of tracks in a first configuration, and with the second conductor when the support member is connected with the pair of tracks in a second configuration, and
the second support member contact is configured for selective electrical connection with the second conductor when the support member is connected to the pair of tracks in the first configuration, and with the first conductor when the support member is connected with the pair of tracks in the second configuration.

19. An electrical track assembly, comprising:
the support member of claim 1; and
a pair of tracks, including:
the first track including the first conductor, and
the second track including the second conductor,
wherein the first track is disposed proximate a first side of a mounting surface;
and the second track is disposed proximate a second side of the mounting surface, and
the switch assembly comprises a manual switch configured to:
switch into a first switch position toward the first side when the support member is in a first configuration to connect the first load contact with the first conductor, and
switch into a second switch position toward the first side when the support member is in a second configuration to connect the first load contact with the first conductor.

20. The electrical track assembly of claim 19, wherein a label is positioned proximate the first side of the manual switch to indicate that the manual switch is actuated toward the first side.

21. A support member for a track assembly, the support member comprising:
a first support member contact configured for selective electrical connection with a first conductor of the track assembly in a first orientation of the support member and a second conductor of the track assembly in a second orientation of the support member;
a second support member contact configured for selective electrical connection with said second conductor in the first orientation and the first conductor in the second orientation;
an electrical load including a first load contact and a second load contact; and
a switch assembly configured to:
selectively provide current to the first support member contact and the second support member contact, and
control current flow (i) between the first conductor and the second load contact and (ii) between the second conductor and the first load contact.

22. An electrical switch assembly, comprising:
a manual switch configured to:
selectively provide electrical connection between a first conductor associated with a track of an electrical track assembly, and a first load contact of an electrical load,
selectively provide electrical connection between a second conductor associated with another track of the electrical track assembly, and a second load contact of the electrical load, and
control current flow (i) between the first conductor and the second load contact and (ii) between the second conductor and the first load contact.

\* \* \* \* \*